(12) United States Patent
Bombin Palomo et al.

(10) Patent No.: US 12,488,268 B1
(45) Date of Patent: Dec. 2, 2025

(54) RESOURCE EFFICIENT LOGICAL QUANTUM GATES

(71) Applicant: Psiquantum, Corp., Palo Alto, CA (US)

(72) Inventors: Hector Bombin Palomo, Kyoto (JP); Naomi Nickerson, San Francisco, CA (US); Sam Roberts, Palo Alto, CA (US)

(73) Assignee: Psiquantum, Corp., Palo Alto, CA (US)

( * ) Notice: Subject to any disclaimer, the term of this patent is extended or adjusted under 35 U.S.C. 154(b) by 454 days.

(21) Appl. No.: 17/974,513

(22) Filed: Oct. 26, 2022

Related U.S. Application Data

(60) Provisional application No. 63/291,236, filed on Dec. 17, 2021, provisional application No. 63/272,152, filed on Oct. 26, 2021.

(51) Int. Cl.
 *G06N 10/20* (2022.01)
(52) U.S. Cl.
 CPC .................................. *G06N 10/20* (2022.01)
(58) Field of Classification Search
 CPC ........ G06N 10/40; G06N 10/20; G06N 10/70; G06N 10/00
 See application file for complete search history.

(56) References Cited

U.S. PATENT DOCUMENTS

| | | | |
|---|---|---|---|
| 7,277,872 B2 | 10/2007 | Raussendorf et al. | |
| 7,554,080 B2 | 6/2009 | Munro et al. | |
| 9,178,154 B2 | 11/2015 | Bunyk | |
| 9,735,776 B1 | 8/2017 | Abdo et al. | |
| 9,858,531 B1 | 1/2018 | Monroe et al. | |
| 10,592,626 B1 | 3/2020 | Pednault et al. | |
| 10,726,353 B2 | 7/2020 | Ashrafi | |
| 11,010,145 B1 | 5/2021 | Smith et al. | |
| 11,263,076 B2 | 3/2022 | Nickerson et al. | |
| 11,892,746 B1 | 2/2024 | Mazed | |
| 11,972,321 B2 | 4/2024 | Gunnels et al. | |
| 2008/0035911 A1 | 2/2008 | Gilbert et al. | |

(Continued)

FOREIGN PATENT DOCUMENTS

| | | |
|---|---|---|
| EP | 3109803 B1 | 7/2020 |
| JP | 2016504002 A | 2/2016 |

(Continued)

OTHER PUBLICATIONS

U.S. Appl. No. 18/108,550, Notice of Allowance, Mailed on May 29, 2024, 8 pages.

(Continued)

*Primary Examiner* — Jason Salce
(74) *Attorney, Agent, or Firm* — Kilpatrick Townsend & Stockton LLP

(57) ABSTRACT

A method of performing an encoded gate on a logical qubit, wherein the encoded gate includes the port portion and an ancillary portion, and wherein a lower surface of the port portion is coupled to an upper surface of the ancillary portion, includes performing a first plurality of stabilizer measurement on the port portion, performing both single qubit and dual qubit measurements on a plurality regions of the ancillary portion to generate topological features such as a twists, domain walls, and defects within a bulk region of the encoded S gate.

4 Claims, 52 Drawing Sheets

(56) References Cited

U.S. PATENT DOCUMENTS

| | | |
|---|---|---|
| 2009/0078931 A1 | 3/2009 | Berkley |
| 2009/0180616 A1 | 7/2009 | Brodsky et al. |
| 2011/0175062 A1 | 7/2011 | Farinelli et al. |
| 2012/0155870 A1 | 6/2012 | Harrison et al. |
| 2014/0112478 A1 | 4/2014 | Arahira |
| 2014/0221059 A1 | 8/2014 | Freedman et al. |
| 2014/0355998 A1 | 12/2014 | Tanzilli et al. |
| 2015/0036967 A1 | 2/2015 | Smith et al. |
| 2016/0112066 A1 | 4/2016 | Ashikhmin |
| 2016/0267032 A1 | 9/2016 | Rigetti et al. |
| 2016/0344414 A1 | 11/2016 | Naaman et al. |
| 2017/0141287 A1 | 5/2017 | Barkeshli et al. |
| 2018/0013426 A1 | 1/2018 | Deurloo et al. |
| 2018/0046933 A1 | 2/2018 | La Cour et al. |
| 2019/0042264 A1* | 2/2019 | Zou .......................... G06F 9/30 |
| 2019/0042970 A1* | 2/2019 | Zou ...................... G06F 9/3877 |
| 2019/0042971 A1* | 2/2019 | Zou .......................... G06F 9/30 |
| 2019/0042972 A1* | 2/2019 | Zou .......................... G06F 9/22 |
| 2019/0042973 A1* | 2/2019 | Zou ...................... G06F 9/3016 |
| 2020/0044749 A1 | 2/2020 | Rauschenbach et al. |
| 2020/0097848 A1 | 3/2020 | Woerner et al. |
| 2020/0242208 A1* | 7/2020 | Daraeizadeh ....... G06F 11/1068 |
| 2020/0287631 A1 | 9/2020 | Gimeno-Segovia et al. |
| 2020/0301244 A1 | 9/2020 | Wang |
| 2020/0310908 A1* | 10/2020 | Hogaboam ............. G06F 11/10 |
| 2020/0401927 A1 | 12/2020 | Nickerson et al. |
| 2021/0027188 A1 | 1/2021 | Nickerson et al. |
| 2021/0105135 A1 | 4/2021 | Figueroa et al. |
| 2021/0182724 A1* | 6/2021 | Zou ........................ G06N 10/20 |
| 2021/0182725 A1* | 6/2021 | Zou ........................ G06N 10/70 |
| 2021/0374588 A1 | 12/2021 | Gidney et al. |
| 2021/0374593 A1 | 12/2021 | Niroula et al. |
| 2022/0113977 A1* | 4/2022 | Klochkov .............. G06N 10/80 |
| 2022/0172096 A1 | 6/2022 | Rudolph |
| 2022/0224996 A1 | 7/2022 | Nickerson et al. |
| 2022/0374378 A1 | 11/2022 | Sivan et al. |
| 2023/0042201 A1 | 2/2023 | Raussendorf et al. |
| 2023/0112525 A1 | 4/2023 | Naveh et al. |
| 2023/0237359 A1 | 7/2023 | Rogers et al. |
| 2023/0237360 A1 | 7/2023 | Naveh et al. |
| 2023/0244973 A1 | 8/2023 | Naveh et al. |
| 2023/0315516 A1 | 10/2023 | Fitzpatrick et al. |
| 2024/0168906 A1 | 5/2024 | Litinski |
| 2024/0275495 A1 | 8/2024 | Qiang et al. |

FOREIGN PATENT DOCUMENTS

| | | |
|---|---|---|
| JP | 2020530619 A | 10/2020 |
| WO | 2019178009 A1 | 9/2019 |
| WO | 2019183602 A1 | 9/2019 |
| WO | 2020033588 A1 | 2/2020 |
| WO | 2020056324 A1 | 3/2020 |
| WO | 2020251875 A1 | 12/2020 |
| WO | 2020257772 A1 | 12/2020 |
| WO | 2022241336 A2 | 11/2022 |

OTHER PUBLICATIONS

U.S. Appl. No. 18/108,552, Non-Final Office Action, Mailed on Jul. 18, 2024, 7 pages.
U.S. Appl. No. 18/108,556, Non-Final Office Action, Mailed on Sep. 6, 2024, 22 pages.
U.S. Appl. No. 18/108,561, Notice of Allowance, Mailed on Jul. 31, 2024, 9 pages.
Adcock et al., "Programmable Four-Photon Graph States on a Silicon Chip", Nature Communications, vol. 10, No. 3528, Aug. 6, 2019, 6 pages.
Bartolucci et al., "Switch Networks for Photonic Fusion-Based Quantum Computing", Quantum Physics, Available online at: https://arxiv.org/abs/2109.13760, Sep. 28, 2021, 31 pages.
PCT/US2023/012848, "Invitation to Pay Additional Fees and, Where Applicable, Protest Fee", Aug. 5, 2024, 3 pages.
U.S. Appl. No. 18/108,552, Notice of Allowance, Mailed on Nov. 15, 2024, 8 pages.
U.S. Appl. No. 18/108,556, Notice of Allowance, Mailed on Jan. 13, 2025, 16 pages.
Bartolucci et al., "Creation of Entangled Photonic States Using Linear Optics", Available online at: https://arxiv.org/abs/2106.13825, Jun. 25, 2021, 18 pages.
Application No. PCT/US2023/012848, International Search Report and Written Opinion, Mailed on Sep. 30, 2024, 15 pages.
"PSIQUANTUM Webpage from 4/20 Disclosing Cornell University Paper", PSIQUANTUM Corporation, Accessed from Internet on Apr. 20, 2021, 8 pages.
"Quantum Computing: Progress and Prospects", The National Academies of Sciences, Engineering, and Medicine, 2019, pp. 156-192.
U.S. Appl. No. 17/163,219, Advisory Action, Mailed on Nov. 16, 2021, 11 pages.
U.S. Appl. No. 17/163,219, Final Office Action, Mailed on Apr. 20, 2023, 14 pages.
U.S. Appl. No. 17/163,219, Final Office Action, Mailed on Aug. 13, 2021, 29 pages.
U.S. Appl. No. 17/163,219, Non-Final Office Action, Mailed on Oct. 6, 2022, 13 pages.
U.S. Appl. No. 17/163,219, Non-Final Office Action, Mailed on Apr. 27, 2021, 15 pages.
Aharonov et al., "Fault-Tolerant Quantum Computation with Constant Error Rate", SIAM Journal on Computing, vol. 38, No. 4, 2008, pp. 1207-1282.
Auger et al., "Fault-Tolerant Quantum Computation with Non-Deterministic Entangling Gates", Physical Review A, vol. 97, Mar. 16, 2018, 5 pages.
Ball, "First 100-Qubit Quantum Computer Enters Crowded Race", Nature, vol. 599, Nov. 19, 2021, p. 542.
Barkeshli et al., "Modular Transformations Through Sequences of Topological Charge Projections", Physical Review B, vol. 94, Jan. 19, 2017, 21 pages.
Barrett et al., "Fault Tolerant Quantum Computation with Very High Threshold for Loss Errors", Physical Review Letters, vol. 105, No. 20, Nov. 15, 2010, 4 pages.
Bartolucci et al., "Fusion-Based Quantum Computation", Available Online at: https://arxiv.org/pdf/2101.09310.pdf, Jan. 22, 2021, 25 pages.
Blais et al., "Circuit Quantum Electrodynamics", Reviews of Modern Physics, vol. 93, May 19, 2021, 82 pages.
Bolt et al., "Foliated Quantum Error-Correcting Codes", Physical Review Letters, vol. 117, Aug. 12, 2016, pp. 070501-1-070501-6.
Bombin et al., "Interleaving: Modular Architectures for Fault-Tolerant Photonic Quantum Computing", Available Online at https://arxiv.org/pdf/2103.08612.pdf, Mar. 15, 2021, 22 pages.
Bombin et al., "Logical Blocks for Fault-Tolerant Topological Quantum Computation", PRX Quantum, vol. 4, No. 2, Dec. 22, 2021, 39 pages.
Bombin et al., "Quantum Measurements and Gates by Code Deformation", Journal of Physics A Mathematical and Theoretical, vol. 42, No. 9, Feb. 25, 2009, 19 pages.
Bombin, "Single-Shot Fault-Tolerant Quantum Error Correction", Physical Review X, vol. 5, Sep. 28, 2015, pp. 031043-1-031043-26.
Bombin, "Topological Order with a Twist: Ising Anyons from an Abelian Model", Physical Review Letters, vol. 105, Jul. 28, 2010, 5 pages.
Bourassa et al., "Blueprint for a Scalable Photonic Fault-Tolerant Quantum Computer", Quantum, vol. 5, Feb. 2, 2021, 38 pages.
Braunstein et al., "Quantum Information with Continuous Variables", Reviews of Modern Physics, vol. 77, Jun. 2005, 65 pages.
Braunstein et al., "Teleportation of Continuous Quantum Variables", Physical Review Letters, vol. 80, No. 4, Jan. 26, 1998, pp. 869-872.
Bravyi et al., "Quantum Codes on a Lattice with Boundary", Available Online at: https://arxiv.org/pdf/quant-ph/9811052.pdf, Nov. 20, 1998, 6 pages.
Briegel et al., "Measurement-Based Quantum Computation", Nature Physics, vol. 5, Oct. 9, 2009, 20 pages.
Brown et al., "Universal Fault-Tolerant Measurement-Based Quantum Computation", Physical Review Research, vol. 2, Aug. 25, 2020, 30 pages.

(56) References Cited

OTHER PUBLICATIONS

Browne et al., "Resource-Efficient Linear Optical Quantum Computation", Physical Review Letters, vol. 95, No. 1, Feb. 9, 2005, 5 pages.
Bruzewicz et al., "Trapped-Ion Quantum Computing: Progress and Challenges", Applied Physics Reviews, vol. 6, No. 2, Apr. 8, 2019, 56 pages.
Castellanos, "PsiQuantum Raises $450 Million to Build Its Quantum Computer", The Wall Street Journal, Jul. 27, 2021, 4 pages.
Chamberland et al., "Fault-Tolerant Quantum Computing in the Pauli or Clifford Frame with Slow Error Diagnostics", Quantum, vol. 2, Dec. 25, 2017, 11 pages.
Chao et al., "Optimization of the Surface Code Design for Majorana-Based Qubits", Quantum, vol. 4, Oct. 26, 2020, 19 pages.
Cirac et al., "Quantum Computations with Cold Trapped Ions", Physical Review Letters, vol. 74, No. 20, May 15, 1995, pp. 4091-4094.
Coecke et al., "Interacting Quantum Observables: Categorical Algebra and Diagrammatics", Oxford University, Apr. 21, 2011, 80 pages.
Das et al., "A Scalable Decoder Micro-Architecture for Fault-Tolerant Quantum Computing", Available Online at: https://arxiv.org/pdf/2001.06598.pdf, Jan. 18, 2020, 19 pages.
Dawson et al., "Noise Thresholds for Optical Quantum Computers", Physical Review Letters, vol. 96, Jan. 17, 2006, 5 pages.
Delfosse et al., "Almost-Linear Time Decoding Algorithm for Topological Codes", Available Online at: https://arxiv.org/pdf/1709.06218.pdf, Sep. 19, 2017, 10 pages.
Delfosse, "Hierarchical Decoding to Reduce Hardware Requirements for Quantum Computingg", Available Online at: https://arxiv.org/pdf/2001.11427.pdf, Jan. 30, 2020, 8 pages.
Dennis et al., "Topological Quantum Memory", Journal of Mathematical Physics, vol. 43, No. 9, Oct. 24, 2001, 39 pages.
Dyakonov, "The Case Against Quantum Computing", Institute of Electrical and Electronics Engineers Spectrum, Nov. 15, 2018, pp. 1-14.
Edmonds, "Paths, Trees, and Flowers", National Bureau of Standards and Princeton University, 1965, pp. 449-467.
Application No. EP20826691.6, Extended European Search Report, Mailed on Jun. 9, 2023, 11 pages.
Ewert et al., "¾—Efficient Bell Measurement with Passive Linear Optics and Unentangled Ancillae", Physical Review Letters, vol. 113, No. 14, Sep. 30, 2014, pp. 1-8.
Fowler et al., "Surface Codes: Towards Practical Large-Scale Quantum Computation", Physical Review A, vol. 86, No. 3, Oct. 27, 2012, 54 pages.
Fujisaki et al., "A Practical and Scalable Decoder for Topological Quantum Error Correction with Digital Annealer", Available Online at: https://arxiv.org/pdf/2203.15304.pdf, Sep. 9, 2022, 12 pages.
Gimeno-Segovia et al., "From Three-Photon GHZ States to Universal Ballistic Quantum Computation", Physical Review Letters, vol. 115, Feb. 26, 2015, pp. 1-9.
Gimeno-Segovia et al., "Relative Multiplexing for Minimising Switching in Linear-Optical Quantum Computing", New Journal of Physics, vol. 19, Available Online at: https://iopscience.iop.org/article/10.1088/1367-2630/aa7095, Jun. 6, 2017, pp. 1-13.
Gimeno-Segovia et al., "Relative Multiplexing for Minimizing Switching in Linear-optical Quantum Computing", Available on arxiv.org, Cornell University, vol. 19, Jun. 9, 2017, pp. 1-13.
Glancy et al., "Error Analysis for Encoding a Qubit in an Oscillator", Physical Review A, vol. 73, No. 1, Jan. 19, 2006, pp. 012325-1-012325-5.
Gottesman, "A Class of Quantum Error-Correcting Codes Saturating the Quantum Hamming Bound", Physical Review A, vol. 54, No. 3, Sep. 1, 1996, pp. 1-22.
Gottesman et al., "Encoding a Qubit in an Oscillator", Physical Review A, vol. 64, No. 1, May 13, 2001, pp. 1-22.
Gottesman, "Fault-Tolerant Quantum Computation with Constant Overhead", Quantum Information & Computation, vol. 14, Nos. 15-16, Nov. 1, 2014, pp. 1-33.
Gottesman et al., "Quantum Teleportation is a Universal Computational Primitive", Available Online at: https://arxiv.org/pdf/quant-ph/9908010.pdf, Aug. 2, 1999, pp. 1-6.
Grice, "Arbitrarily Complete Bell-State Measurement Using Only Linear Optical Elements", Physical Review A, vol. 84, No. 4, Oct. 2011, pp. 042331-1-042331-6.
Hein et al., "Multiparty Entanglement in Graph States", Physical Review A, vol. 69, Jun. 9, 2004, pp. 062311-1-062311-20.
Herr et al., "A Local and Scalable Lattice Renormalization Method for Ballistic Quantum Computation", NPJ Quantum Information, vol. 4, No. 27, Jun. 21, 2018, pp. 1-8.
Herrera-Marti et al., "A Photonic Implementation for the Topological Cluster State Quantum Computer", Physical Review A, vol. 82, No. 3, May 17, 2010, pp. 1-7.
Horgan, "Will Quantum Computing Ever Live up to Its Hype?", Scientific American, Apr. 20, 2021, 10 pages.
Horsman et al., "Surface Code Quantum Computing by Lattice Surgery", New Journal of Physics, vol. 14, Dec. 7, 2012, pp. 1-27.
Huo et al., "Learning Time-Dependent Noise to Reduce Logical Errors: Real Time Error Rate Estimation in Quantum Error Correction", New Journal of Physics. vol. 19, No. 12, Dec. 13, 2017, 11 pages.
Kane, "A Silicon-Based Nuclear Spin Quantum Computer", Nature, vol. 393, 1998, pp. 133-137.
Kastoryano et al., "Dissipative Preparation of Entanglement in Optical Cavities", Physical Review Letters, vol. 106, Feb. 28, 2011, pp. 1-4.
Kieling et al., "Percolation, Renormalization, and Quantum Computing with Non-Deterministic Gates", Physical Review Letters, vol. 99, No. 13, Jul. 20, 2007, pp. 1-5.
Kjaergaard et al., "Superconducting Qubits: Current State of Play", Annual Reviews of Condensed Matter Physics, vol. 11, Apr. 21, 2020, pp. 1-30.
Knill et al., "Efficient Linear Optics Quantum Computation", Available Online at: https://arxiv.org/pdf/quant-ph/0006088.pdf, Jun. 20, 2000, pp. 1-8.
Knill, "Fault-Tolerant Postselected Quantum Computation: Threshold Analysis", Available Online at: https://arxiv.org/pdf/quant-ph/0404104.pdf, Apr. 19, 2004, pp. 1-21.
Koch et al., "Charge Insensitive Qubit Design Derived from the Cooper Pair Box", Physical Review A, vol. 76, Sep. 26, 2007, pp. 1-21.
Kolmogorov, "Blossom V: A New Implementation of a Minimum Cost Perfect Matching Algorithm", Mathematical Programming Computation, vol. 1, No. 1, Apr. 21, 2009, pp. 1-15.
Krauter et al., "Entanglement Generated by Dissipation", International Conference on Quantum Information, Jun. 22, 2010, pp. 1-9.
Leung, "Quantum Computation by Measurements", International Journal of Quantum Information, vol. 2, No. 1, Feb. 27, 2004, pp. 1-10.
Li et al., "Resource Costs for Fault-Tolerant Linear Optical Quantum Computing", Physical Review X, vol. 5, No. 4, Apr. 22, 2015, pp. 1-13.
Litinski, "A Game of Surface Codes: Large-Scale Quantum Computing with Lattice Surgery", Quantum, vol. 3, Mar. 5, 2019, pp. 1-37.
Litinski, "Magic State Distillation: Not as Costly as You Think", Nov. 6, 2019, 22 pages.
Loss et al., "Quantum Computation with Quantum Dots", Physical Review A, vol. 57, Jan. 1, 1998, pp. 1-20.
Molmer et al., "Multi-Particle Entanglement of Hot Trapped Ions", Physical Review Letters, vol. 82, No. 9, Mar. 1, 1999, pp. 1-4.
Nayak et al., "Non-Abelian Anyons and Topological Quantum Computation", Reviews of Modern Physics, vol. 80, No. 3, Mar. 28, 2008, pp. 1-73.
Newman et al., "Generating Fault-Tolerant Cluster States from Crystal Structures", Quantum, vol. 4, Jul. 9, 2020, pp. 1-37.
Nickerson et al., "Measurement Based Fault Tolerance Beyond Foliation", PsiQuantum, Oct. 23, 2018, pp. 1-16.
Nielsen, "Optical Quantum Computation Using Cluster States", Physical Review Letters, vol. 93, No. 4, Feb. 2, 2004, pp. 1-4.

(56) References Cited

OTHER PUBLICATIONS

Nielsen et al., "Quantum Computation and Quantum Information", Cambridge University Press, Available online at: www.cambridge.org/9781107002173, 2010, 6 pages.

Nielsen, "Universal Quantum Computation Using Only Projective Measurement, Quantum Memory, and Preparation of the |0> State", Physics Letters A, vol. 308, Nos. 2-3, Aug. 6, 2001, pp. 1-4.

Pant et al., "Percolation Thresholds for Photonic Quantum Computing", Nature Communications, vol. 10, Mar. 6, 2019, pp. 1-12.

Application No. PCT/US2020/038962, International Search Report and Written Opinion, Mailed on Oct. 13, 2020, 12 pages.

Application No. PCT/US2021/015903, International Search Report and Written Opinion, Mailed on May 18, 2021, 8 pages.

Application No. PCT/US2022/013578, International Search Report and Written Opinion, Mailed on Apr. 27, 2022, 7 pages.

Application No. PCT/US2022/070447, International Search Report and Written Opinion, Mailed on Nov. 25, 2022, 7 pages.

Politi et al., "Integrated Quantum Photonics", IEEE Journal of Selected Topics in Quantum Electronics, vol. 15, No. 6, 2009, pp. 1-12.

Preskill, "Quantum Computing in the NISQ Era and Beyond", Quantum Journal, vol. 2, No. 79, Jul. 2018, 20 pages.

Raussendorf et al., "A Fault-Tolerant One-Way Quantum Computer", Annals of Physics, vol. 321, No. 9, Sep. 2006, pp. 1-26.

Raussendorf et al., "Computational Model Underlying the One-Way Quantum Computer", Quantum Information & Computation, vol. 2, No. 6, Mar. 12, 2002, pp. 1-37.

Riesebos et al., "Pauli Frames for Quantum Computer Architectures", Proceedings of the 54th Annual Design Automation Conference, Jun. 2017, 6 pages.

Shor, "Scheme for Reducing Decoherence in Quantum Computer Memory", Physical Review A, Third Series, vol. 52, No. 4, Oct. 1995, pp. R2493-R2496.

Spitz et al., "Adaptive Weight Estimator for Quantum Error Correction in a Time-dependent Environment", Advanced Quantum Technologies, vol. 1, No. 1, 180012, Jul. 30, 2018, pp. 1-8.

Tillich et al., "Quantum LDPC Codes With Positive Rate and Minimum Distance Proportional to n ½", ISIT'09: Proceedings of the 2009 IEEE international conference on Symposium on Information Theory, vol. 60, No. 2, Jun. 2009, pp. 1-21.

Vasmer et al., "Cellular Automaton Decoders for Topological Quantum Codes with Noisy Measurements and Beyond", Scientific Reports, Nature Research, Available Online at: https://www.nature.com/articles/s41598-021-81138-2, Jan. 25, 2021, 14 pages.

Verstraete et al., "Quantum Computation, Quantum State Engineering, and Quantum Phase Transitions Driven by Dissipation", Nature Physics, vol. 5, Mar. 12, 2008, pp. 1-7.

Verstraete et al., "Renormalization Algorithms for Quantum-Many Body Systems in Two and Higher Dimensions", Available Online at: https://arxiv.org/pdf/cond-mat/0407066.pdf, Jul. 2, 2004, pp. 1-5.

Webster et al., "Fault-Tolerant Quantum Gates With Defects in Topological Stabilizer Codes", Physical Review A, vol. 102, Aug. 6, 2020, pp. 1-28.

AU2023414161, "First Examination Report", Jul. 25, 2025, 3 pages.

Application No. JP2024-547410, Notice of Allowance, Mailed on Oct. 14, 2025, 3 pages.

\* cited by examiner

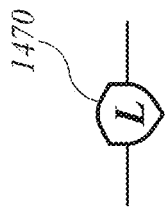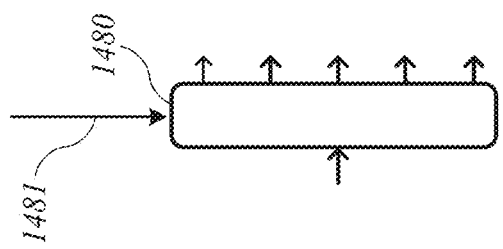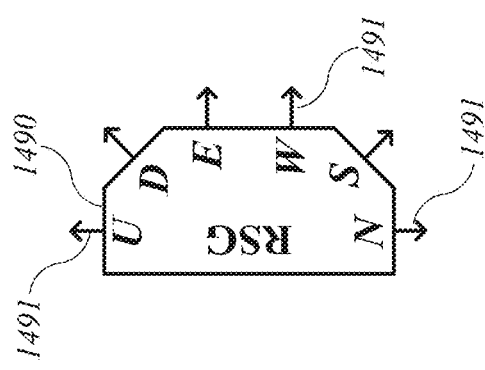
FIG. 14C
FIG. 14B
FIG. 14A

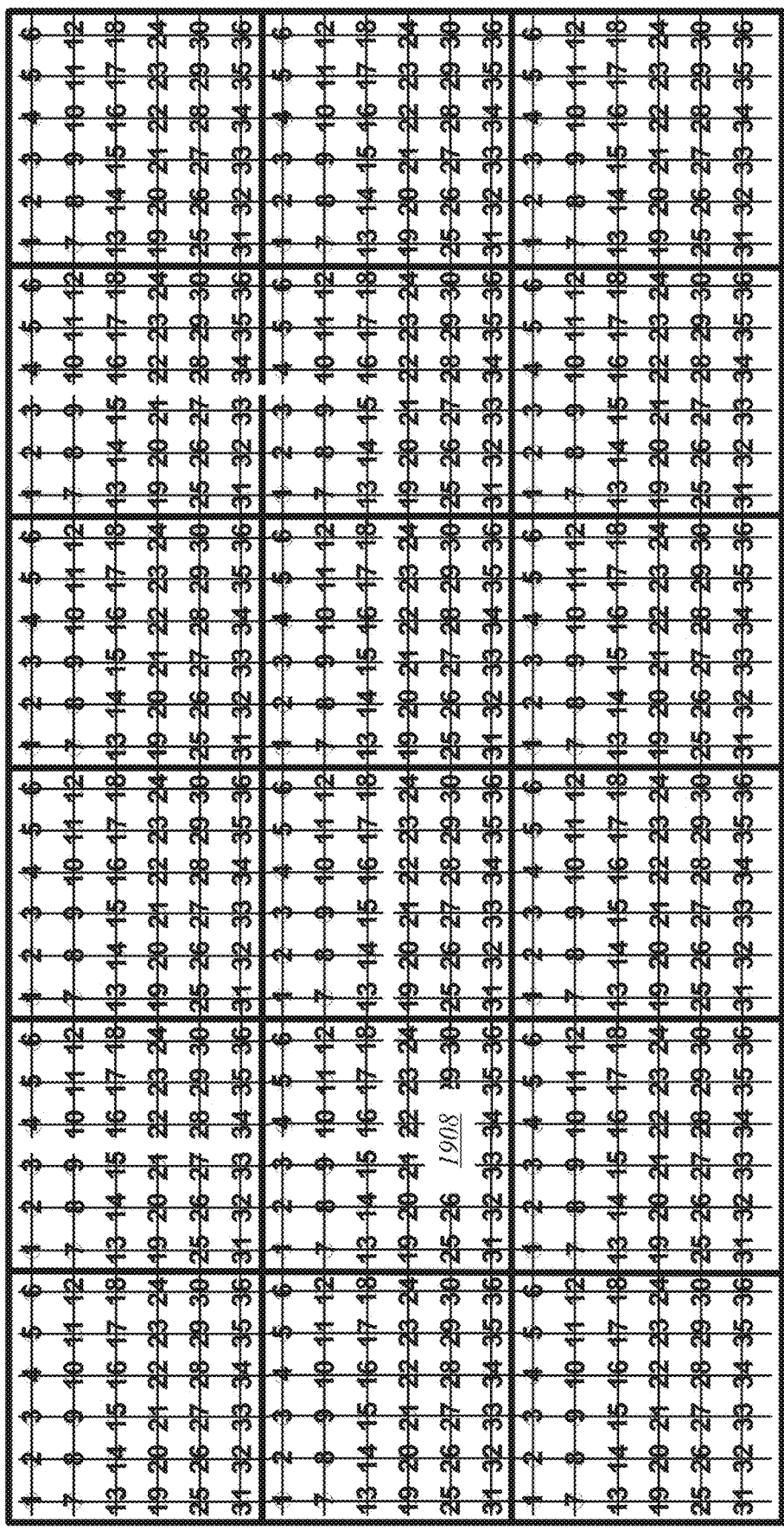
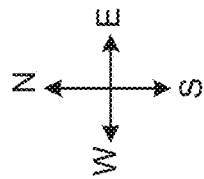
FIG. 19A

2000

| RSG Cycle | ROUTING | | | | FUSION CIRCUITS | | | |
|---|---|---|---|---|---|---|---|---|
| | N switch 1716a | S switch 1716b | E switch 1716d | W switch 1716c | Local N/S 1712a | Net N/S 1712d | Local E/W 1712a | Net E/W 1712d |
| 1 | N1; net | S31; net | E36; net | W1; net | - | F(N",S31) | - | F(E36,W') |
| 2 | N2; net | S32; net | E1; local | W2; local | - | F(N",S32) | F(E1,W2) | - |
| 3 | N3; net | S33; net | E2; local | W3; local | - | F(N",S33) | F(E2,W3) | - |
| 4 | N4; net | S34; net | E3; local | W4; local | - | F(N",S34) | m(E3)m(W4) | - |
| 5 | N5; net | S35; net | E4; local | W5; local | - | F(N",S35) | F(E4,W5) | - |
| 6 | N6; net | S36; net | E5; local | W6; local | - | F(N",S36) | F(E5,W6) | - |
| 7 | N7; local | S1; local | E6; net | W7; net | F(N7,S1) | - | F(E6,W') | - |
| 8 | N8; local | S2; local | E7; local | W8; local | F(N8,S2) | - | F(E7,W8) | - |
| ... | ... | ... | ... | ... | ... | ... | ... | ... |
| 31 | N31; local | S25; local | E30; net | W31; net | F(N31,S25) | - | - | F(E30,W') |
| 32 | N32; local | S26; local | E31; local | W32; local | F(N32,S26) | - | F(E31,W32) | - |
| 33 | N33; local | S27; local | E32; local | W33; local | F(N33,S27) | - | F(E32,W33) | - |
| 34 | N34; local | S28; local | E33; local | W34; local | F(N34,S28) | - | F(E33,W34) | - |
| 35 | N35; local | S29; local | E34; local | W35; local | F(N35,S29) | - | F(E34,W35) | - |
| 36 | N36; local | S30; local | E35; local | W36; local | F(N36,S30) | - | F(E35,W36) | - |

FIG. 20

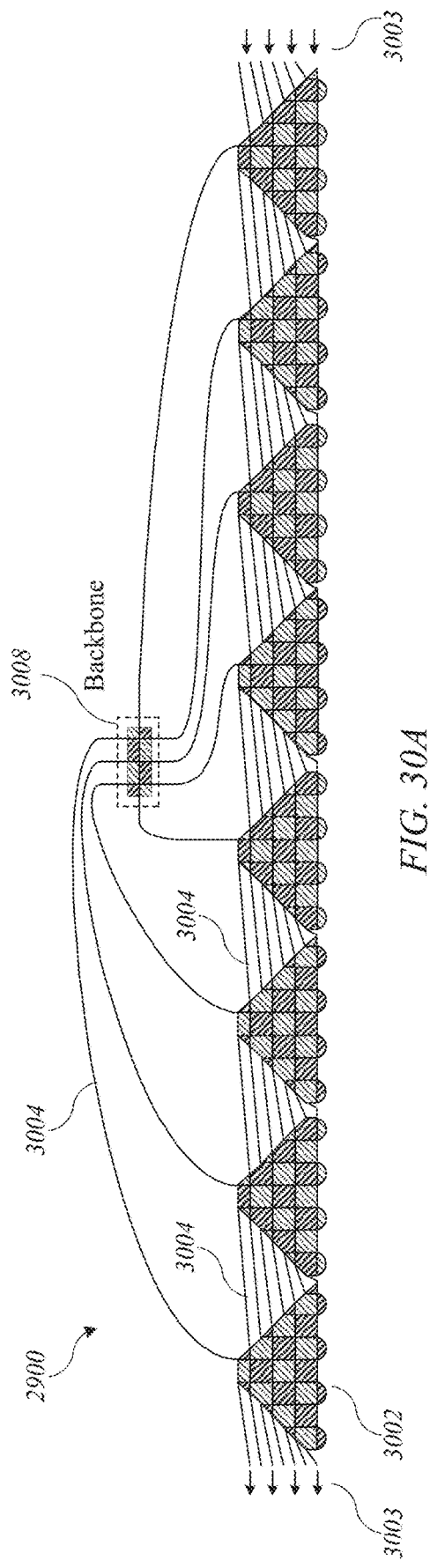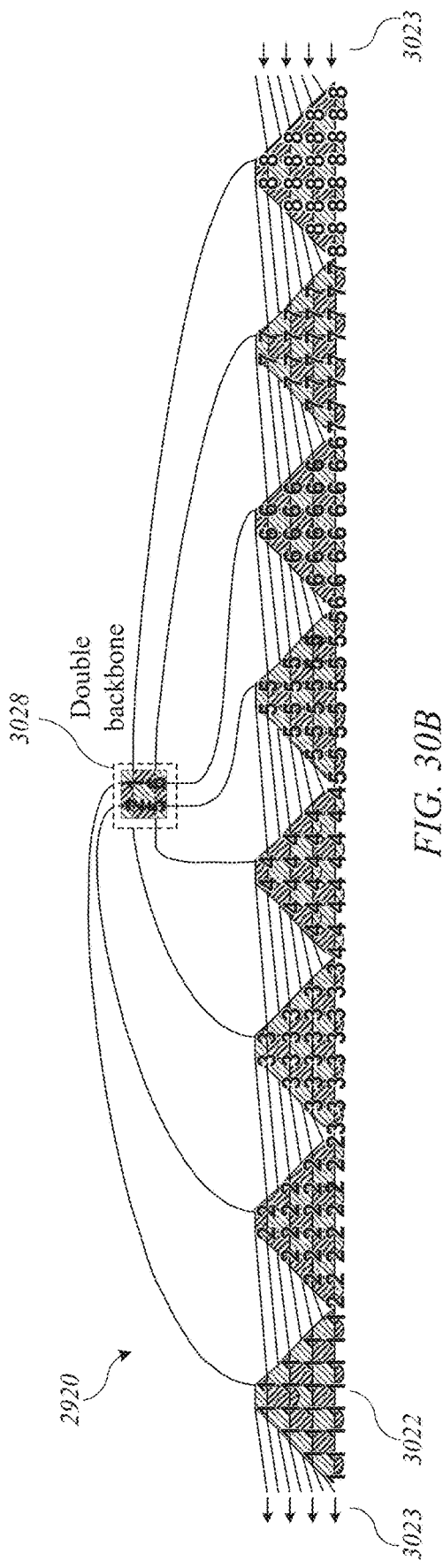
FIG. 30A
FIG. 30B

○ $|\psi\rangle = a_1|0\rangle + a_2|1\rangle$

Physical qubit

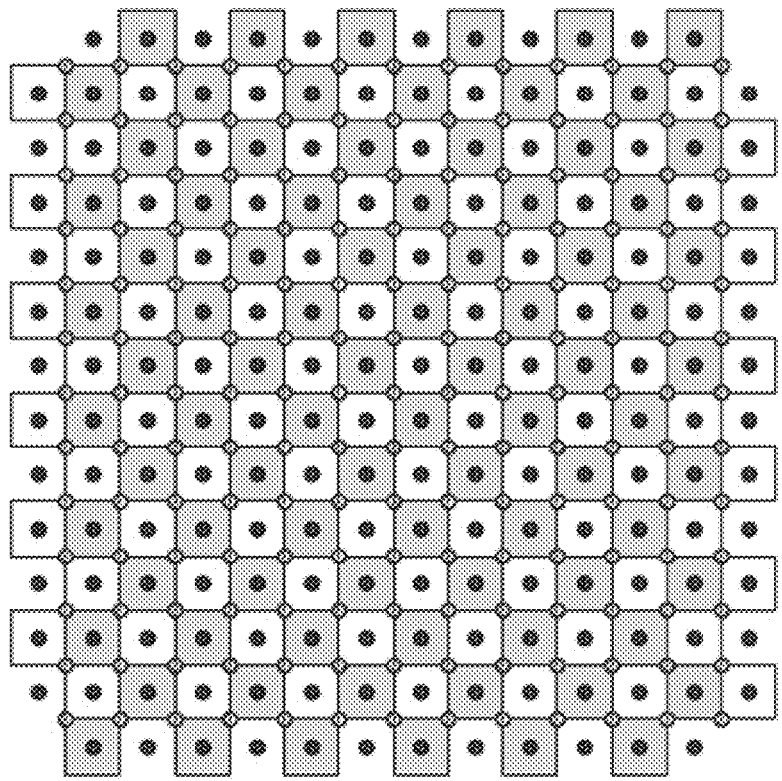
*FIG. 34C*
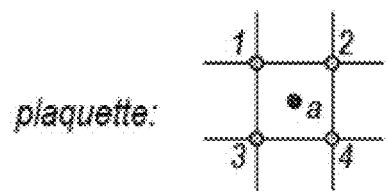
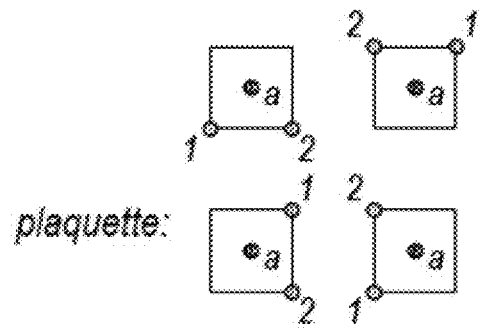
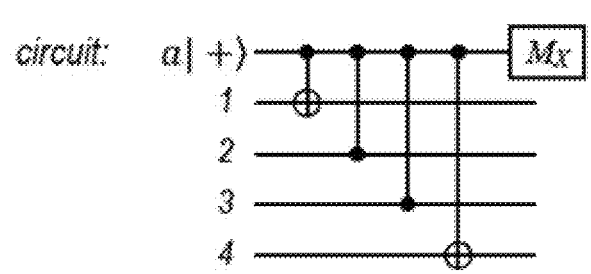
*FIG. 34D*
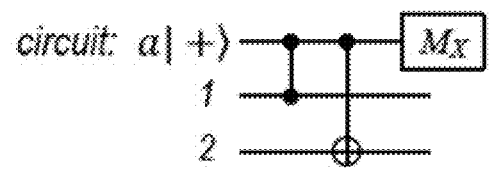
*FIG. 34E* plaquette: 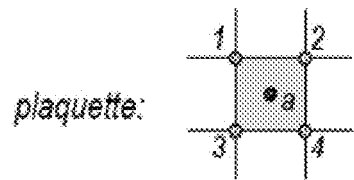
measure: $X_1 X_2 X_3 X_4$
circuit: 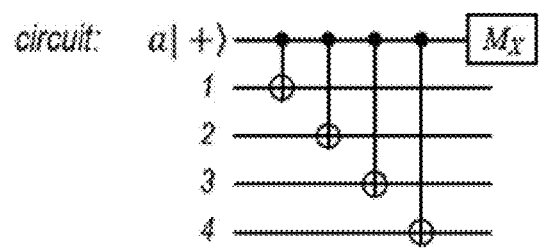
plaquette: 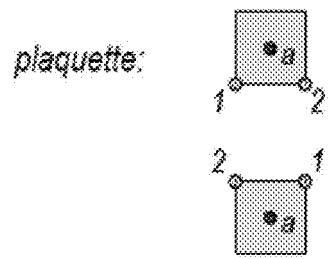
measure: $X_1 X_2$
circuit: 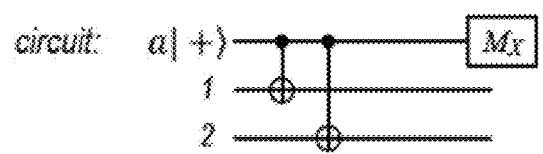
plaquette: 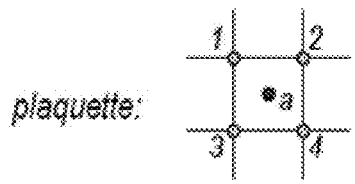
measure: $Z_1 Z_2 Z_3 Z_4$
circuit: 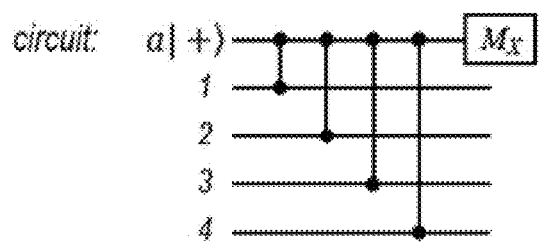
plaquette: 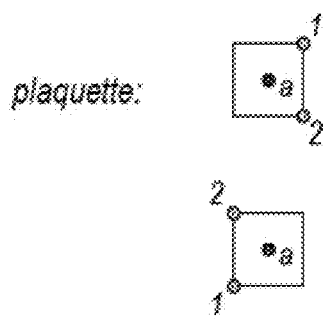
measure: $Z_1 Z_2$
circuit: 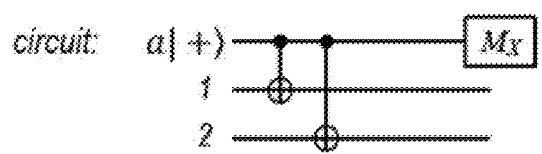
*FIG. 34F*

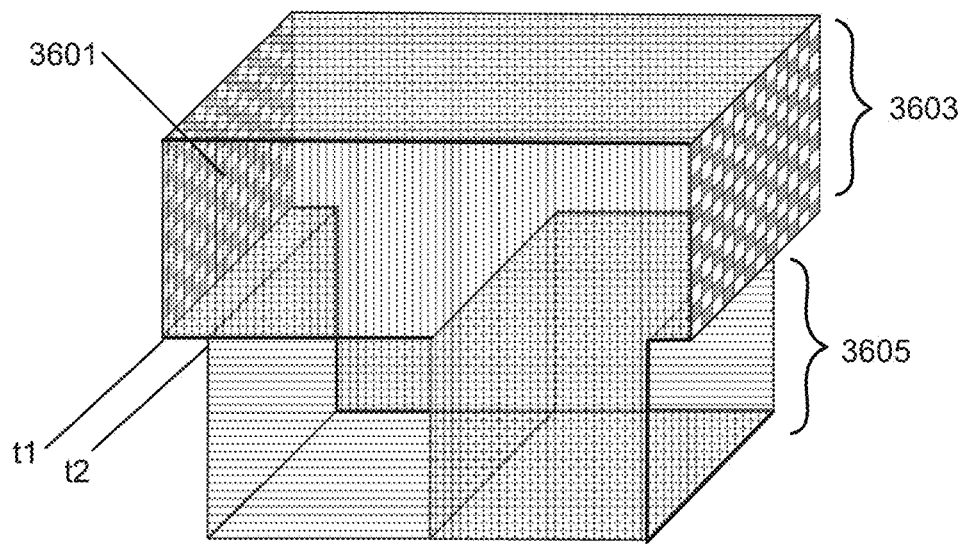
*FIG. 36A*
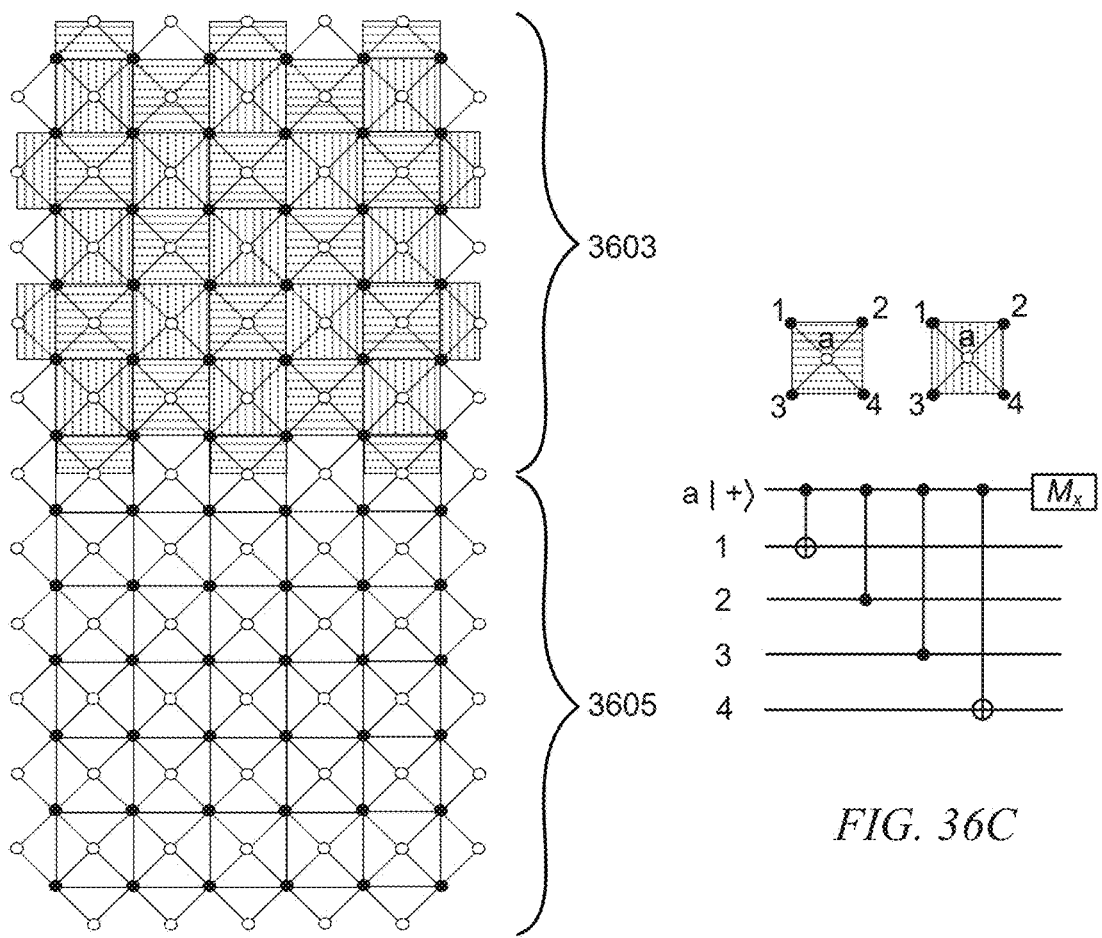
*FIG. 36B*
*FIG. 36C*

Step 2: prepare data
qubits in local Pauli eigenstates

Step 3: d rounds
of stabilizer measurements

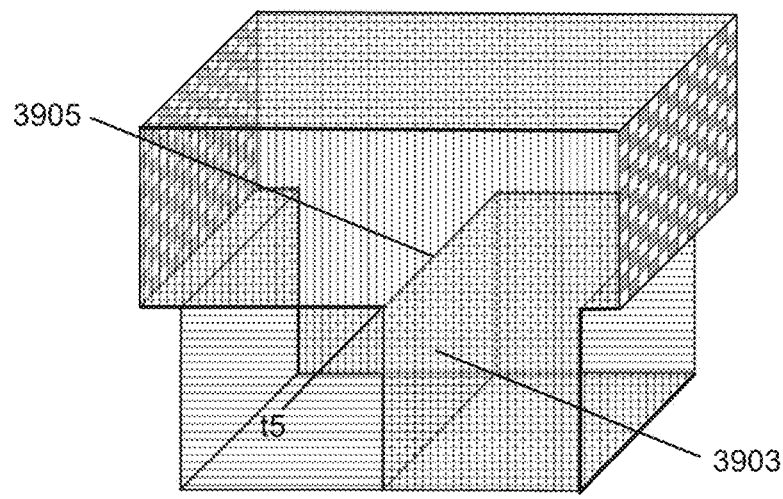
*FIG. 39A*
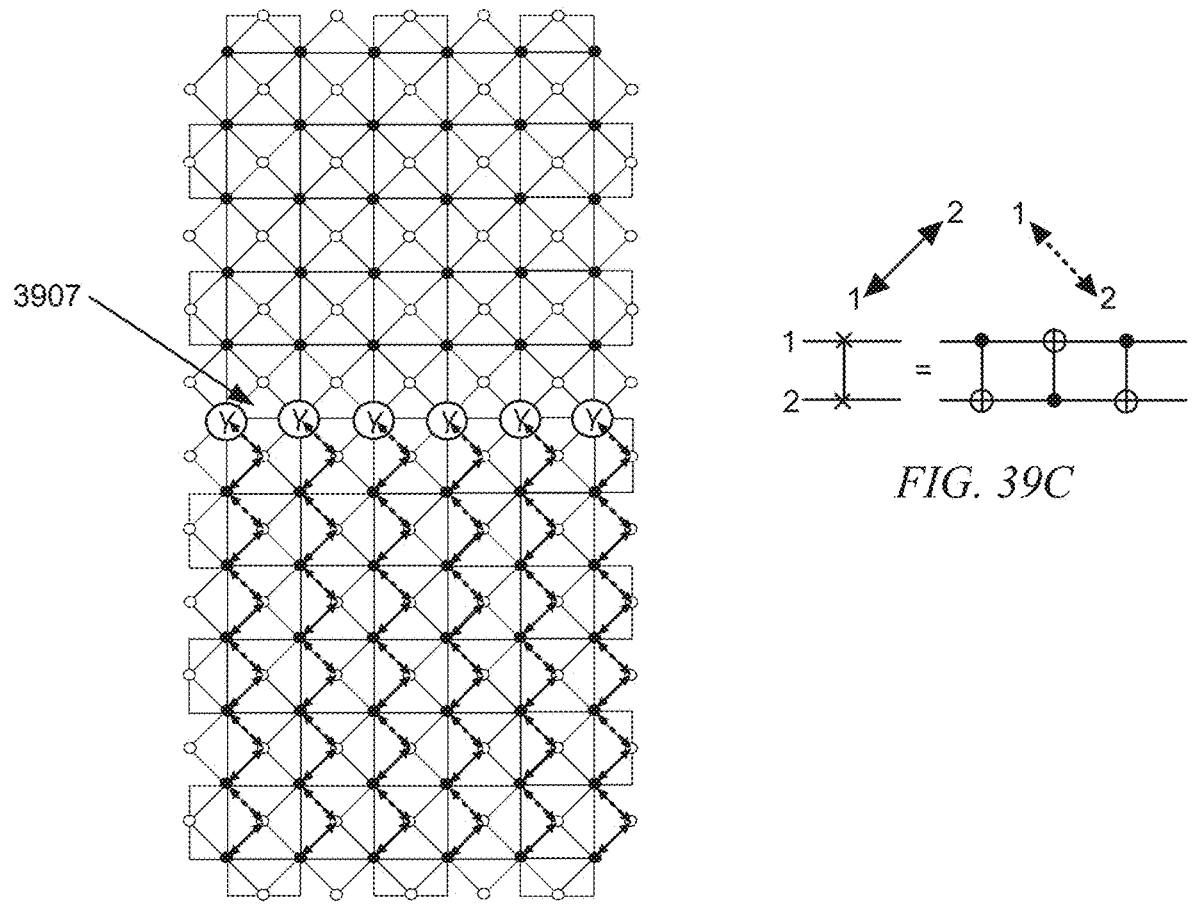
*FIG. 39B*
*FIG. 39C*

Step 5: prepare lowest data qubits
then $d$ rounds of stabilizer measurements

RESOURCE EFFICIENT LOGICAL QUANTUM GATES

CROSS-REFERENCE TO RELATED APPLICATIONS

This application claims the benefit of U.S. Provisional Application No. 63/272,152, filed Oct. 26, 2021, and of U.S. Provisional Application No. 63/291,236, filed Dec. 17, 2021, the disclosures of which are incorporated herein by reference.

BACKGROUND

Quantum computing is distinguished from "classical" computing by its reliance on structures referred to as "qubits." At the most general level, a qubit is a quantum system that can exist in one of two orthogonal states (denoted as $|0\rangle$ and $|1\rangle$ in the conventional bra/ket notation) or in a superposition of the two states (e.g., $$\frac{1}{\sqrt{2}}(|0\rangle + |1\rangle)$$

). By operating on a system (or ensemble) of qubits, a quantum computer can quickly perform certain categories of computations that would require impractical amounts of time in a classical computer.

Practical realization of a quantum computer, however, remains a daunting task. One challenge is the reliable creation and entangling of qubits.

SUMMARY

According to some embodiments, a method of performing an encoded S gate on a logical qubit, includes inputting the logical qubit to a port portion of the encoded S gate, wherein the encoded S gate includes the port portion and an ancillary portion, and wherein a lower surface of the port portion is coupled to an upper surface of the ancillary portion. The method further includes performing a first plurality of stabilizer measurement on the port portion, performing a first plurality of single qubit measurements on the ancillary portion, performing a second plurality of stabilizer measurements across both the port portion and the ancillary portion, performing both single qubit and dual qubit measurements on a plurality regions of the ancillary portion to generate a domain wall on the ancillary portion, wherein the domain wall terminates within a bulk region of the encoded S gate, performing a third plurality of stabilizer measurements on both the port portion and the ancillary portion, performing a second plurality of single qubit measurements on the ancillary portion, performing a fourth plurality of stabilizer measurement on the port portion, and outputting the logical qubit from the port portion.

In some embodiments, performing both single qubit and dual qubit measurements on the plurality regions of the ancillary portion to generate the domain wall includes performing a third plurality of single qubit measurements along a boundary between the ancillary portion and the port portion and performing a plurality of two-step qubit swap gates across the ancillary portion and performing a third plurality of single qubit measurements along an outer boundary of the ancillary portion.

In some embodiments, the port portion and ancillary portions of the encoded S gate are portions of a surface code arrangement of physical qubits.

In some embodiments the first, second, third and fourth plurality of stabilizer measurements are performed by making a plurality of single particle measurements of surface code ancilla qubits.

The following detailed description, together with the accompanying drawings, will provide a better understanding of the nature and advantages of the claimed invention.

BRIEF DESCRIPTION OF THE DRAWINGS

FIGS. 14A-14D show simplified schematic diagram of circuit components for an interleaving module including a reconfigurable fusion circuit according to some embodiments.

FIG. 19A shows a view of a representative layer of a fusion graph, with interleaving coordinates overlaid thereon, according to some embodiments.

FIG. 20 shows a table illustrating configuration settings for an interleaving module that can be determined from a patch of a fusion graph according to some embodiments.

FIGS. 30A and 30B show examples of connectivity structures for stellated surface code patches that can be implemented using a network of interleaving modules according to some embodiments.

FIGS. 34A-34H show a logical qubit encoded in a surface code according to some embodiments.

FIGS. 36A-36C shows a logical S gate according to some embodiments.

FIGS. 39A-39B show a logical S gate according to some embodiments.

DETAILED DESCRIPTION

Figure 1:
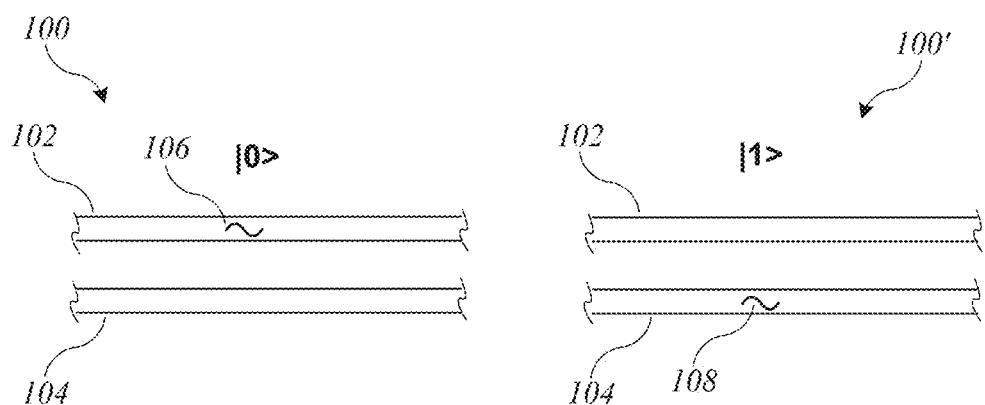
FIG. 1 shows two representations of a portion of a pair of waveguides corresponding to a dual-rail-encoded photonic qubit.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Disclosed herein are examples (also referred to as "embodiments") of systems and methods for performing operations on ensembles of qubits based on various physical quantum systems, including photonic systems. Such embodiments can be used, for example, in quantum computing as well as in other contexts (e.g., quantum communication) that exploit quantum entanglement. To facilitate understanding of the disclosure, an overview of relevant concepts and terminology is provided in Section 1, and an overview of fusion based quantum computing (FBQC) is provided in Section 2. With this context established, Section 3 describes examples of interleaving modules according to various embodiments, and section 4 describes examples of using a network of interleaving modules to implement FBQC. Sections 5-7 describe additional example embodiments of interleaving modules and networks of interleaving modules, and Section 8 describes an example embodiment of a computing system that can implement FBQC using a network of interleaving modules. Although embodiments are described with specific detail to facilitate understanding, those skilled in the art with access to this disclosure will appreciate that the claimed invention can be practiced without these details.

Further, embodiments are described herein as creating and operating on systems of qubits, where the quantum state space of a qubit can be modeled as a 2-dimensional vector space. Those skilled in the art with access to this disclosure will understand that techniques described herein can be applied to systems of "qudits," where a qudit can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit.

1. Overview of Quantum Computing

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode ki of the photon is determined according to which one of a finite set of discrete waveguides the photon is propagating in, and the temporal mode $t_j$ is determined by which one of a set of discrete time periods (referred to herein as "bins") the photon is present in. In some photonic implementations, the degree of temporal discretization can be provided by a pulsed laser which is responsible for generating the photons. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multi-mode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \tag{1}$$

$$|1\rangle_L = |01\rangle_{1,2} \tag{2}$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which, loosely speaking, is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L|0\rangle_L + |1\rangle_L|1\rangle_L}{\sqrt{2}} = \frac{|10\rangle|10\rangle + |01\rangle|01\rangle}{\sqrt{2}} \quad (3)$$

$$|\Phi^-\rangle = \frac{|0\rangle_L|0\rangle_L - |1\rangle_L|1\rangle_L}{\sqrt{2}} = \frac{|10\rangle|10\rangle - |01\rangle|01\rangle}{\sqrt{2}} \quad (4)$$

$$|\Psi^+\rangle = \frac{|0\rangle_L|1\rangle_L + |1\rangle_L|0\rangle_L}{\sqrt{2}} = \frac{|10\rangle|01\rangle + |01\rangle|10\rangle}{\sqrt{2}} \quad (5)$$

$$|\Psi^-\rangle = \frac{|0\rangle_L|1\rangle_L - |1\rangle_L|0\rangle_L}{\sqrt{2}} = \frac{|10\rangle|01\rangle - |01\rangle|10\rangle}{\sqrt{2}} \quad (6)$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \quad (7)$$

where the kets above refer to the logical basis. For example, for qubits encoded by single photons in pairs of modes (a dual-rail encoding), a 3-GHZ state can be written:

$$|GHZ\rangle = \quad (8)$$

$$\frac{|0\rangle_L|0\rangle_L|0\rangle_L - |1\rangle_L|1\rangle_L|1\rangle_L}{\sqrt{2}} = \frac{|10\rangle|10\rangle|10\rangle + |01\rangle|01\rangle|01\rangle}{\sqrt{2}}$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SPWM and SPDC, such as optomechanical systems and the like.

In such cases, operation of the photon source may be non-deterministic (also sometimes referred to as "stochastic") such that a given pump pulse may or may not produce a photon pair. In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $a_1|10\rangle + a_2|01\rangle$, where $|a_1|^2 + |a_2|^2 = 1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 2A:
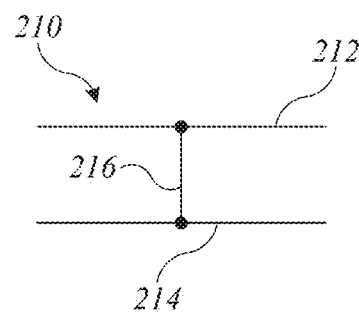
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}}\begin{pmatrix} 1 & i \\ i & 1 \end{pmatrix}, \qquad (9)$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}}\begin{pmatrix} 1 & -i \\ -i & 1 \end{pmatrix}\begin{pmatrix} a_1^\dagger \\ a_2^\dagger \end{pmatrix}_{output}, \qquad (10)$$

where subscripts on the creation operators indicate the mode that is operated on, the subscripts input and output identify the form of the creation operators before and after the beam splitter, respectively and where:

$$a_i|n_i, n_j\rangle = \sqrt{n_i}\,|n_i - 1, n_j\rangle \qquad (11)$$

$$a_j|n_i, n_j\rangle = \sqrt{n_j}\,|n_i, n_j - 1\rangle$$

$$a_j^\dagger|n_i, n_j\rangle = \sqrt{n_j + 1}\,|n_i, n_j + 1\rangle$$

For example, the application of the mode coupler shown in FIG. 2A leads to the following mappings:

$$a_{1_{input}}^\dagger \mapsto \frac{1}{\sqrt{2}}(a_{1_{output}}^\dagger - ia_{2_{output}}^\dagger) \qquad (12)$$

$$a_{2_{input}}^\dagger \mapsto \frac{1}{\sqrt{2}}(-ia_{1_{output}}^\dagger + a_{2_{output}}^\dagger)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \qquad (13)$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 2B:
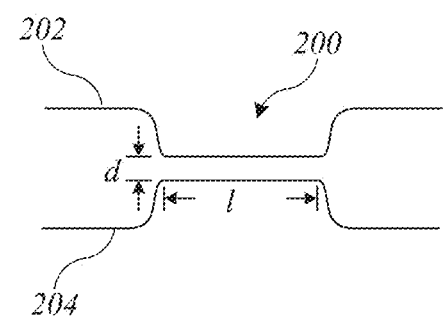
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length/of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \qquad (14)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobite, BBO, KTP, and the like and even doped semiconductors such as silicon, germanium, and the like.

Figure 3A:
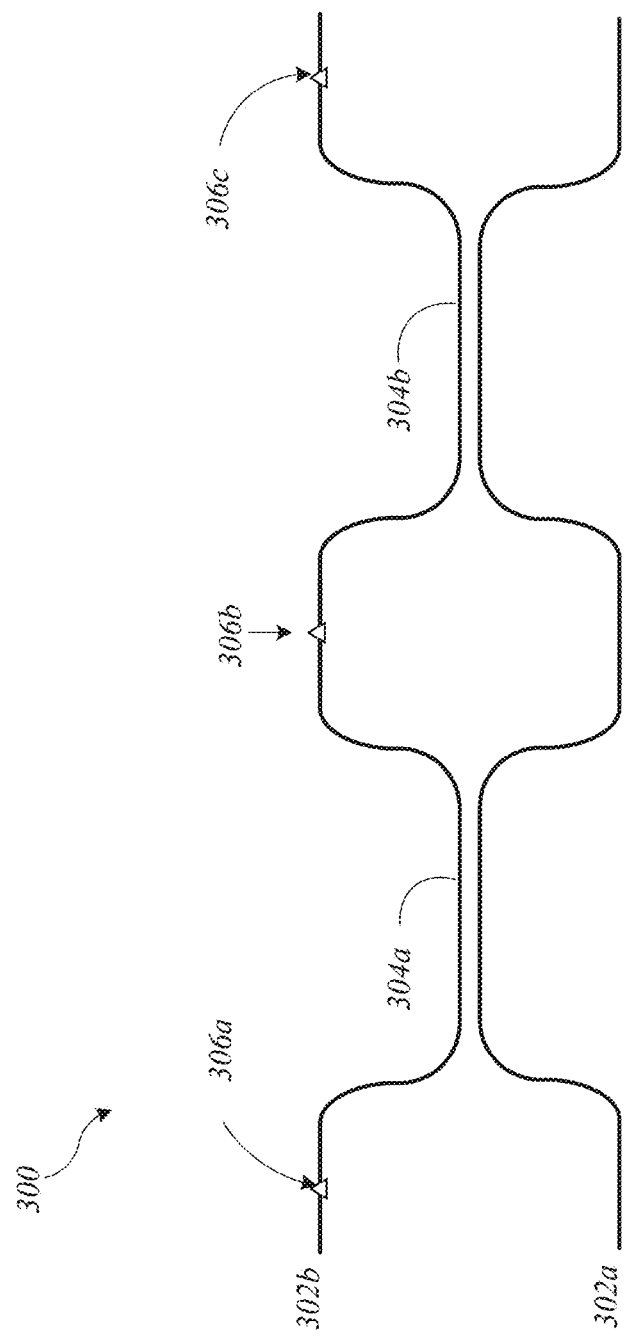
FIGS. 3A and 3B show, in schematic form, examples of physical implementations of a Mach-Zehnder Interferometer (MZI) configuration that can be used in some embodiments.
Figure 3B:
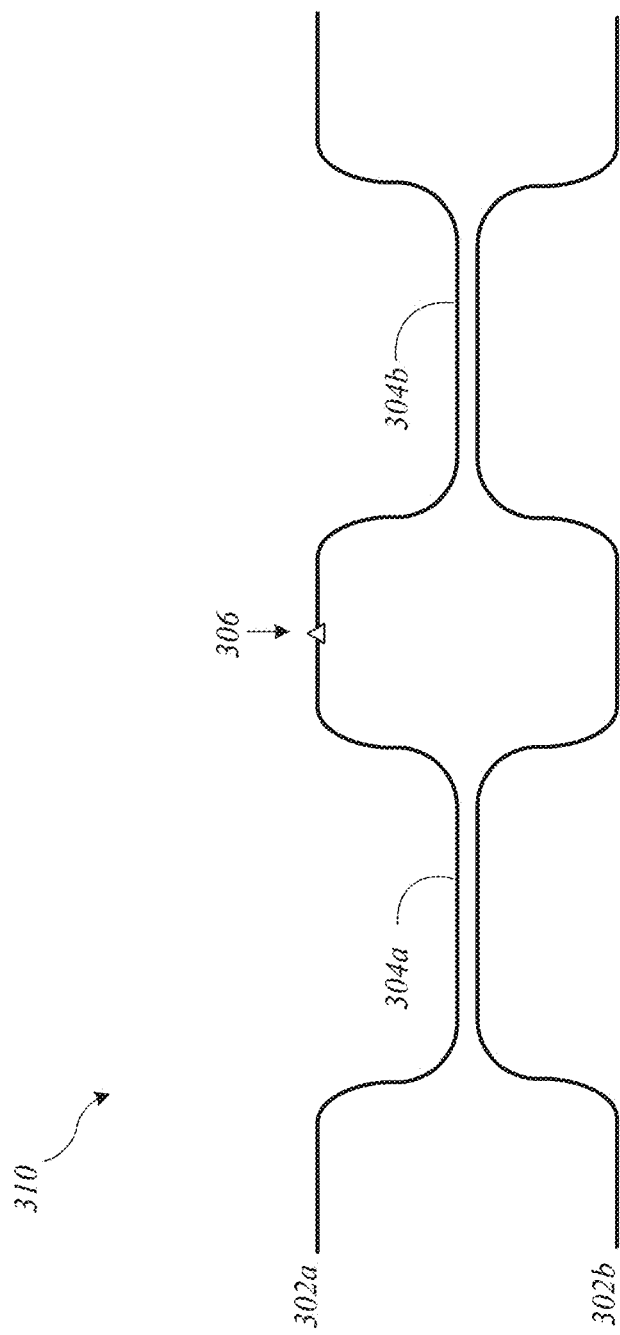

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
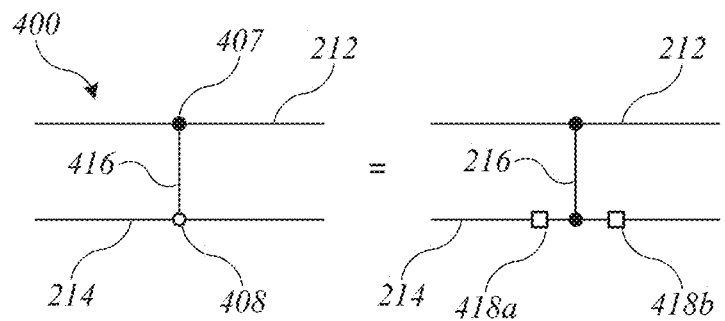
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}} \begin{pmatrix} 1 & 1 \\ 1 & -1 \end{pmatrix}. \tag{15}$$

Thus, mode coupler 400 applies the following mappings:

$$|10\rangle \mapsto \frac{|10\rangle + |01\rangle}{\sqrt{2}} \tag{16}$$

$$|01\rangle \mapsto \frac{|10\rangle - |01\rangle}{\sqrt{2}}$$

$$|11\rangle \mapsto \frac{1}{2}(|20\rangle + |02\rangle).$$

Figure 4B:
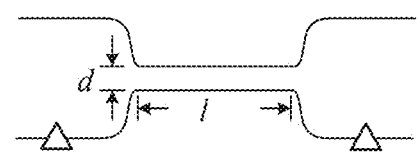
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418a, 418b). Thus, the transfer matrix $T_r$ can be implemented by the physical beam splitter shown in FIG. 4B, where the open triangles represent +i phase shifters.

Figure 5:
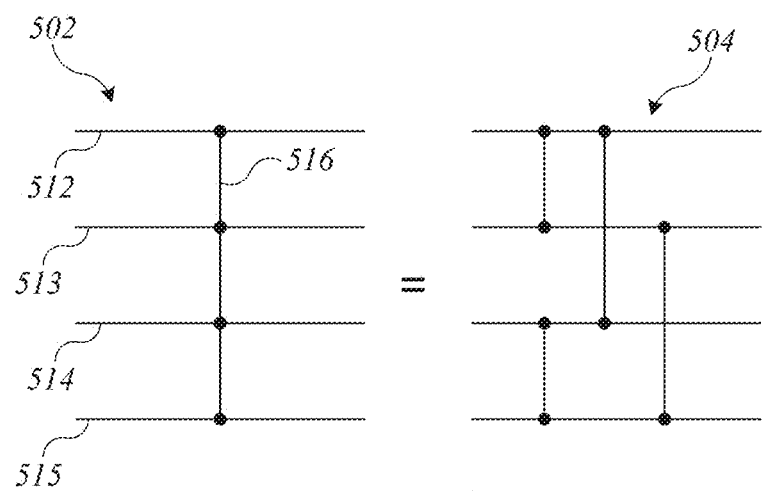
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
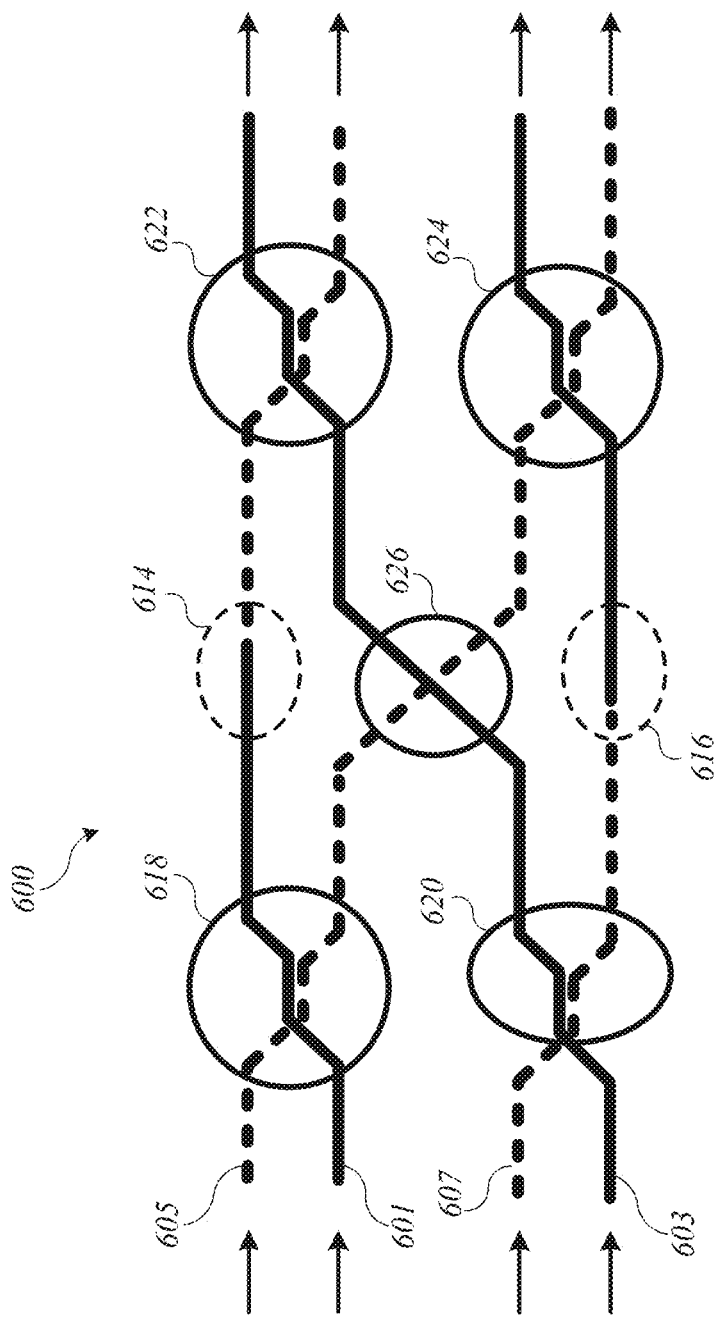
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
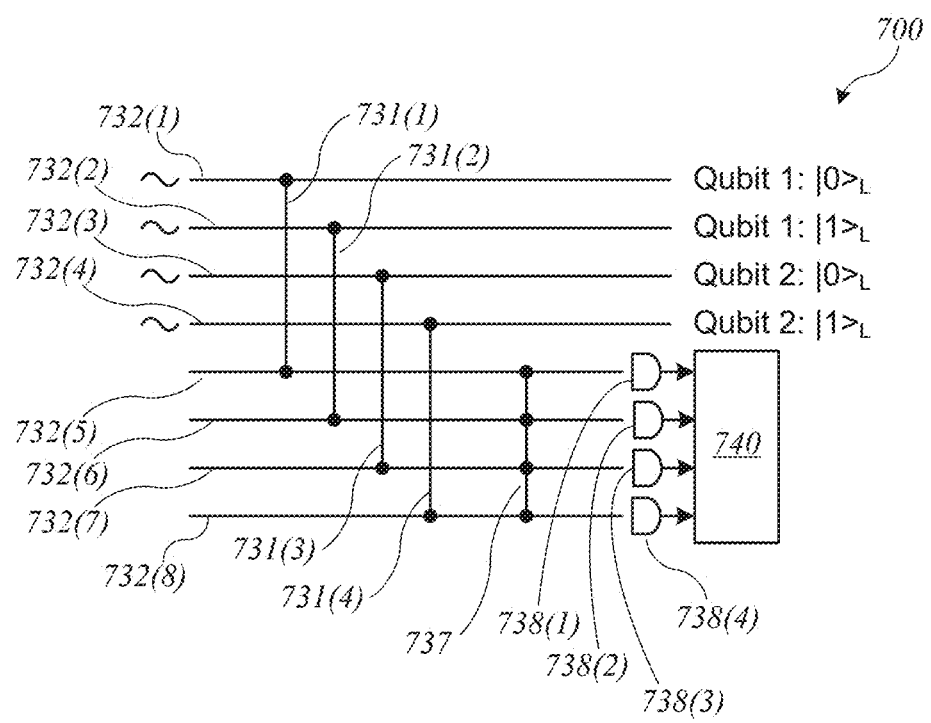
FIG. 7 shows a circuit diagram for a dual-rail-encoded Bell state generator that can be used in some embodiments.

In some embodiments, entangled states of multiple photonic qubits can be created by coupling modes of two (or more) qubits and performing measurements on other modes. By way of example, FIG. 7 shows a circuit diagram for a Bell state generator 700 that can be used in some dual-rail-encoded photonic embodiments. In this example, modes 732(1)-732(4) are initially each occupied by a photon (indicated by a wavy line); modes 732(5)-732(8) are initially vacuum modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731(1)-731(4). Thereafter, a mode-information erasure coupling (e.g., implementing a four-mode mode spreading transform as shown in FIG. 5) is performed on four of the modes (modes 732(5)-732(8)), as shown by mode coupler 737. Modes 732(5)-732(8) act as "heralding" modes that are measured and used to determine whether a Bell state was successfully generated on the other four modes 732(1)-732(4). For instance, detectors 738(1)-738(4) can be coupled to the modes 732(5)-732(8) after second-order mode coupler 737. Each detector 738(1)-738(4) can output a classical data signal (e.g., a voltage level on a conductor) indicating whether it detected a photon (or the number of photons detected). These outputs can be coupled to classical decision logic circuit 740, which determines whether a Bell state is present on the other four modes 732(1)-732(4). For example, decision logic circuit 740 can be configured such that a Bell state is confirmed (also referred to as "success" of the Bell state generator) if and only if a single photon was detected by each of exactly two of detectors 738(1)-738(4). Modes 732(1)-732(4) can be mapped to the logical states of two qubits (Qubit 1 and Qubit 2), as indicated in FIG. 7. Specifically, in this example, the logical state of Qubit 1 is based on occupancy of modes 732(1) and 732(2), and the logical state of Qubit 2 is based on occupancy of modes 732(3) and 732(4). It should be noted that the operation of Bell state generator 700 can be non-deterministic; that is, inputting four photons as shown does not guarantee that a Bell state will be created on modes 732(1)-732(4). In one implementation, the probability of success is 4/32.

In some embodiments, it is desirable to form cluster states of multiple entangled qubits (typically 3 or more qubits, although the Bell state can be understood as a cluster state of two qubits). One technique for forming larger entangled systems is through the use of an entangling measurement, which is a projective measurement that can be employed to create entanglement between systems of qubits. As used herein, "fusion" (or "a fusion operation" or "fusing") refers to a two-qubit entangling measurement. A "fusion gate" is a structure that receives two input qubits, each of which is typically part of an entangled system. The fusion gate performs a projective measurement operation on the input qubits that produces either one ("type I fusion") or zero ("type II fusion") output qubits in a manner such that the initial two entangled systems are fused into a single entangled system. Fusion gates are specific examples of a general class of two-qubit entangling measurements and are particularly suited for photonic architectures. Examples of type I and type II fusion gates will now be described.

Figure 8A:
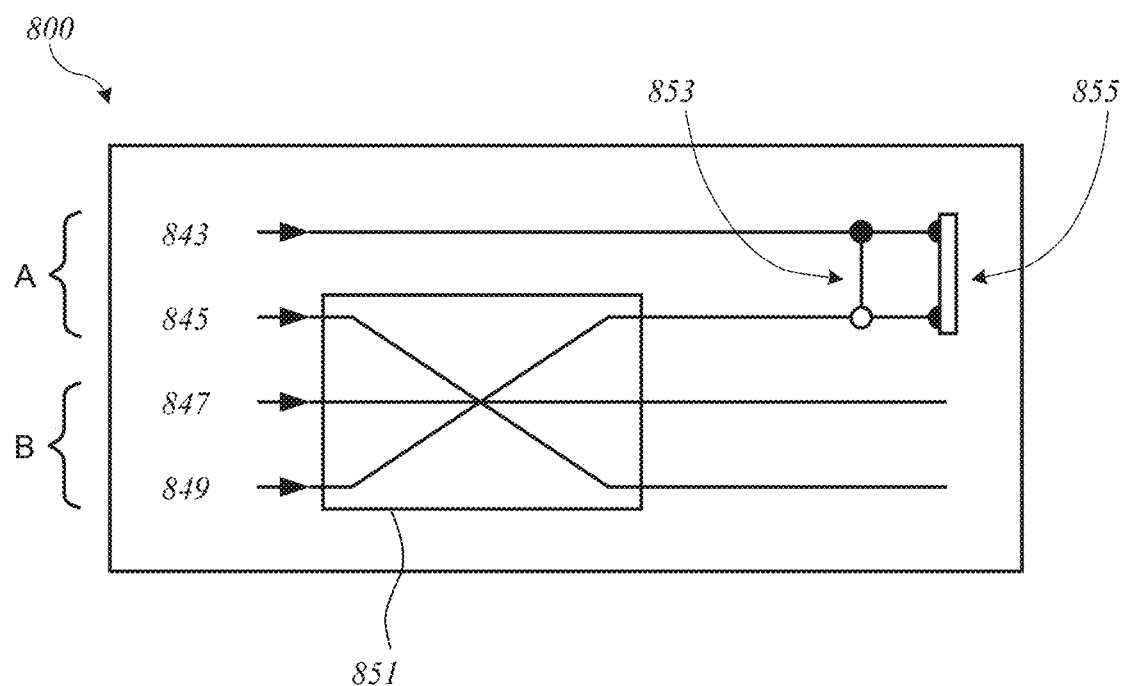
FIG. 8A shows a circuit diagram for a dual-rail-encoded type I fusion gate that can be used in some embodiments.

FIG. 8A shows a circuit diagram illustrating a type I fusion gate 800 in accordance with some embodiments. The diagram shown in FIG. 8A is schematic with each horizontal line representing a mode of a quantum system, e.g., a photon. In a dual-rail encoding, each pair of modes represents a qubit. In a photonic implementation of the gate the modes in diagrams such as that shown in FIG. 8A can be physically realized using single photons in photonic waveguides. Most generally, a type I fusion gate like that shown in FIG. 8A takes qubit A (physically realized, e.g., by photon modes 843 and 845) and qubit B (physically realized, e.g., by photon modes 847 and 849) as input and outputs a single "fused" qubit that inherits the entanglement with other qubits that were previously entangled with either (or both) of input qubit A or input qubit B.

Figure 8B:
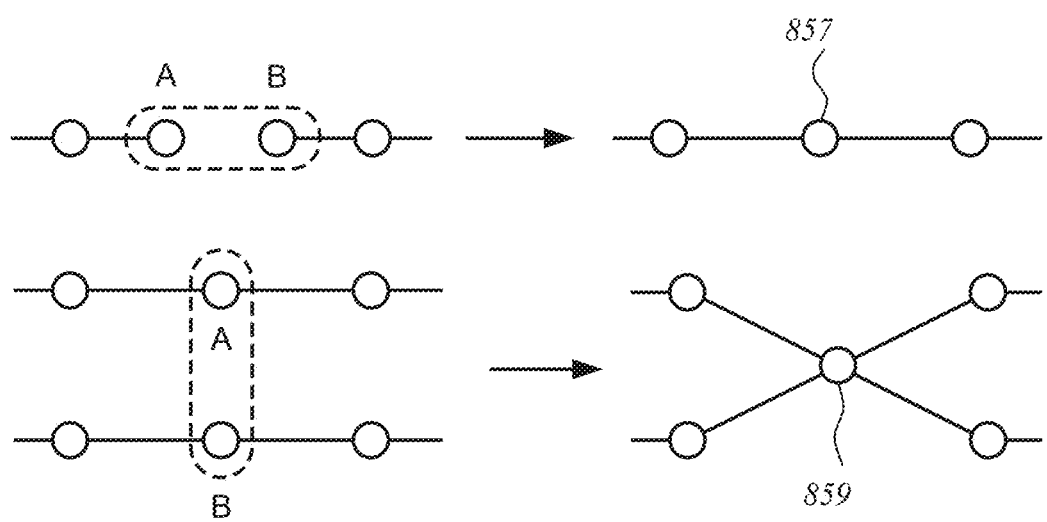
FIG. 8B shows example results of type I fusion operations using the gate of FIG. 8A.

For example, FIG. 8B shows the result of type-I fusing of two qubits A and B that are each, respectively, a qubit located at the end (i.e., a leaf) of some longer entangled cluster state (only a portion of which is shown). The qubit 857 that remains after the fusion operation inherits the entangling bonds from the original qubits A and B thereby creating a larger linear cluster state. FIG. 8B also shows the result of type-I fusing of two qubits A and B that are each, respectively, an internal qubit that belongs to some longer entangled cluster of qubits (only a portion of which is shown). As before, the qubit 859 that remains after fusion inherits the entangling bonds from the original qubits A and B thereby creating a fused cluster state. In this case, the qubit that remains after the fusion operation is entangled with the larger cluster by way of four other nearest neighbor qubits as shown.

Returning to the schematic illustration of type I fusion gate 800 shown in FIG. 8A, qubit A is dual-rail encoded by modes 843 and 845, and qubit B is dual-rail encoded by modes 847 and 849. For example, in the case of path-encoded photonic qubits, the logical zero state of qubit A (denoted $|0\rangle_A$) occurs when mode 843 is a photonic waveguide that includes a single photon and mode 845 is a photonic waveguide that includes zero photons (and likewise for qubit B). Thus, type I fusion gate 800 can take as input two dual-rail-encoded photon qubits thereby resulting in a total of four input modes (e.g., modes 843, 845, 847, and 849). To accomplish the fusion operation, a mode coupler (e.g., 50/50 beam splitter) 853 is applied between a mode of each of the input qubits, e.g., between mode 843 and mode 849 before performing a detection operation on both modes using photon detectors 855 (which includes two distinct photon detectors coupled to modes 843 and 849 respectively). In addition, to ensure that the output modes are adjacently positioned, a mode swap operation 851 can be applied that swaps the position of the second mode of qubit A (mode 845) with the position the second mode of qubit B (mode 849). In some embodiments, mode swapping can be accomplished through a physical waveguide crossing as described above or by one or more photonic switches or by any other type of physical mode swap.

FIG. 8A shows only an example arrangement for a type I fusion gate and one of ordinary skill will appreciate that the position of the mode coupler and the presence of the mode swap region 851 can be altered without departing from the scope of the present disclosure. For example, beam splitter 853 can be applied between modes 845 and 847. Mode swaps are optional and are not necessary if qubits having non-adjacent modes can be dealt with, e.g., by tracking which modes belong to which qubits by storing this information in a classical memory.

Type I fusion gate 800 is a nondeterministic gate, i.e., the fusion operation succeeds with a certain probability less than 1, and in other cases the quantum state that results is not a larger cluster state that comprises the original cluster states fused together to a larger cluster state. More specifically, gate 800 "succeeds," with probability 50%, when only one photon is detected by detectors 855, and "fails" if zero or two photons are detected by detectors 855. When the gate succeeds, the two cluster states that qubits A and B were a part of become fused into a single larger cluster state with a fused qubit remaining as the qubit that links the two previously unlinked cluster states (see, e.g., FIG. 8B). However, when the fusion gate fails, it has the effect of removing both qubits from the original cluster resource states without generating a larger fused state.

Figure 9A:
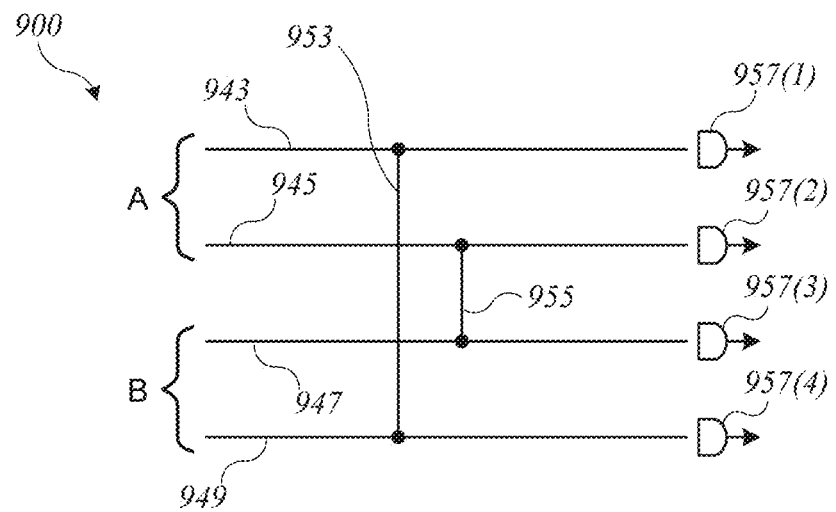
FIG. 9A shows a circuit diagram for a dual-rail-encoded type II fusion gate that can be used in some embodiments.

FIG. 9A shows a circuit diagram illustrating a type II fusion gate 900 in accordance with some embodiments. Like other diagrams herein, the diagram shown in FIG. 9A is schematic with each horizontal line representing a mode of a quantum system, e.g., a photon. In a dual-rail encoding, each pair of modes represents a qubit. In a photonic implementation of the gate the modes in diagrams such as that shown in FIG. 9A can be physically realized using single photons in photonic waveguides. Most generally, a type II fusion gate such as gate 900 takes qubit A (physically realized, e.g., by photon modes 943 and 945) and qubit B (physically realized, e.g., by photon modes 947 and 949) as input and outputs a quantum state that inherits the entanglement with other qubits that were previously entangled with either (or both) of input qubit A or input qubit B. (For type II fusion, if the input quantum state had N qubits, the output quantum state has N-2 qubits. This is different from type I fusion where an input quantum state of N qubits leads to an output quantum state having N-1 qubits.)

Figure 9B:
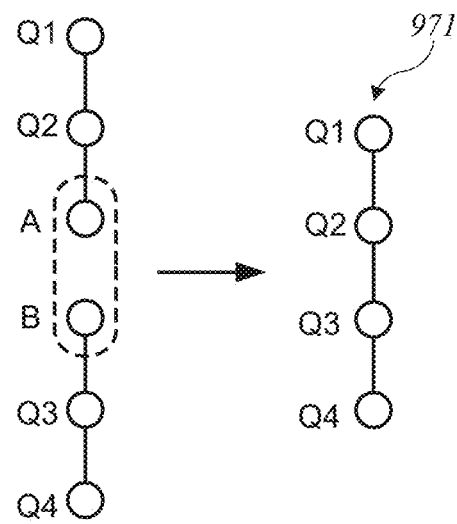
FIG. 9B shows an example result of a type II fusion operation using the gate of FIG. 9A.

For example, FIG. 9B shows the result of type-II fusing of two qubits A and B that are each, respectively, a qubit located at the end (i.e., a leaf) of some longer entangled cluster state (only a portion of which is shown). The resulting qubit system 971 inherits the entanglement bonds from qubits A and B thereby creating a larger linear cluster state.

Returning to the schematic illustration of type II fusion gate 900 shown in FIG. 9A, qubit A is dual-rail encoded by modes 943 and 945, and qubit B is dual-rail encoded by modes 947 and 949. For example, in the case of path encoded photonic qubits, the logical zero state of qubit A (denoted $|0\rangle_A$) occurs when mode 943 is a photonic waveguide that includes a single photon and mode 945 is a photonic waveguide that includes zero photons (and likewise for qubit B). Thus, type II fusion gate 900 takes as input two dual-rail-encoded photon qubits thereby resulting in a total of four input modes (e.g., modes 943, 945, 947, and 949). To accomplish the fusion operation, a first mode coupler (e.g., 50/50 beam splitter) 953 is applied between a mode of each of the input qubits, e.g., between mode 943 and mode 949, and a second mode coupler (e.g., 50/50 beam splitter) 955 is applied between the other modes of each of the input qubits, e.g., between modes 945 and 947. A detection operation is performed on all four modes using photon detectors 957(1)-957(4). In some embodiments, mode swap operations (not shown in FIG. 9A) can be performed to place modes in adjacent positions prior to mode coupling. In some embodiments, mode swapping can be accomplished through a physical waveguide crossing as described above or by one or more photonic switches or by any other type of physical mode swap. Mode swaps are optional and are not necessary if qubits having non-adjacent modes can be dealt with, e.g., by tracking which modes belong to which qubits by storing this information in a classical memory.

FIG. 9A shows only an example arrangement for the type II fusion gate and one of ordinary skill will appreciate that the positions of the mode couplers and the presence or absence of mode swap regions can be altered without departing from the scope of the present disclosure.

The type II fusion gate shown in FIG. 9A is a nondeterministic gate, i.e., the fusion operation succeeds with a certain probability less than 1, and in other cases the quantum state that results is not a larger cluster state that comprises the original cluster states fused together to a larger cluster state. More specifically, the gate "succeeds" in the case where one photon is detected by one of detectors 957(1) and 957(4) and one photon is detected by one of detectors 957(2) and 957(3); in all other cases, the gate "fails." When the gate succeeds, the two cluster states that qubits A and B were a part of become fused into a single larger cluster state; unlike type-I fusion, no fused qubit remains (compare FIG. 8B and FIG. 9B). When the fusion gate fails, it has the effect of removing both qubits from the original cluster resource states without generating a larger fused state.

Figure 10:
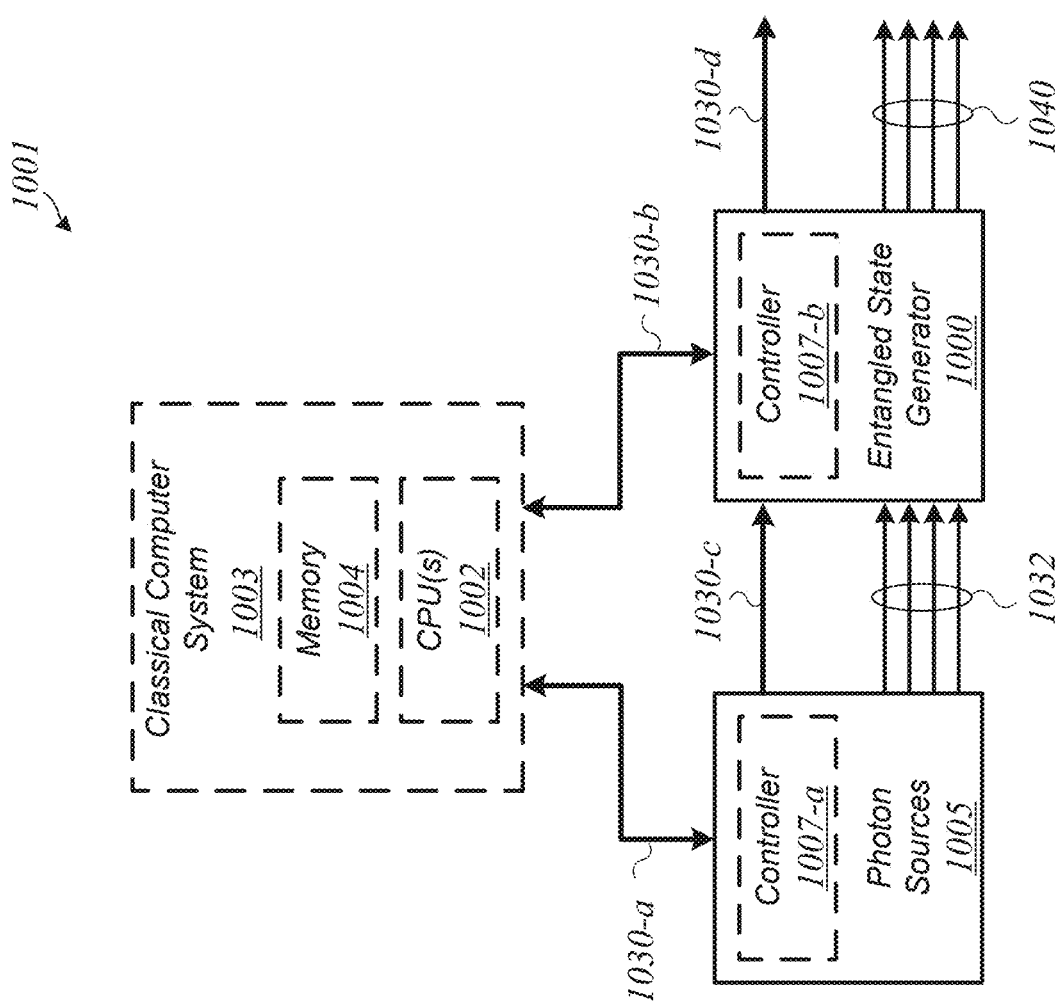
FIG. 10 illustrates an example of a qubit entangling system in accordance with some embodiments.

FIG. 10 illustrates an example of a qubit entangling system 1001 in accordance with some embodiments. Such a system can be used to generate qubits (e.g., photons) in an entangled state (e.g., a GHZ state, Bell pair, and the like), in accordance with some embodiments.

In an illustrative photonic architecture, qubit entangling system 1001 can include a photon source module 1005 that is optically connected to entangled state generator 1000. Both the photon source module 1005 and the entangled state generator 1000 may be coupled to a classical processing system 1003 such that the classical processing system 1003 can communicate and/or control (e.g., via the classical information channels 1030a-b) the photon source module 1005 and/or the entangled state generator 1000. Photon source module 1005 may include a collection of single-photon sources that can provide output photons to entangled state generator 1000 by way of interconnecting waveguides 1032. Entangled state generator 1000 may receive the output photons and convert them to one or more entangled photonic states and then output these entangled photonic states into output waveguides 1040. In some embodiments, output waveguide 1040 can be coupled to some downstream circuit that may use the entangled states for performing a quantum computation. For example, the entangled states generated by the entangled state generator 1000 may be used as resources for a downstream quantum optical circuit (not shown).

In some embodiments, system 1001 may include classical channels 1030 (e.g., classical channels 1030-*a* through 1030-*d*) for interconnecting and providing classical information between components. It should be noted that classical channels 1030-*a* through 1030-*d* need not all be the same. For example, classical channel 1030-*a* through 1030-*c* may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 1001 includes the classical computer system 1003 that communicates with and/or controls the photon source module 1005 and/or the entangled state generator 1000. For example, in some embodiments, classical computer system 1003 can be used to configure one or more circuits, e.g., using system clock that may be provided to photon sources 1005 and entangled state generator 1000 as well as any downstream quantum photonic circuits used for performing quantum computation. In some embodiments, the quantum photonic circuits can include optical circuits, electrical circuits, or any other types of circuits. In some embodiments, classical computer system 1003 includes memory 1004, one or more processor(s) 1002, a power supply, an input/output (I/O) subsystem, and a communication bus or interconnecting these components. The processor(s) 1002 may execute modules, programs, and/or instructions stored in memory 1004 and thereby perform processing operations.

In some embodiments, memory 1004 stores one or more programs (e.g., sets of instructions) and/or data structures. For example, in some embodiments, entangled state generator 1000 can attempt to produce an entangled state over successive stages, any one of which may be successful in producing an entangled state. In some embodiments, memory 1004 stores one or more programs for determining whether a respective stage was successful and configuring the entangled state generator 1000 accordingly (e.g., by configuring entangled state generator 1000 to switch the photons to an output if the stage was successful, or pass the photons to the next stage of the entangled state generator 1000 if the stage was not yet successful). To that end, in some embodiments, memory 1004 stores detection patterns (described below) from which the classical computing system 1003 may determine whether a stage was successful. In addition, memory 1004 can store settings that are provided to the various configurable components (e.g., switches) described herein that are configured by, e.g., setting one or more phase shifts for the component.

In some embodiments, some or all of the above-described functions may be implemented with hardware circuits on photon source module 1005 and/or entangled state generator 1000. For example, in some embodiments, photon source module 1005 includes one or more controllers 1007-*a* (e.g., logic controllers) (e.g., which may comprise field programmable gate arrays (FPGAs), application specific integrated circuits (ASICS), a "system on a chip" that includes classical processors and memory, or the like). In some embodiments, controller 1007-*a* determines whether photon source module 1005 was successful (e.g., for a given attempt on a given clock cycle, described below) and outputs a reference signal indicating whether photon source module 1005 was successful. For example, in some embodiments, controller 1007-*a* outputs a logical high value to classical channel 1030-*a* and/or classical channel 1030-*c* when photon source module 1005 is successful and outputs a logical low value to classical channel 1030-*a* and/or classical channel 1030-*c* when photon source module 1005 is not successful. In some embodiments, the output of control 1007-*a* may be used to configure hardware in controller 1007-*b*.

Similarly, in some embodiments, entangled state generator 1000 includes one or more controllers 1007-*b* (e.g., logical controllers) (e.g., which may comprise field programmable gate arrays (FPGAs), application specific integrated circuits (ASICS), or the like) that determine whether a respective stage of entangled state generator 1000 has succeeded, perform the switching logic described above, and output a reference signal to classical channels 1030-*b* and/or 1030-*d* to inform other components as to whether the entangled state generator 400 has succeeded.

In some embodiments, a system clock signal can be provided to photon source module 1005 and entangled state generator 1000 via an external source (not shown) or by classical computing system 1003 generates via classical channels 1030-*a* and/or 1030-*b*. In some embodiments, the system clock signal provided to photon source module 1005 triggers photon source module 1005 to attempt to output one photon per waveguide. In some embodiments, the system clock signal provided to entangled state generator 1000 triggers, or gates, sets of detectors in entangled state generator 1000 to attempt to detect photons. For example, in some embodiments, triggering a set of detectors in entangled state generator 1000 to attempt to detect photons includes gating the set of detectors.

It should be noted that, in some embodiments, photon source module 1005 and entangled state generator 1000 may have internal clocks. For example, photon source module 1005 may have an internal clock generated and/or used by controller 1007-*a* and entangled state generator 1000 has an internal clock generated and/or used by controller 1007-*b*. In some embodiments, the internal clock of photon source module 1005 and/or entangled state generator 1000 is synchronized to an external clock (e.g., the system clock provided by classical computer system 1003) (e.g., through a phase-locked loop). In some embodiments, any of the internal clocks may themselves be used as the system clock, e.g., an internal clock of the photon source may be distributed to other components in the system and used as the master/system clock.

In some embodiments, photon source module 1005 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

For the sake of illustration, an example which employs spatial multiplexing of several non-deterministic is described as an example of a MUX photon source. However, many different spatial MUX architectures are possible without departing from the scope of the present disclosure. Temporal MUXing can also be implemented instead of or in combination with spatial multiplexing. MUX schemes that employ log-tree, generalized Mach-Zehnder interferometers, multimode interferometers, chained sources, chained sources with dump-the-pump schemes, asymmetric multicrystal single photon sources, or any other type of MUX architecture can be used. In some embodiments, the photon source can employ a MUX scheme with quantum feedback control and the like.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

In some embodiments, an entangled system of multiple physical qubits can be mapped to one or more "logical qubits," and operations associated with a quantum computation can be defined as logical operations on logical qubits, which in turn can be mapped to physical operations on physical qubits. In general, the term "qubit," when used herein without specifying physical or logical qubit, should be understood as referring to a physical qubit.

2. Overview of Fusion-Based Quantum Computing (FBQC)

"Quantum computation," as used herein, refers generally to performing a sequence of operations (a "computation") on an ensemble of qubits. Quantum computation is often considered in the framework of "circuit-based quantum computation" (CBQC), in which the operations are specified as a sequence of logical "gates" performed on qubits. Gates can be either single-qubit unitary operations (rotations), two-qubit entangling operations such as the CNOT gate, or other multi-qubit gates such as the Toffoli gate.

One challenge for CBQC, and for quantum computation generally, is that physical systems implementing qubits and operations on qubits are often non-deterministic and noisy. For example, the photonic Bell state generator and fusion circuits described above can create entanglement between photonic qubits, but they do so non-deterministically, with a probability of success that is considerably less than 1. In addition, the physical systems may be "noisy"; for instance, a waveguide propagating a photon may be somewhat less than perfectly efficient, resulting in occasional loss of photons. For reasons such as these, fault tolerant quantum computing is a desirable goal.

"Measurement-based quantum computation" (MBQC) is an approach to implementing quantum computing that allows for fault-tolerance. In MBQC, computation proceeds by first preparing a particular entangled state of many qubits, commonly referred to as a "cluster state," then carrying out a series of single-qubit measurements to enact (or execute) the quantum computation. In this approach, the cluster state can be prepared in a manner that is not specific to a particular computation (other than, perhaps, the size of the cluster state), and the choice of single-qubit measurements is determined by the particular computation. In the MBQC approach, fault tolerance can be achieved by careful design of the cluster state and using the topology of this cluster state to encode logical qubits that is protected against any logical errors that may be caused by errors on any of the physical qubits that make up the cluster state. For instance, rather than implementing a sequence of gates operating on one or two physical qubits, a subset of the physical qubits in the cluster state can be mapped to a "logical" qubit, and a gate operation on logical qubits can be mapped to a particular set of measurements on physical qubits associated with one or more logical qubits. Entanglement between the physical qubits results in expected correlations among measurements on different physical qubits, which enables error correction. In practice, the value of the logical qubit can be determined, i.e., read out, based on the results (also referred to herein as measurement outcomes) of the single-particle measurements that are made on the cluster state's physical qubits as the computation proceeds. However, the generation and maintenance of long-range entanglement across the cluster state and subsequent storage of large cluster states can be a challenge. For example, for any physical implementation of the MBQC approach, a cluster state containing many thousands, or more, of mutually entangled qubits must be prepared and then stored for some period of time before the single-qubit measurements are performed.

"Fusion-based quantum computing" (FBQC) is a technique related to MBQC in that a computation on a set of logical qubits can be defined as a set of measurements on a (generally much larger) number of physical qubits, with correlations among measurement results on the physical qubits enabling error correction. FBQC, however, avoids the need to first create, then subsequently manipulate, a large cluster state. In a photonic implementation of FBQC, entangled states consisting of a few physical qubits (referred to as "resource states") are periodically generated and transported (via waveguides) to circuits that can perform measurement operations (e.g., type II fusion operations as described above, which can provide two-qubit measurements, and/or single-qubit measurements). The measurements destroy the measured qubits; however, the quantum information is preserved as it is transferred (teleported) to other qubits of other resource states. Thus, quantum information is not stored in a static array of physical qubits but is instead periodically teleported to freshly generated physical qubits.

In FBQC, somewhat similarly to MBQC, a computation can be mapped to an undirected graph, referred to as a fusion graph, that can have a lattice-like structure. The fusion graph can define operations to be performed on the physical qubits of the resource states, including fusion operations on selected qubits of different resource states (in the "bulk" region of a lattice) and individual qubit measurements (at boundaries of the lattice). Examples of FBQC techniques are described in Appendix I. What follows is a conceptual description of FBQC, to provide context for interleaving modules and other hardware components described below.

As noted, FBQC can use a "resource state" as a basic physical element to implement quantum computations. As used herein, a "resource state" refers to an entangled system of a number (n) of physical qubits in a non-separable entangled state (which is an entangled state that cannot be decomposed into smaller separate entangled states). In various embodiments, the number n can be a small number (e.g., between 3 and 30), although larger numbers are not precluded.

Figure 11:
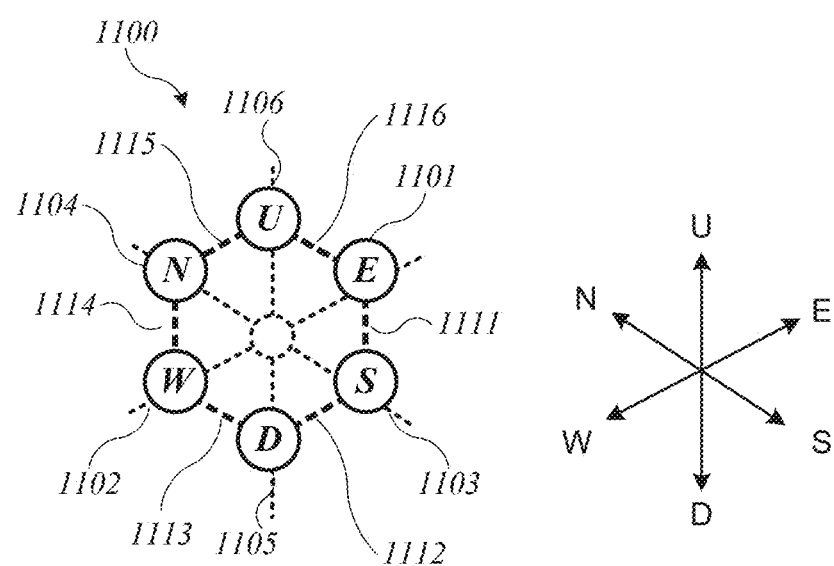
FIG. 11 shows an example of a resource state that can be used in some embodiments.

FIG. 11 shows a graph representation of a resource state 1100 that can be used according to some embodiments. In the graph representation of FIG. 11, each physical qubit 1101-1106 is represented as a dot, and entanglement between physical qubits is represented by lines 1111-1116 connecting pairs of dots. Resource state 1100 is sometimes referred to as a "6-ring" resource state. In examples used herein, the entanglement geometry defines a three-dimensional space. For convenience, the cardinal directions in the entanglement space are referred to as North-South (N-S), East-West (E-W), and Up-Down (U-D). Resource state 1100 has one qubit associated with each cardinal direction (N, S, U, D, E, W) in the entanglement space. It should be understood that the directional labels refer to entanglement space and need not correspond to physical dimensions or directions in physical space. Further, in some instances qubits may be separated in time rather than in spatial dimensions. For example, each physical qubit can be implemented using photons propagating in waveguides, and a particular section of waveguide may propagate photons associated with different qubits at different times.

Resource state 1100 is illustrative and not limiting. In some embodiments, the entanglement geometry of a resource state can be chosen based on a particular computation to be executed, and different resource states that are used in the same computation can have different entanglement geometries. Further, while resource state 1100 includes six qubits, the number of qubits in each resource state can also be varied. Accordingly, a resource state may be larger or smaller than the example shown.

Figure 12A:
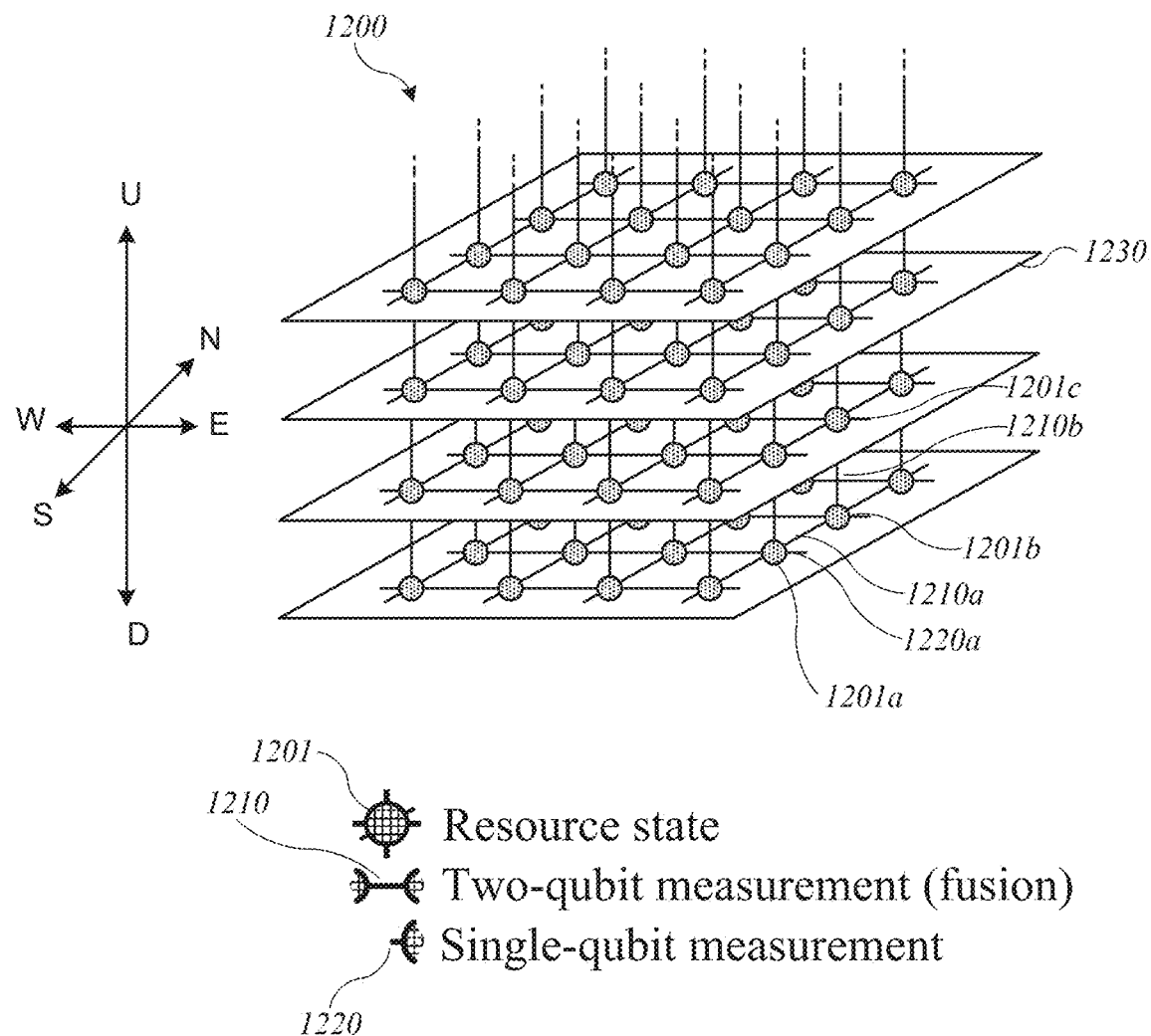
FIG. 12A shows an example of a fusion graph that can be used in some embodiments.

Operations to be performed on qubits of resource states in connection with FBQC can be represented conceptually using a fusion graph. FIG. 12A shows an example of a fusion graph 1200 according to some embodiments. The same three-dimensional entanglement space defined in FIG. 11 is used, with the same N-S, E-W, U-D naming convention (which need not correspond to any physical dimension or direction). However, unlike in FIG. 11, each vertex 1201 represents a resource state (e.g., 6-ring resource state 1100) rather than an individual qubit. Each vertex 1201 represents a physically distinct instance of the resource state. Each edge 1210 connecting two vertices 1201 corresponds to a fusion operation between qubits of different resource state. Each fusion operation can be, e.g., a type II fusion operation as described above that produces a two-qubit measurement. The particular qubits involved can be identified from the direction of the edges in the entanglement space. Thus, for example, edge 1210a corresponds to a fusion operation between the N qubit of a resource state represented by vertex 1201a and the S qubit of a (different) resource state represented by vertex 1201b, while edge 1210b corresponds to a fusion operation between the U qubit of the resource state represented by vertex 1201b and the D qubit of a (third) resource state represented by vertex 1201c. Each half-edge 1220 (a "half-edge" is connected to only one vertex 1201) represents a single-qubit measurement on the corresponding qubit of the resource state represented by that vertex 1201. Thus, for example, half-edge 1220a corresponds to a single-qubit measurement on the E qubit of the resource state represented by vertex 1201a.

In some embodiments, a fusion graph such as fusion graph 1200 can be viewed as a series of "layers" 1230, where each layer corresponds to a coordinate on the U-D axis. Implementing FBQC in a physical system can include successively generating layers in the direction from D to U and performing the fusion and single-qubit measurement operations within each layer as specified by the edges and half-edges of the graph for that layer. As successive layers are generated, fusion operations can be performed between the U qubits of one layer and the D qubits of resource states in corresponding position of the next layer. In the description that follows, fusion operations may be referred to as "space-like" or "timelike." This terminology is evocative of particular implementations in which different qubits or resource states are generated at different times: spacelike fusion can be performed between qubits generated at the same time using different instances of hardware, while timelike fusion can be performed between qubits generated at different times using the same instance of hardware (or different instances of hardware). For photonic qubits, timelike fusion can be implemented by delaying an earlier-produced qubit (e.g., using additional lengths of waveguide material to create a longer propagation path for the photon), thereby allowing mode coupling with a later-produced qubit. By leveraging timelike fusion, the same hardware can be used to generate multiple instances of the resource states within a layer and/or to generate multiple layers of resource states. Examples are described below.

In some encoding schemes for sequences of operations on logical qubits, a logical qubit that is "at rest" (i.e., not interacting with other logical qubits or otherwise being operated on) can be mapped onto a fusion graph having a regular lattice pattern as shown in FIG. 12A. For the 6-ring resource state of FIG. 11, each resource state in the bulk of the lattice has each of its six qubits fused with a qubit of a neighboring resource state. (Two qubits that are input to a type II fusion circuit are sometimes colloquially described as being "fused with" each other.) For instance, E qubit 1101 of a first instance of resource state 1100 and W qubit 1102 of a second instance of resource state 1100 can be input into a fusion circuit (e.g., the type II fusion circuit of FIG. 9A), resulting in a two-qubit measurement. At the boundaries of the lattice, qubits that are not subject to fusion operations can be subject to single-qubit measurements.

Logical operations on logical qubits can be specified by modifying the regular lattice pattern of a fusion graph at selected positions, e.g., by replacing single-qubit measurements with fusion operations or vice versa. The choice of modifications depends on the particular computation to be performed. Some examples will now be described.

Figure 12B:
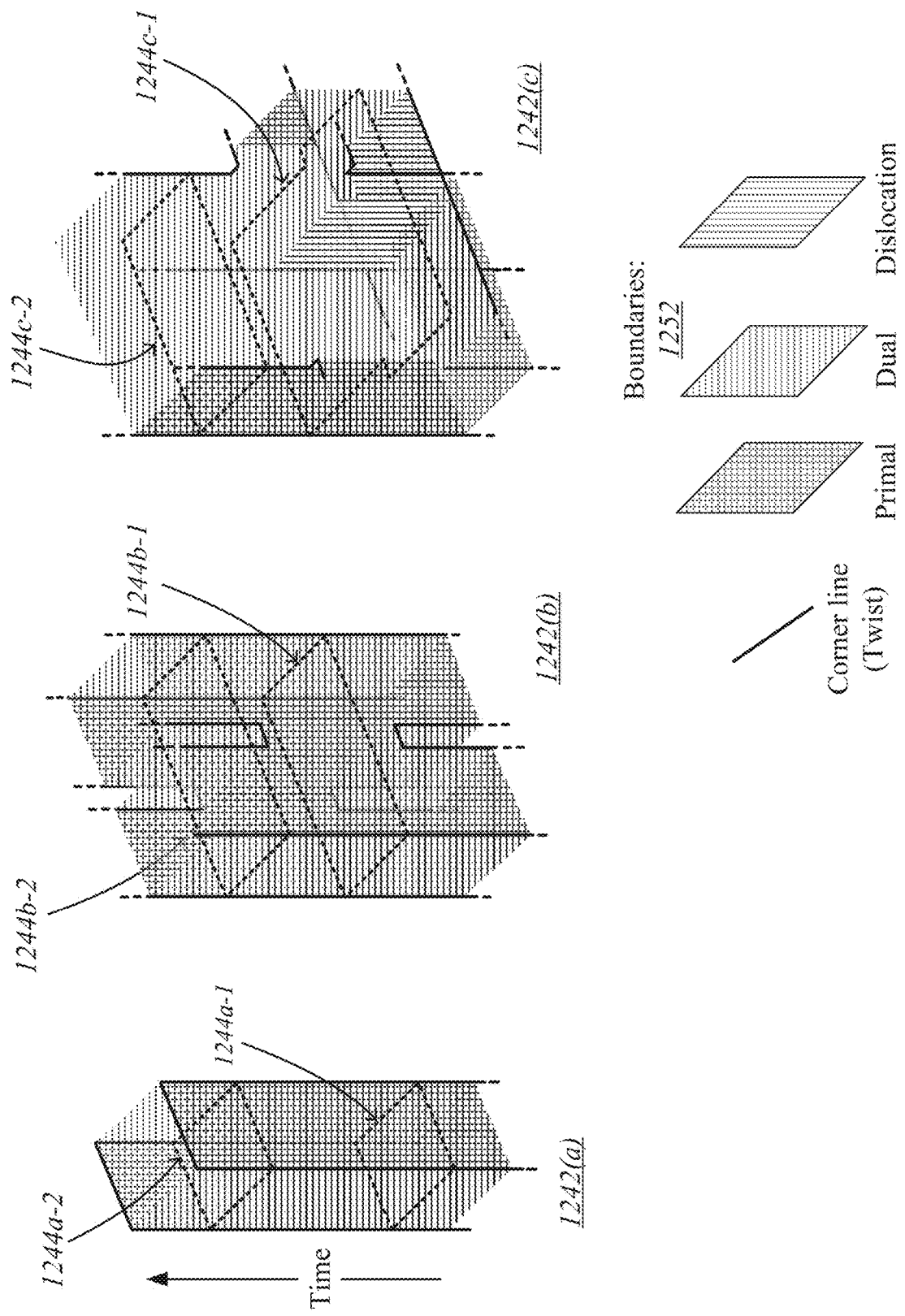
FIGS. 12B-12D shows examples of how fusion graphs (shown in FIG. 12D) can be generated from surface-code spacetime diagrams (shown in FIG. 12B) and time-slice diagrams (shown in FIG. 12C) for various logical operations on logical qubits.
Figure 12C:
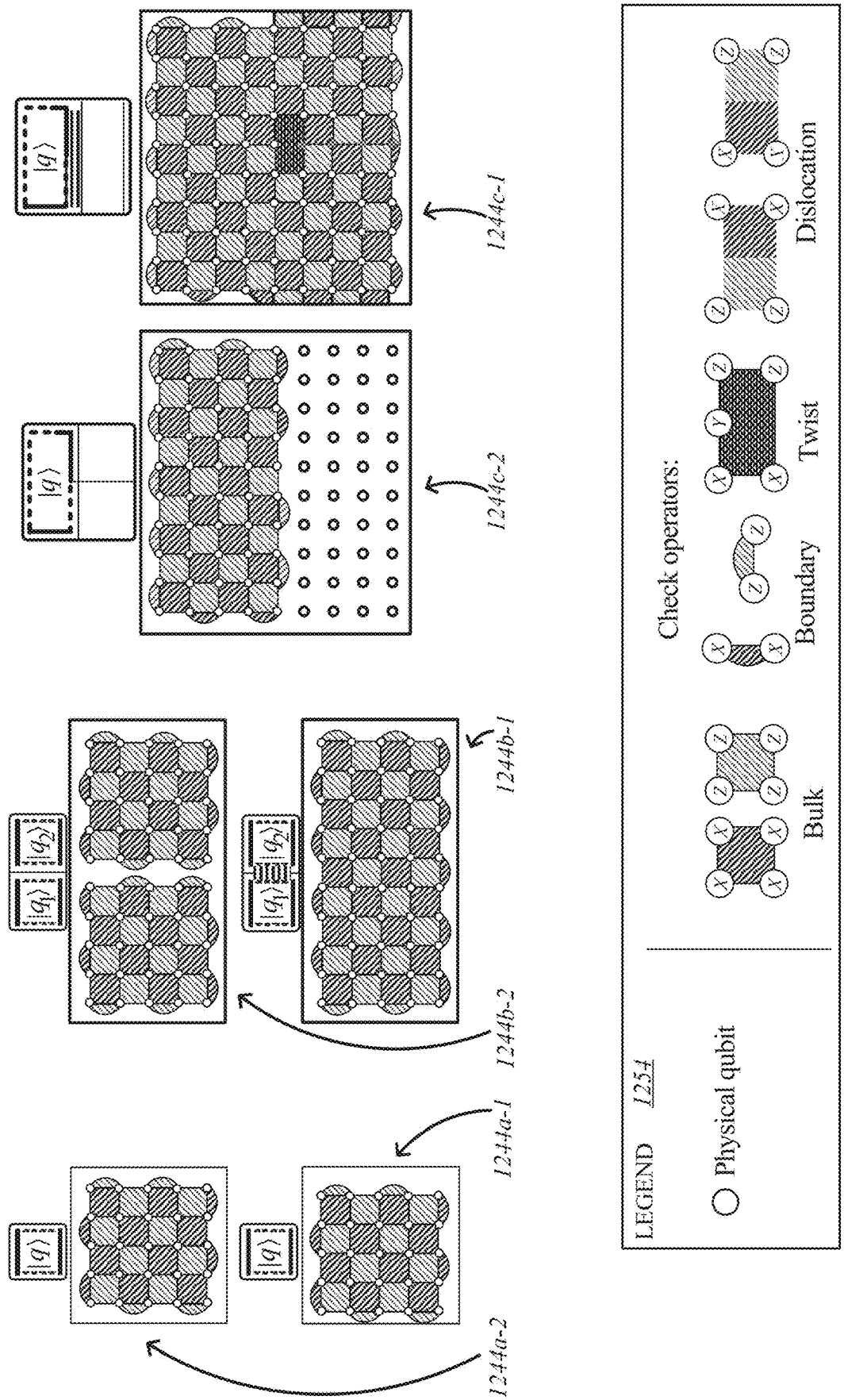
Figure 12D:
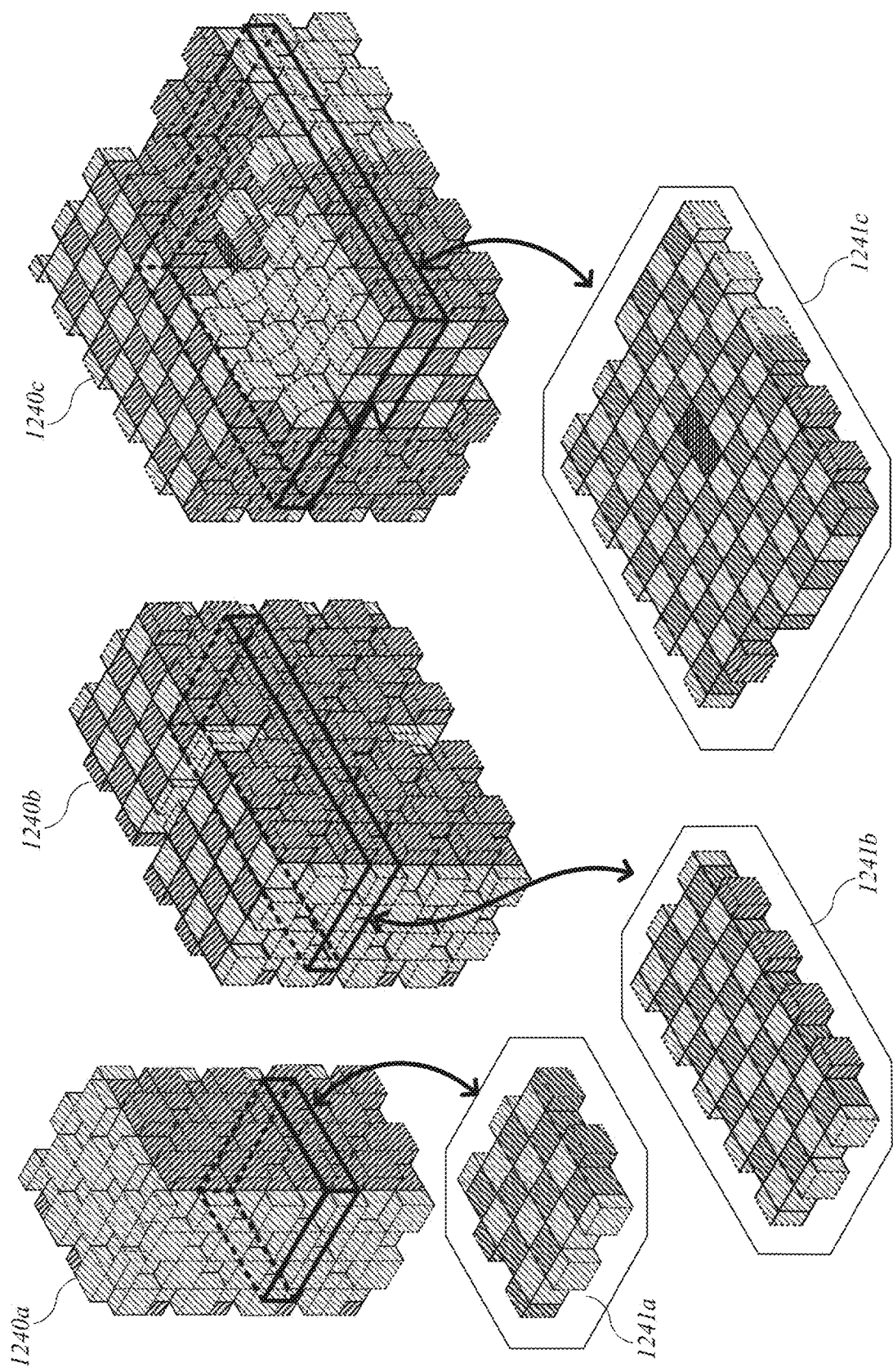
Figure 12E:
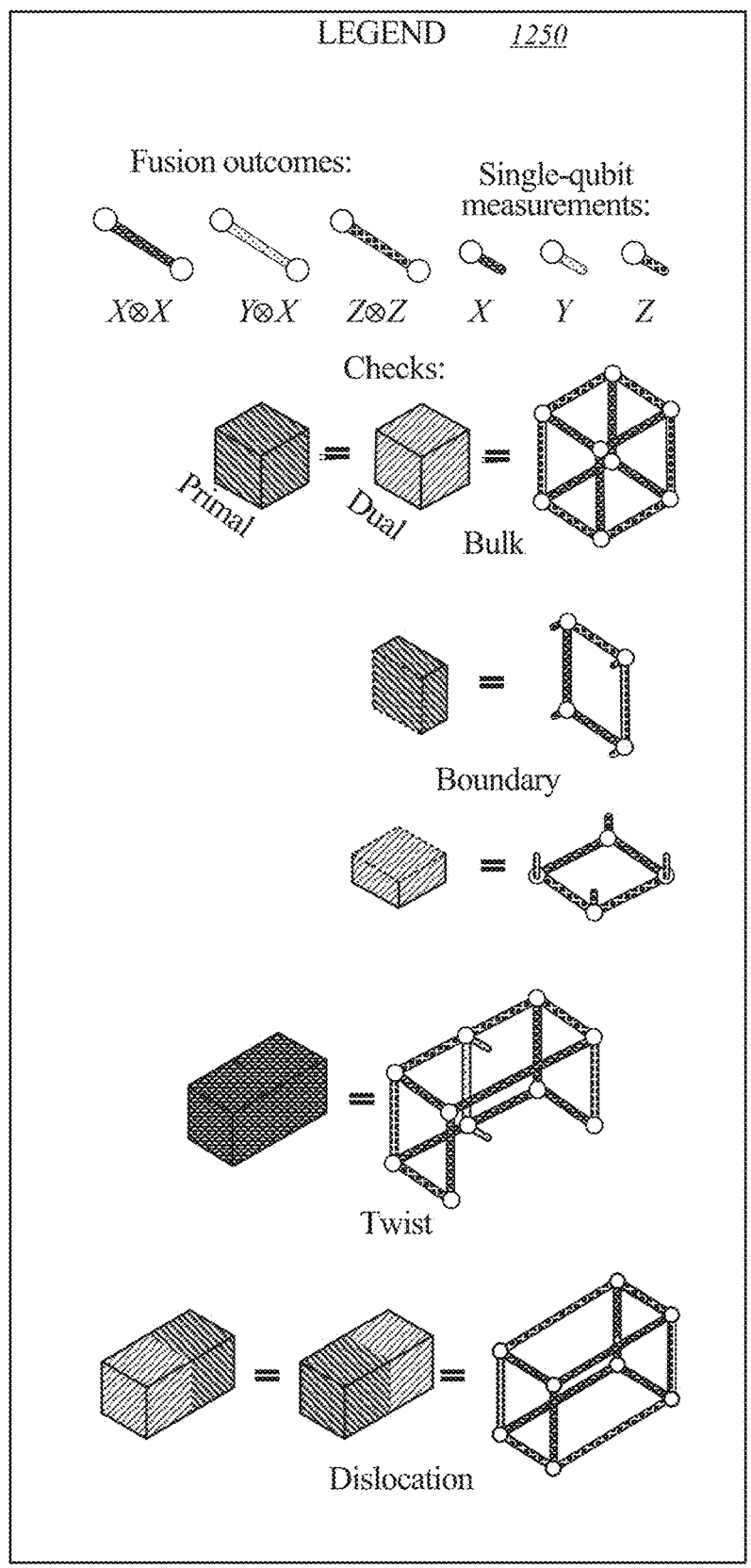
FIG. 12E shows a legend for the fusion-graph notation used in FIG. 12D.

In some embodiments, fusion graphs such fusion graph 1200 can be used to specify logical operations to be performed on a set of logical qubits. For example, a fusion graph for FBQC can be generated from a surface-code spacetime diagram as is used in CBQC. FIGS. 12B-12D show examples of how fusion graphs 1240(a)-1240(c) can be generated from surface-code spacetime diagrams 1242(a)-1242(c) for three different logical operations: (a) measurement of an idling logical qubit (i.e., a logical qubit that is not interacting with any other logical qubit; (b) two-qubit X⊗X measurements ("lattice surgery"); and (c) Y measurement with a twist. FIG. 12E shows a legend 1250 for the fusion-graph notation used in FIG. 12D.

FIG. 12B shows examples of surface-code spacetime diagrams 1242(a)-1242(c) that can be constructed using techniques known in the art. For instance, when performing fault-tolerant quantum computations with surface codes and CBQC, an entire quantum computation can proceed through a sequence of time slices (or time steps). At each time slice, a set of "check operator" measurements is performed, where the check operator measurements are measurements of operators on physical qubits that implement certain logical operations and enable the detection and correction of errors. The check operator measurements at a given time slice can be represented in a time-slice diagram such as time slice diagrams shown in FIG. 12C, which correspond to representative time slices of the spacetime diagrams in FIG. 12B as indicated: time slices 1244a-1 and 1244a-2 are selected from spacetime diagram 1242(a); time slices 1244b-1 and 1244b-2 are selected from spacetime diagram 1242(b); and time slices 1244c-1 and 1244c-2 are selected from spacetime diagram 1242(c). In all time slice diagrams 1244(a) 1244(c) of FIG. 12C, a square code distance of 5 is used, and a logical qubit is mapped to a square patch of 5×5 physical qubits to which check operators are applied. As shown in legend 1254, the check operators in each patch are four-qubit operators $X^{\otimes 4}$ and $Z^{\otimes 4}$ in the bulk and two-qubit operators $X^{\otimes 2}$ and $Z^{\otimes 2}$ at the boundaries, where X, Y, and Z are the Pauli operators on physical qubits. Dislocation and twist operators are also defined as illustrated. As shown in time-slice diagrams 1244a-1, 1244a-2, 1244b-1, 1244b-2, 1244c-1, and 1244c-2, the time slice can be drawn in a simplified manner that omits notation of the physical-qubit operators; the correct operators can be inferred from the pattern of light and dark shading according to the legend.

A quantum computation can be expressed as a sequence of time slices such as the time slices of FIG. 12C. However, it is often more convenient to represent a sequence of 2D time slices in a 3D diagram, referred to as a "surface-code spacetime diagram" (or just "spacetime diagram"). Spacetime diagrams for the logical operations (a), (b), and (c) are shown at 1242(a)-1242(c) in FIG. 12B, with time increasing in the direction shown. The solid black lines in a spacetime diagram trace the trajectory of patch corners through spacetime. Color-coded (orange (cross-hatched) and blue (horizontally hatched) in this example) surfaces track primal and dual boundaries through space time; the color-coding is indicated at legend 1252. A 2D spacelike cross section through a spacetime diagram 1242 corresponds to a time-slice diagram 1244, as indicated. The bulk has a regular pattern of primal and dual measurements (as seen in the time slice diagrams of FIG. 12C), so measurements in the bulk can be inferred from the boundaries. Also shown in FIG. 12B are corner lines indicating the twist operation (used in time slice 1244c-1) and associated dislocation of the boundary. Spacetime diagrams need not directly show the number of time slices (or the code distance) to which they correspond. Typically, though not necessarily, each change to the spatial configuration lasts for a number of time slices equal to the code distance.

For purposes of illustration, spacetime diagram 1242(a) shows a logical qubit that idles for a while until it is measured in the Z basis, as indicated by the corner lines and dual boundary capping off spacetime diagram 1242(a). Spacetime diagram 1242(b) corresponds to a logical two-qubit measurement X⊗X via "lattice surgery." Spacetime diagram 1242(c) corresponds to a logical qubit encoded in a rectangular patch contributing to a logical multi-qubit Pauli measurement with its Y operator. The details of these logical operations (including how the spacetime diagrams correspond to particular logical operations) are not relevant to understanding the present disclosure.

In some embodiments for FBQC, a spacetime diagram, can be translated to a fusion graph. For instance, as shown in FIG. 12D, spacetime diagrams 1242(a)-1242(c) can be translated to corresponding fusion graphs 1240a-1240c that represent the same set of logical operations. Fusion graphs 1240a-1240c can be generally similar to fusion graph 1200 in that both describe a cubic lattice of resource states. However, fusion graphs 1240a-1240c add additional information about the fusion and measurement operations to be performed, by assigning a color code to certain cubic or cuboid volumes within the lattice. Legend 1250, shown in FIG. 12E, shows how the color of a cubic or cuboid volume in fusion graphs 1240 maps to a corresponding set of fusion measurements between qubits of different resource states. Each cubic or cuboid volume is first equated to a set of fusion operations represented by color-coded lines connecting vertices. The correspondence between the color coded lines and specific fusion operations or single-qubit measurements is shown at the top row of legend 1250. It is noted that a type II fusion measurement produces both X⊗X and Z⊗Z measurement outcomes; thus the primal and dual checks of a CBQC spacetime diagram can both correspond to the same hardware operations and combinations of outcomes, with the only difference being in how the measurement outcome data is used in decoding. Boundary checks correspond to half-cubes that involve a combination of fusion outcomes and two single-qubit measurements. Twists involve Y⊗Y fusion outcomes. These do not require additional hardware, as they can be determined by multiplying the X⊗X and Z⊗Z fusion outcomes.

The translation from spacetime diagram to fusion graph can be straightforward. The bulk of the fusion graph is filled with primal and dual bulk cubes in a 3D checkerboard pattern, and the primal and dual boundaries are decorated with primal or dual half-cubes. If twists or lattice dislocations are present, they are added using the cuboids shown in legend 1254. Slices of the fusion graph can mimic the pattern of the corresponding CBQC time slices, although the interpretation is different, as can be seen by comparing legend 1250 and legend 1254. The number of cubes in the fusion graph depends on the code distance, and time slices of square patches having code distance d involve d' resource states.

Additional description related to generation of fusion graphs such as fusion graphs 1240 can be found in Appendix I and Appendix II of above-referenced U.S. Application No. 63/291,236.

Figure 13A:
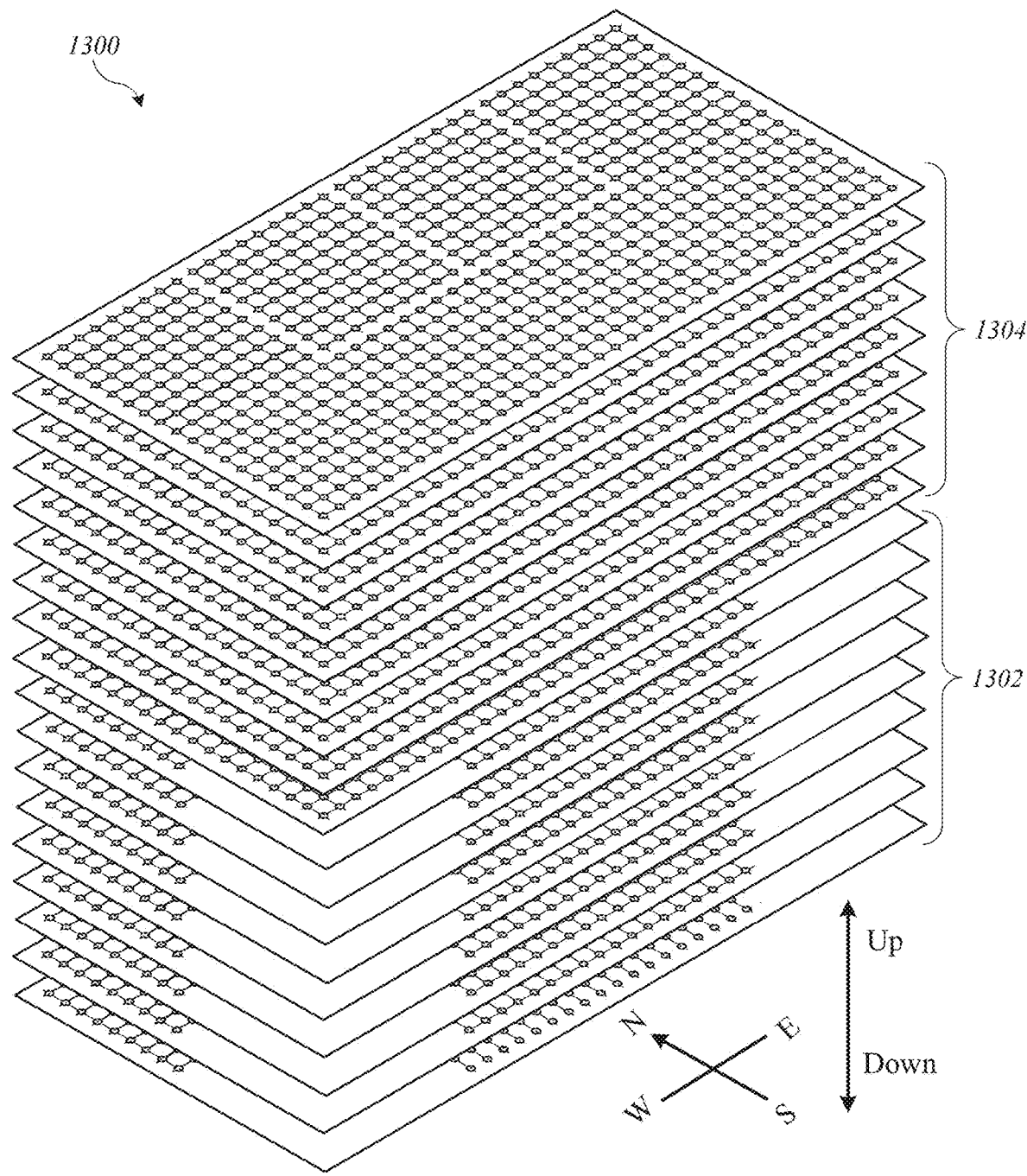
FIGS. 13A-13C show views of a fusion graph representing a computation on four logical qubits according to some embodiments.
Figure 13B:
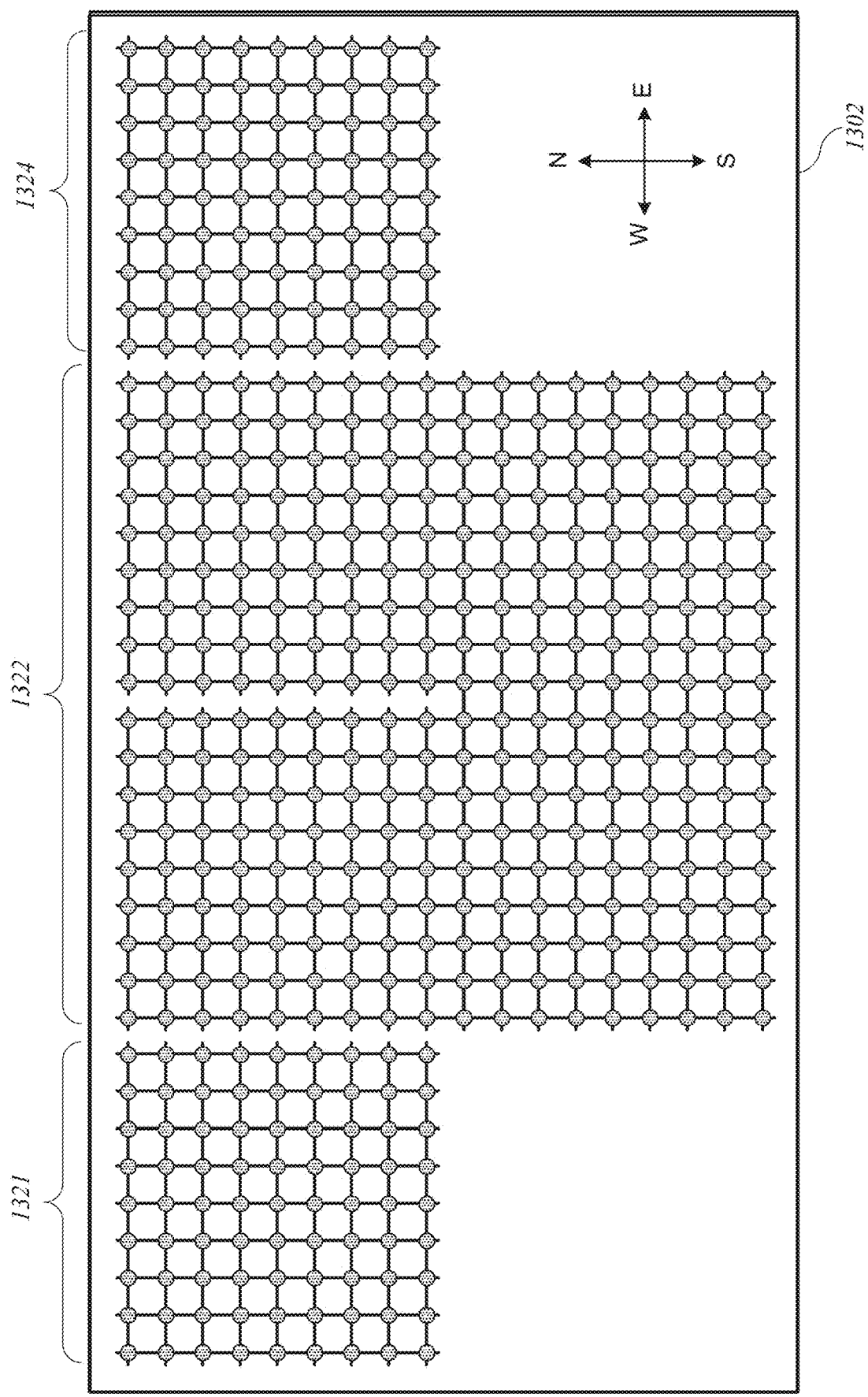
Figure 13C:
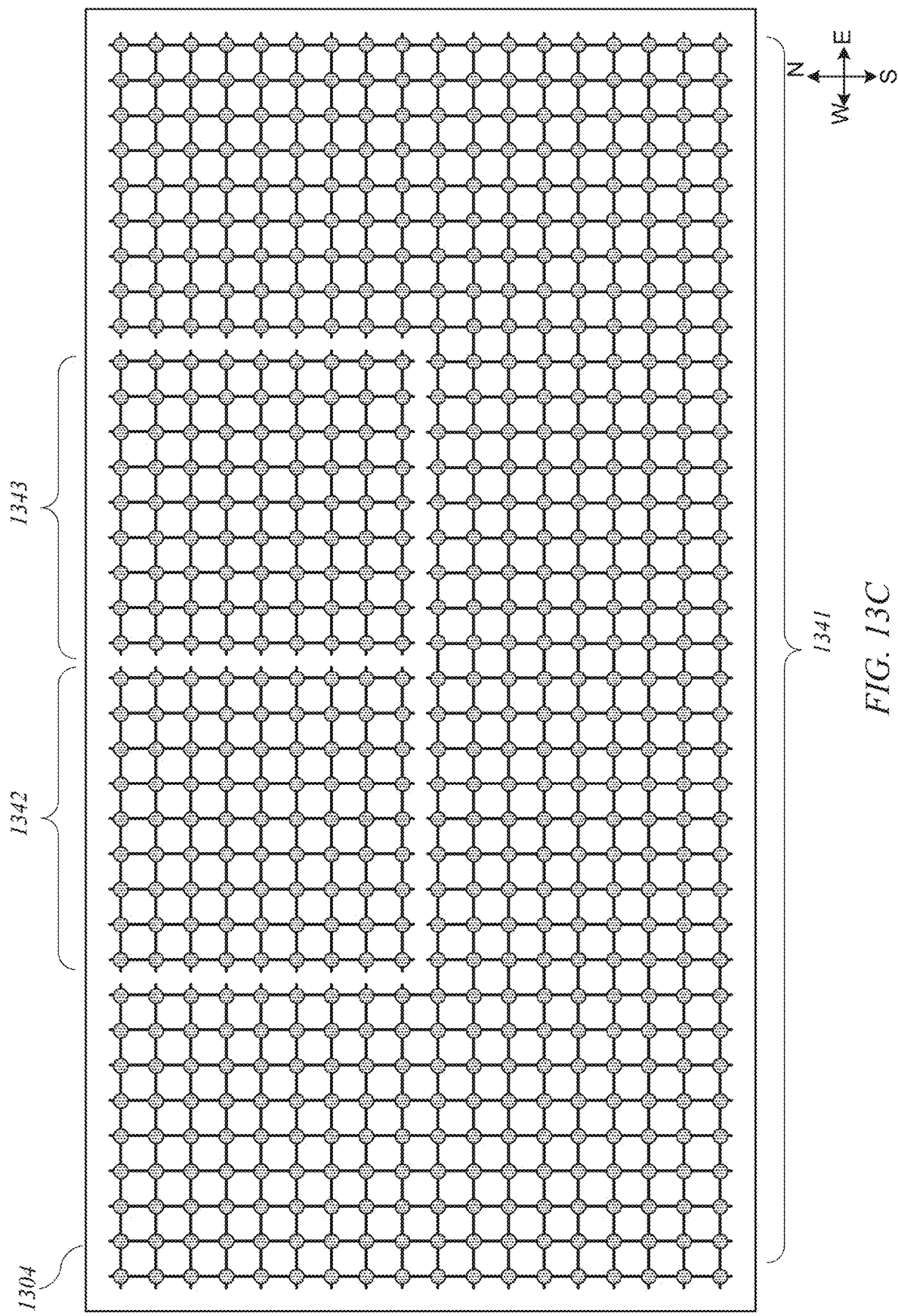

In some embodiments, fusion graphs can be "compiled" into "instructions" to perform a particular combination of fusion operations on a set of resource states. By way of example, FIGS. 13A-13C show views of a fusion graph implementing logical operations on four logical qubits ($q_1$, $q_2$, $q_3$, $q_4$) according to some embodiments. FIG. 13A shows a perspective view of fusion graph 1300, which includes a first set of nine layers 1302 and a second set of nine layers 1304. FIG. 13B shows a representative one of layers 1302, and FIG. 13C shows a representative one of layers 1304. (For simplicity of illustration, the color-coding of FIG. 12B is not used in FIGS. 13A-13C.) In this example, the computation includes performing a first Pauli product measurement $Z_2Z_3$ between logical qubits $q_2$ and $q_3$, then performing a second Pauli product measurement $Z_1Z_4$ between logical qubits $q_1$ and $q_4$. In this example, a "code distance" (or "code size") of 9 is assigned. The code distance is a selectable parameter relating to the size of the bulk lattice used to provide a desired error correction code, and the choice of code distance can depend on the particular hardware implementation (e.g., expected photon losses and the success rate of the particular entanglement generating circuits used) and a desired degree of fault tolerance. In this example number of layers associated with each logical operation corresponds to the same code distance, and (as best seen in FIGS. 13B and 13C) the number of physical qubits between lattice modifications within a layer also corresponds to the code distance. The choice of code distance is not relevant to understanding the present disclosure, and embodiments described herein can support a range of code distances. Further, while this example uses cubic codes (code distance the same in all three dimensions), cubic codes are not required, and the code distances along different dimensions (e.g., U-D, S-N, E-W) can be different from each other.

FIG. 13B shows a representative one of layers 1302, corresponding to the $Z_2Z_3$ measurement. It should be understood that all layers 1302 can have the same lattice pattern. Lattice section 1321 represents logical qubit $q_1$ "at rest" (i.e., not interacting with any other qubit), and lattice section 1324 represents logical qubit $q_4$ at rest. In this example, each logical qubit has a code distance of 9 and is represented as a 9×9 lattice in each layer. U-shaped lattice section 1322 represents the $Z_2Z_3$ measurement on logical qubits $q_2$ and $q_3$. As suggested by FIG. 13B, logical operations on logical qubits can entail additional resource states and fusion operations, with the number of additional resource states and fusion operations depending at least in part on the code distance.

FIG. 13C shows a representative one of layers 1304, corresponding to the $Z_1Z_4$ measurement. It should be understood that all layers 1304 can have the same lattice pattern. Lattice sections 1342 and 1343 represent logical qubits $q_2$ and $q_3$ at rest. U-shaped lattice section 1341 represents the $Z_1Z_4$ measurement on logical qubits $q_1$ and $q_4$.

FIGS. 13A-13C illustrate the principle of using a prescribed combination of single-qubit measurements (on physical qubits) and fusions between (physical) qubits of different resource states to implement logical operations on logical qubits. Some embodiments described below provide reconfigurable hardware modules that can implement the underlying operations on physical qubits of resource states that may be specified in a fusion graph and provide measurement data that can be decoded to determine the result of the logical operations.

3. Interleaving Modules

According to some embodiments, a general-purpose "interleaving" hardware module can include a resource state generator (RSG) that produces resource states at regular time intervals, a set of reconfigurable fusion circuits (as described below), and a combination of switches and/or delay lines to deliver qubits from RSGs to the appropriate reconfigurable fusion circuits. By controlling the switch settings for each qubit of each resource state that is generated and the configuration of each reconfigurable fusion circuit that receives qubits using classical control logic, an interleaving module or a network of interleaving modules can be operated to provide a programmable quantum computer that executes programs, where the programs can be defined using fusion graphs or other techniques that specify the set of operations for each resource state.

3.1. Circuit Components for Interleaving Modules 3.1.1. Resource State Generator (RSG)

In embodiments described herein, an interleaving module includes a "resource state generator," or "RSG" (or "RSG circuit"). FIG. 14A shows a circuit symbol denoting an RSG 1490 in drawings herein. An RSG can be a circuit or other hardware device that generates one resource state per cycle of an "RSG clock." The time needed to generate a resource state is sometimes referred to as an "RSG cycle" or "clock cycle." The duration of an RSG cycle can be chosen as desired, provided that the duration is long enough that an RSG circuit can complete the physical process of producing a resource state. In various embodiments, the RSG cycle time can be ~1 ns or ~10 ns.

The particular size and entanglement geometry of the resource states can be chosen as a design parameter. In some cases, the optimal size may depend on the particular physical implementation of the qubits. For example, as described above, qubits can be implemented using photons propagating in waveguides. The processes used to generate the photons and create entanglement may be stochastic (i.e., the probability of successfully generating a photon in any given instance is significantly less than 1). Where generation or entanglement of qubits is stochastic, multiplexing techniques or other techniques may be used to increase the probability of producing a resource state having a specified entanglement structure (for each attempt). In addition, the size of the resource state can be chosen for a particular implementation based in part on the rate of errors in resource state generation that can be tolerated and the particular probability of producing a resource state having a specified entanglement structure. Examples described herein refer to resource states having six qubits associated with different directions in entanglement space (e.g., 6-ring resource state 1100), and output paths of RSG 1490 are sometimes labeled with directions (U, D, E, W, S, N) as an aid to visualization of entanglement patterns.

In some embodiments, a resource state such as resource state 1100 can be generated using photonic and electronic circuits and components (e.g., of the type described in Section 1.3 above) to produce and manipulate individual photons. In some implementations, a resource state generator can be a single integrated circuit fabricated, e.g., using conventional silicon-based technologies. The resource state generator can include photon sources or can receive photons from an external source. The resource state generator can also include photonic circuits implementing Bell state generators and fusion operations as described above. To provide robustness, the resource state generator can include multiple parallel instances of various photonic circuits with detectors and electronic control logic to select a successful instance to propagate a photon. One skilled in the art will know various ways to construct a photonic resource state generator capable of generating resource states having a desired entanglement geometry.

In some embodiments, resource states can be generated using techniques other than linear optical systems. For instance, various devices are known for generating and creating entanglement between systems of "matter-based"

qubits, such as qubits implemented in ion traps, other qubits encoded in energy levels of an atom or ion, spin-encoded qubits, superconducting qubits, or other physical systems. It is also understood in the art that quantum information is fungible, in the sense that many different physical systems can be used to encode the same information (in this case, a quantum state). Thus, it is possible in principle to swap the quantum state of one system onto another system by inducing interactions between the systems. For example, the state of a qubit (or ensemble of entangled qubits) encoded in energy levels of an atom or ion can be swapped onto the electromagnetic field (i.e., photons). It is also possible to use transducer technologies to swap the state of a superconducting qubit onto a photonic state. In some instances, the initial swap may be onto photons having microwave frequencies; after the swap, the frequencies of the photons can be increased into the operation frequencies of optical fiber or other optical waveguides. As another example, quantum teleportation can be applied between matter-based qubits and Bell pairs in which one qubit of the Bell pair is a photon having frequency suitable for optical fiber (or other optical waveguides), thereby transferring the quantum state of the matter-based qubits to a system of photonic qubits. Accordingly, in some embodiments matter-based qubits can be used to generate a resource state that consists of photonic qubits, and the particular construction and configuration of the resource state generator is not relevant to understanding the present description.

3.1.2. Switching Circuit

FIG. 14B shows a symbol denoting a switching circuit (or "switch") 1480. Inputs and outputs to switching circuit 1480 can include any number of qubits, and the number of inputs need not equal the number of outputs. Switching circuit 1400 can incorporate any combination of one or more active optical switches, mode couplers, phase shifters, or the like. A switching circuit can be configured to perform an active operation that reconfigures input modes (e.g., to effect a basis change for a qubit by coupling the modes of the qubit) and/or applies a phase to one or more of the input modes (which can affect subsequent coupling between modes). In some instances, a switching circuit 1480 implements a routing switch that can couple an input qubit to one of two or more alternative output paths. In some embodiments, operation of switching circuit 1480 (e.g., selection of a routing path) can be controlled dynamically in response to a classical control signal 1481, the state of which can be determined based on results of previous operations, a particular computation to be performed, a configuration setting, timing counters (e.g., for periodic switching), or any other parameter or information.

3.1.3. Delay Circuit

FIG. 14C shows a symbol denoting a delay circuit (also referred to as a "delay line") 1470. A delay circuit delays a qubit for a fixed length of time and can serve as memory for the quantum information stored in the qubit. The length of time (in clock cycles) is indicated by a number, in this example L, meaning a delay of L clock cycles. In the case of photonic qubits, a delay circuit can be implemented, e.g., by providing one or more suitable lengths of optical fiber or other waveguide material, so that the photon of the delayed qubit travels a longer path than the photon of a non-delayed qubit.

3.1.4. Reconfigurable Fusion Circuit

Figure 14D:
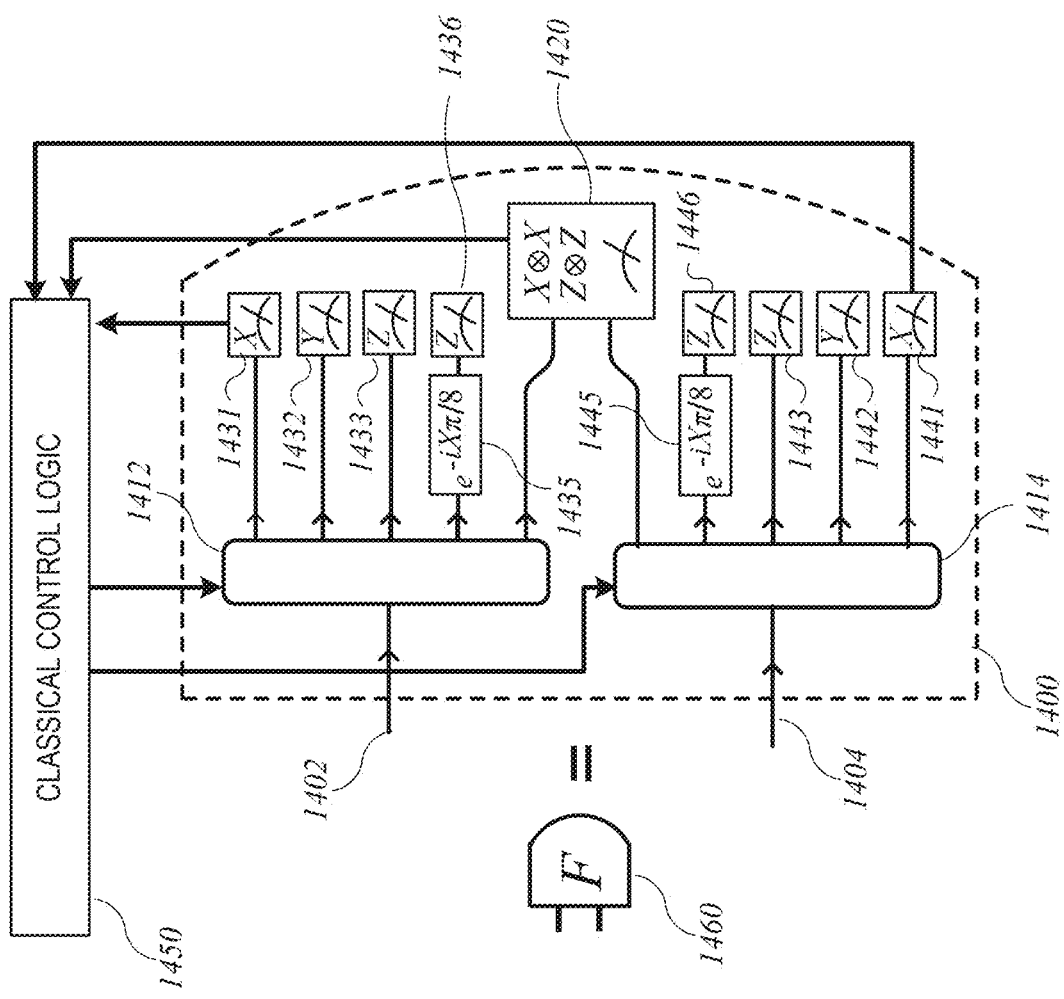

FIG. 14D shows a simplified schematic diagram of a reconfigurable fusion circuit 1400 according to some embodiments. Reconfigurable fusion circuit 1400 receives two qubits on input paths 1402, 1404. It should be understood that the qubits can be photonic qubits using a dual-rail encoding (e.g., as described in Section 1.3 above) and that each path shown in FIG. 14 can be implemented using a pair of waveguides. More generally, the number of waveguides corresponding to each path can be selected according to a particular photonic encoding of qubits. Each qubit enters an active optical switch: input path 1402 enters switch 1412, and input path 1404 enters switch 1414. Each of switches 1412, 1414 can be a 1×5 routing switch that selectably routes the input to one of five possible output paths. Switch 1412 as output paths coupled to each of five "destinations": fusion circuit 1420, Pauli X measurement circuit 1431, Pauli Y measurement circuit 1432, Pauli Z measurement circuit 1433, and phase rotation circuit 1435, which provides its output to Pauli Z measurement circuit 1436. Similarly, switch 1412 also has output paths coupled to each of five "destinations": fusion circuit 1420, Pauli X measurement circuit 1441, Pauli Y measurement circuit 1442, Pauli Z measurement circuit 1443, and phase rotation circuit 1445, which provides its output to Pauli Z measurement circuit 1446. The Pauli X, Y, and Z measurements are defined for qubits, and each Pauli measurement circuit can include a basis rotation (for the X, Y, or Z basis as appropriate), which can be implemented using mode couplers and phase shifters as described above, followed by a detector coupled to each mode. For instance, where qubits are represented in a dual-rail encoding, a detector can be coupled to the end of each of the two waveguides representing a qubit. The measurement result can include a number of photons detected by each detector, or a binary-valued signal from each detector indicating whether a photon was detected or not.

Fusion circuit 1420 can be, e.g., a type II fusion circuit as described above with reference to FIGS. 9A and 9B. Fusion circuit 1420 can provide Pauli XX and ZZ measurements on a pair of input qubits, e.g., using detectors 957 as shown in FIG. 9A. As described above, each detector 957 can provide a classical output signal, which can be, e.g., a binary logic signal indicating whether a photon was detected or a count of the number of photons detected.

Phase shift circuits 1435, 1445 each apply a phase shift of $e^{i\pi/8}$ prior to a Pauli Z measurement circuits 1436, 1446. In some embodiments, this phase rotation path can be used in generating so-called "magic" states to support various implementations of FBQC. (Magic states and applications thereof in FBQC are described further in Appendix I.

Switches 1412, 1414 are controlled by classical control logic 1450. Classical control logic 1450 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, switches 1412, 1414 are coupled to an off-chip classical computer having a processor and a memory, and the off-chip classical computer is programmed to perform some or all of the operations of classical control logic 1450. In some embodiments, classical control logic 1450 (which can include an off-chip classical computer) can be provided with program code indicating the type of measurement desired for each pair of qubits input to reconfigurable fusion circuit 1400 (which can be determined from a fusion graph as described above), and classical control logic 1450 can send control signals to switches 1412, 1414 to configure reconfigurable fusion circuit 1400 to perform the desired measurements at the desired time.

Classical control logic 1450 can also receive the classical output signals from all of measurement circuits 1431-1433, 1441-1443, 1436, 1446, and fusion circuit 1420. In some embodiments, classical control logic 1450 can execute decoding logic to interpret the results of quantum computations based on the classical output signals, and in some instances, results of the decoding logic can be used as inputs to determine subsequent settings for switches 1412, 1414.

Shown at the left side of FIG. 14D is a circuit symbol 1460 that is used in subsequent figures to represent an instance of reconfigurable fusion circuit 1400. (In some figures, the tilde is omitted)

3.2. Fully Networked Unit Cells

Figure 15:
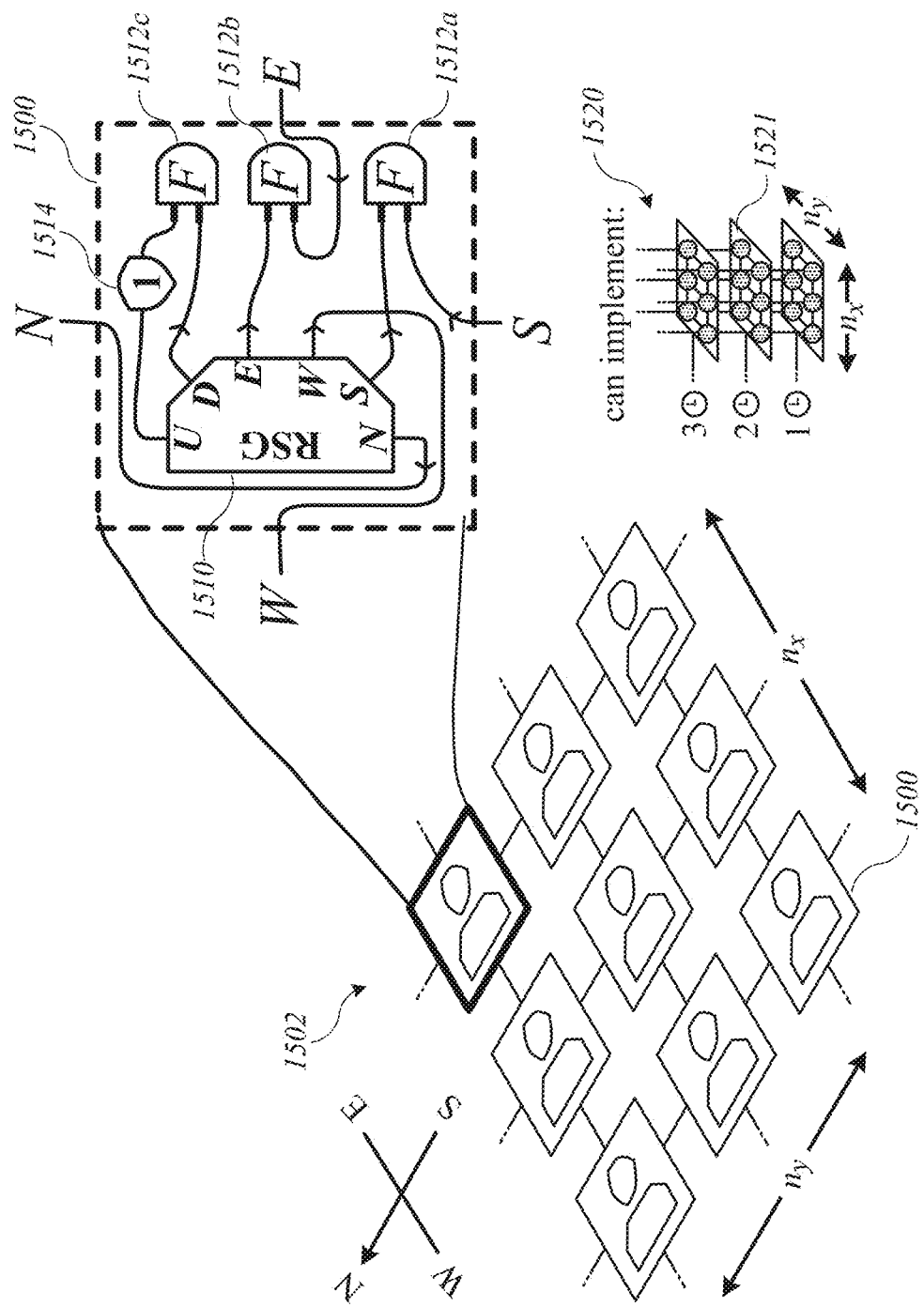
FIG. 15 shows a simplified schematic diagram of a network of unit cells according to some embodiments.

FIG. 15 shows a simplified schematic diagram of a "fully networked" implementation of unit cells to execute fusion graphs according to some embodiments. A number ($n_x \times n_y$) of unit cells 1500 are connected to form a network array (or network) 1502, with connections between adjacent unit cells 1500 as indicated in the drawing. The number $n_x \times n_y$ can correspond to the dimensions of a layer in a fusion graph. For instance, for the fusion graph of FIG. 13A, the layer dimensions are 36×18. In practical applications, the layer dimensions may be much larger (e.g., on the order of $10^2 \times 10^2$ or $10^3 \times 10^3$). It should be understood that, as with all schematic diagrams herein, the arrangement of components in the schematic diagram need not imply any particular physical arrangement of hardware components.

Each unit cell 1500 can include a resource state generator (RSG) 1510, which can be implemented as described above, and three reconfigurable fusion circuits 1512a, 1512b, 1512c, each of which can be an instance of reconfigurable fusion circuit 1400 of FIG. 14. Each unit cell 1500 can also include a delay line 1514 that introduces 1 RSG cycle of delay. Delay line 1514 can be implemented using a suitable length of waveguide (e.g., optical fiber), as described above.

As shown by fusion graph 1520, network array 1502 can implement a fusion graph in which one layer 1520 having dimension $n_x \times n_y$ is generated on each RSG cycle. In each unit cell 1500, a resource state having six qubits (labeled N, S, E, W, U, and D as in diagrams above) is produced by each RSG 1510 during each RSG cycle. Each qubit is provided on a separate output path, either to one of reconfigurable fusion circuits 1512a-1512c or to a neighboring unit cell 1500. In the example shown, the N qubit is provided to the neighboring unit cell 1500 in the N direction. The S qubit is provided to reconfigurable fusion circuit 1512a, which also receives an N qubit from the neighboring unit cell 1500 in the S direction. Similarly, the W qubit is provided to the neighboring instance of unit cell 1500 in the W direction. The E qubit is provided to reconfigurable fusion circuit 1512b, which also receives a W qubit from the neighboring unit cell 1500 in the E direction. The U qubit is delayed by one RSG cycle using delay line 1514, then provided to reconfigurable fusion circuit 1512c synchronously with the D qubit of the resource state generated by the same RSG 1510 during the next RSG cycle. In some embodiments, computations can be implemented by controlling the switches in each reconfigurable fusion circuit 1512a-1512c in each unit cell 1500.

Although not shown in FIG. 15, in some embodiments single-photon measurement circuits (similar to Pauli measurement circuits 1431-1433 shown in FIG. 14D) can be coupled to routing paths of unit cells 1500 at the boundaries of network array 1502 to perform single qubit measurements for qubits at the outer boundaries of the fusion graph. Other options for managing qubits at the outer boundaries of a fusion graph can also be provided.

3.3. Patch-Based Layer Generation

The fully networked configuration shown in FIG. 15 uses network array 1502 of $n_x \times n_y$ unit cells 1500 to generate a layer of dimension $n_x \times n_y$ at each RSG clock cycle. As noted above, the layer dimension may be quite large, and implementing a network array 1502 can require a considerable amount of hardware. To reduce the amount of hardware required, network array 1502 can be modified to generate a layer by producing a set of k "patches" of dimension $P = n_x \times n_y$ for some integer k>1. The total layer size can be $n_x \times n_y \times k$.

Figure 16:
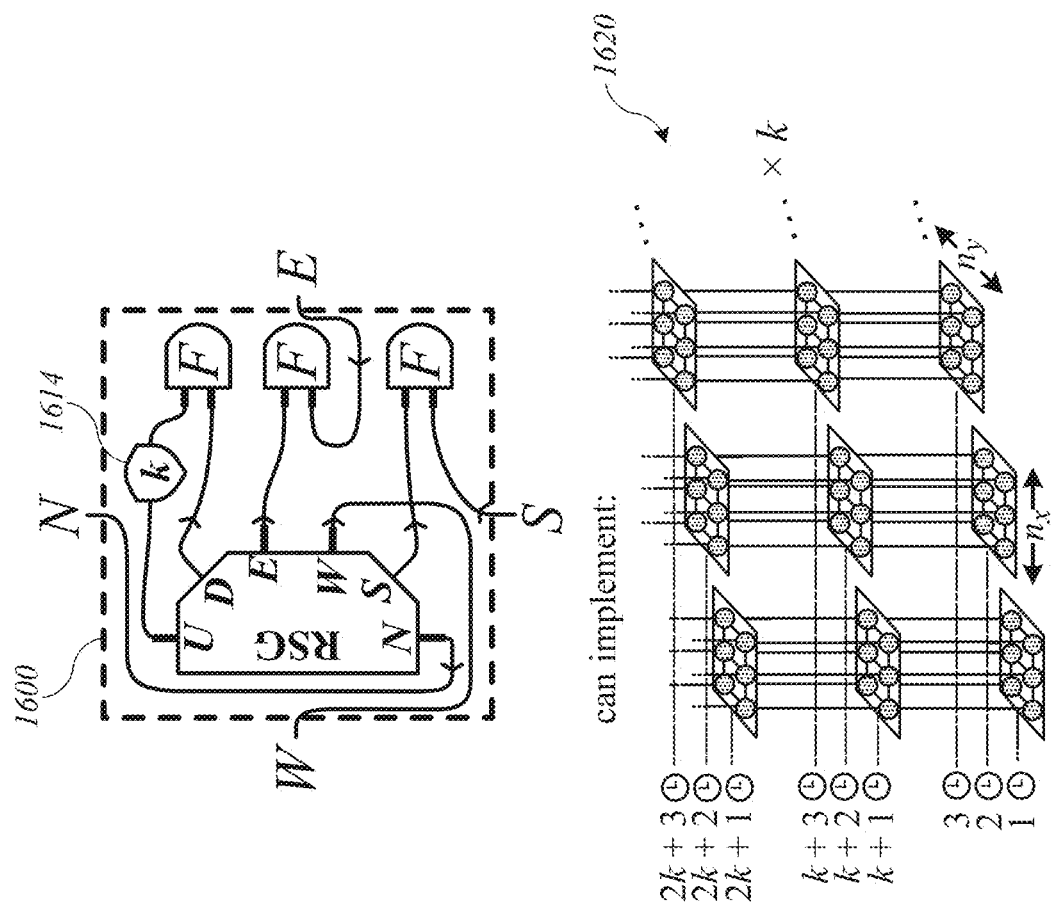
FIG. 16 shows a simplified fusion graph illustrating patch-based generation of a layer using a network of unit cells according to some embodiments.

FIG. 16 shows a simplified fusion graph 1620 illustrating patch-based generation of a layer using a network array of unit cells 1600 according to some embodiments. Fusion graph 1620 shows that each layer is generated across a set of k RSG cycles. The unit cells 1600 used to implement fusion graph 1620 can be connected in a network similarly to network array 1502 of FIG. 15. Unit cells 1600 differ from unit cells 1500 of FIG. 15 in that the 1-cycle delay line 1514 is replaced with a k-cycle delay line 1614, so that the U qubit is delayed until the RSG cycle in which RSG 1610 generates the resource state for the corresponding position in the next layer.

Fusion graph 1620 shows a set of k disjoint cuboids. In some embodiments, adjacent patches in each layer can be "stitched" together using additional reconfigurable fusion circuits, switching circuits, and delay lines (not shown in FIG. 16). Suitable circuits for implementing stitching between patches will become apparent in view of the following sections.

3.4. Interleaving Modules

According to some embodiments, an alternative approach to executing a fusion graph involves the use of a network array of "interleaving modules," where each interleaving module is configured to process a contiguous patch of size $L^2$ in $L^2$ RSG cycles, and patches produced by adjacent interleaving modules can be stitched together at the boundaries. Parameter L, sometimes referred to herein as the "interleaving length," can be chosen as desired. Considerations relevant to the selection of an interleaving length are described below.

Figure 17:
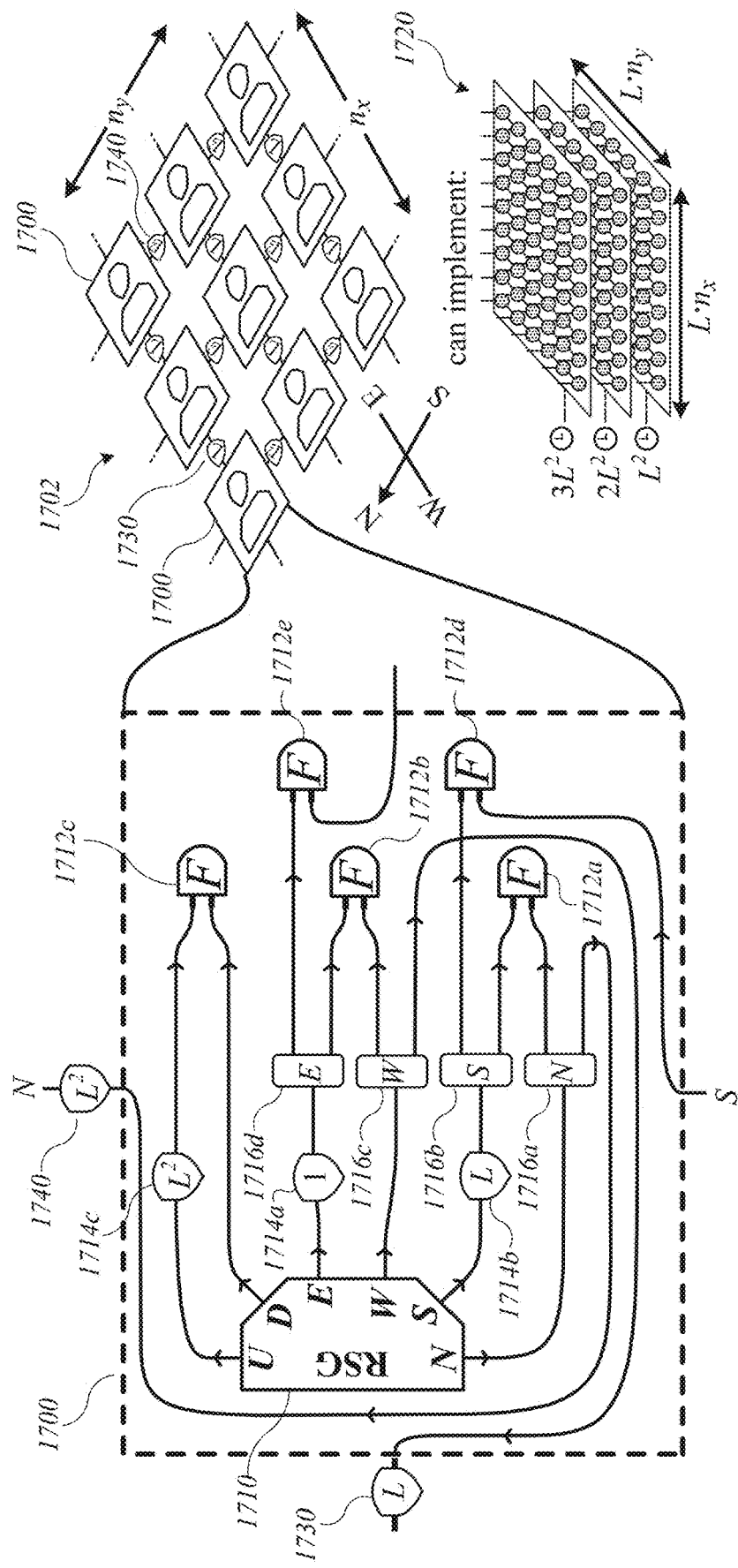
FIG. 17 shows a simplified schematic diagram of a network of interleaving modules according to some embodiments.

FIG. 17 shows a simplified schematic diagram of a network of interleaving modules according to some embodiments. A number ($n_x \times n_y$) of interleaving modules 1700 are connected to form a network array 1702, with adjacent interleaving modules 1700 connected by delay lines 1730, 1740 as indicated in the drawing. Delay line 1730 connects one instance of interleaving module 1700 to its neighbor in the W direction and introduces a delay of L RSG cycles. Delay line 1740 connects one instance of interleaving module 1700 to its neighbor in the N direction and introduces a delay of $L^2$ RSG cycles. Network array 1702 can be used to generate a fusion graph 1720 with layers having dimensions $(L \cdot n_x) \times (L \cdot n_y)$.

Each interleaving module 1700 includes an RSG circuit 1710 that produces a resource state having six qubits (labeled N, S, W, E, D, U) during each RSG cycle. Reconfigurable fusion circuits 1712a, 1712b, 1712c, also referred to as "local" fusion circuits, can be instances of reconfigurable fusion circuit 1400 of FIG. 14 and can be used to create entanglement between different resource states generated within the same interleaving module 1700 during different RSG cycles. In addition, to create entanglement between resource states generated by neighboring instances of interleaving module 1700, additional "network" fusion circuits 1712d, 1712e can be provided. Network fusion circuits 1712d and 1712e can be additional instances of reconfigurable fusion circuit 1400 of FIG. 14 that perform fusion operations on a qubit of a locally generated resource state and a qubit of a networked resource state received from a neighboring instance of interleaving module 1700. Routing switches 1716a-1716d can be switching circuits (e.g., as described above) that are configured to selectably route the N, S, W, and E qubits of a particular resource state to one of local fusion circuits 1712a, 1712b (to be used in a fusion operation with a qubit of a different resource state generated in the same interleaving module 1700) or to one of network fusion circuits 1712d, 1712e (to be used in a fusion operation with a qubit of a resource state generated by a neighboring instance of interleaving module 1700).

In this example, each interleaving module 1700 constructs a "row" of a patch by proceeding from W to E during L successive RSG cycles, then constructs the next row in the S direction during the next L RSG cycles, and so on. Accordingly, delay line 1714a provides one RSG cycle of delay for the E qubit. If switch 1716d is set to select the local path when the E qubit arrives, the E qubit of a first resource state generated by RSG 1710 can arrive at local fusion circuit 1712b synchronously with the W qubit of the next resource state generated by RSG 1710. Likewise, delay line 1714b provides L RSG cycles of delay for the S qubit. If switch 1716b is set to select the local path when the S qubit arrives, the S qubit of the first resource state generated by RSG 1710 can arrive at local fusion circuit 1712a synchronously with the N qubit of another resource state generated by RSG 1710 L RSG cycles later, which enables fusion operations between qubits of resource states corresponding to adjacent lattice positions in different rows. As noted above, interleaving module 1700 constructs a patch for a layer in $L^2$ RSG cycles. Accordingly, delay line 1714c provides $L^2$ RSG cycles of delay for the U qubit, so that the U qubit of resource state generated by RSG 1710 arrives at fusion circuit 1712c synchronously with the D qubit of a different resource state generated by RSG 1710 for the corresponding position in the next layer.

Network fusion circuits 1712d, 1712e can each receive a "local" qubit originating from the local RSG 1710 (i.e., the RSG 1710 in the same interleaving module with network fusion circuits 1712d, 1712e) and a "networked" qubit from a neighboring interleaving module 1700, enabling patches generated by different interleaving modules 1700 to be "stitched" together via fusion operations. The networked qubits can pass through delay lines 1730, 1740. Thus, for instance, a networked qubit from a neighboring interleaving module 1700 in the E direction can arrive at network fusion circuit 1712d synchronously with the "local" E qubit of the resource state that is adjacent in the fusion graph.

Figure 18B:
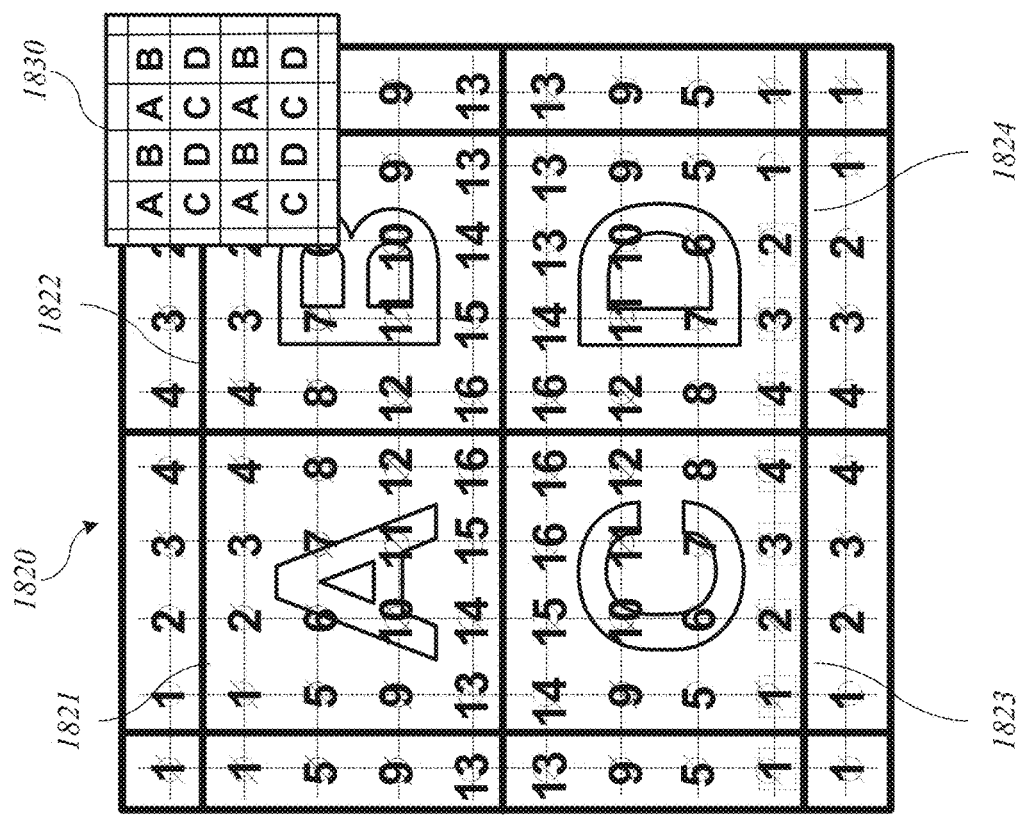
FIGS. 18A and 18B show examples of assignment of interleaving coordinates to vertices within a layer of a fusion graph according to some embodiments.
Figure 18A:
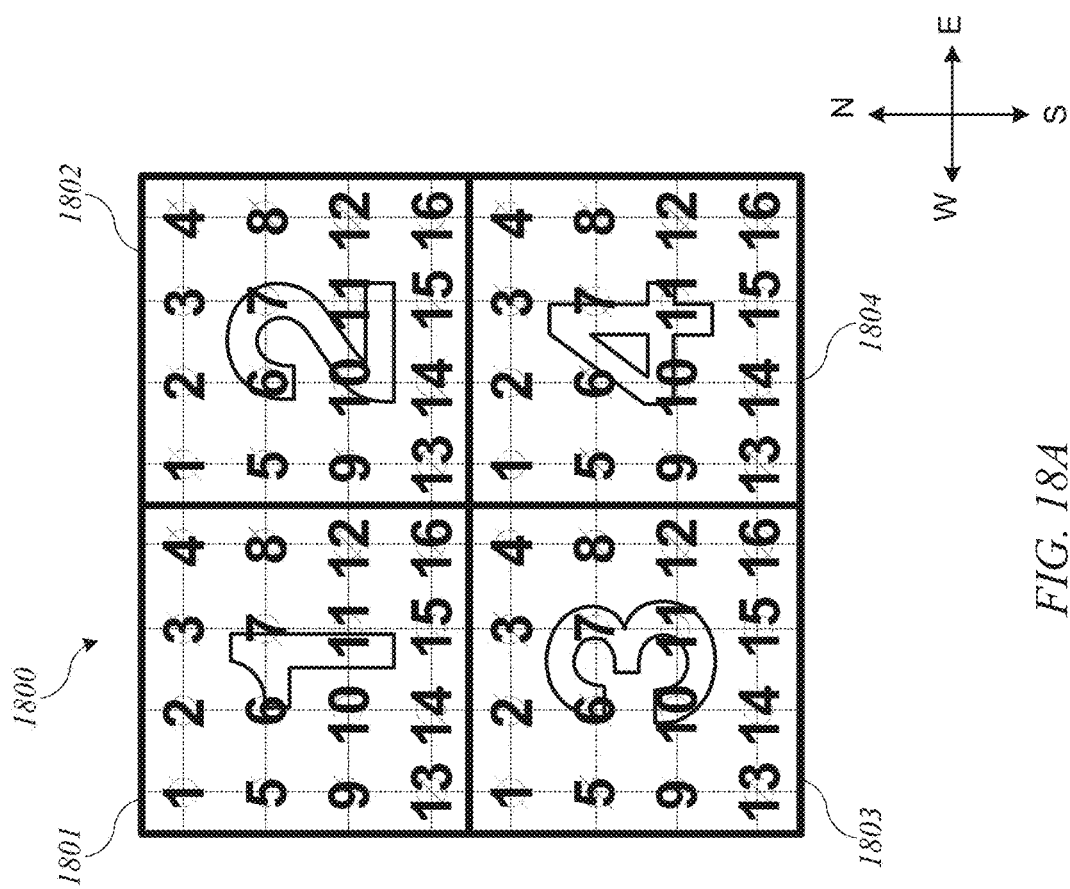

In this manner, each interleaving module 1700 can execute a contiguous patch within each layer of a fusion graph, and patches executed by different interleaving modules 1700 can be stitched together at the boundaries. In some embodiments, the order of operations for each interleaving module 1700 can be specified using "interleaving coordinates" assigned to vertices in a fusion graph. An interleaving coordinate can specify a layer number, a patch number within a layer (which identifies which interleaving module executes the patch), and a cycle number within the patch (which identifies the order of processing vertices within the patch). FIG. 18A shows an assignment of interleaving coordinates to vertices within a single layer 1800 of a fusion graph according to some embodiments. In this example, the interleaving length L is 4, and there are assumed to be four interleaving modules 1700 connected in a 2×2 network array; the layer dimensions are thus 8×8. As indicated by the large red number in each patch, NW patch 1801 is assigned to a first interleaving module 1700, NE patch 1802 to a second interleaving module 1700, SW patch 1803 to a third module 1700, and SE patch 1804 to a fourth interleaving module 1700. Within each quadrant, vertices are numbered 1-16 to identify the RSG cycle during which the resource state corresponding to that vertex is generated. Thus, during RSG cycle 1, the NW-most vertex in each patch 1801-1804 is generated; during RSG cycle 2, the adjacent vertex in the E direction is generated, and so on through RSG cycle 4. During RSG cycle 5, the vertex adjacent in the S direction to the NW-most vertex in each patch is generated, and so on. For convenience, the W-E direction is sometimes referred to as a "row," while the N-S direction is sometimes referred to as a "column."

Delay lines 1730, 1740 connected between instances of interleaving module 1700 can provide appropriate delays so that qubits of resource states generated by neighboring instances of interleaving module 1700 arrive synchronously at network fusion circuits 1712d, 1712e. For example, during RSG cycle 1, the second interleaving module 1700 (assigned to NE patch 1802) generates a resource state having a W qubit that is routed by switch 1716c onto the network path and into delay line 1730. In this example, delay line 1730 adds L=4 RSG cycles of delay, so that the W qubit arrives at network fusion circuit 1712e of the first interleaving module 1700 (assigned to NW patch 1801) during RSG cycle 5. In the meantime, during RSG cycle 4, the first interleaving module 1700 generates a resource state having an E qubit that is delayed for one RSG cycle by delay line 1714a. During the next RSG cycle (cycle 5), the delayed E qubit is routed by switch 1716d to network fusion circuit 1712e. Thus, qubits from resource states generated in different interleaving modules can be correctly synchronized across patch boundaries. Similar considerations apply for patch boundaries in the N-S direction.

In some embodiments, delay lines 1730, 1740 can be omitted. For example, FIG. 18B shows an alternative assignment of interleaving coordinates to vertices within a layer 1820 of a fusion graph according to some embodiments. The notation is similar to the notation of FIG. 18A, except that the different interleaving module 1700 are identified using letters ABCD, which indicate interleaving modules that are configured somewhat differently from each other, as will become apparent. Layer 1820 is also shown as being larger than 8×8, to illustrate how the pattern can be extended to interleaving module networks of arbitrary size. As indicated by the cycle numbers for each vertex, interleaving module A begins with the NW-most resource state in patch 1821 and proceeds along a row in the E direction, then to the next row in the S direction (as in FIG. 18A). Interleaving module B begins with the NE-most resource state in patch 1822 and proceeds along a row in the W direction, then to the next row in the S direction. Instance C of interleaving module 1700 begins with the SW-most resource state in patch 1823 and proceeds along a row in the E direction, then to the next row in the N direction. Instance D of interleaving module 1700 begins with the SE-most resource state in patch 1823 and proceeds along a row in the W direction, then to the next row in the N direction. As the cycle numbers indicate, whenever neighboring resource states are generated by different instances of interleaving module 1700, those resource states are generated in the same RSG cycle, and delay lines on the network paths connecting different interleaving modules can be omitted. In this case, interleaving modules of types A, B, C, and D are configured with internal delay lines in different locations according to the direction of traversing the patch.

For instance, where an interleaving module of type A (which can be implemented as shown for interleaving module 1700 of FIG. 17) delays the E qubit of a resource state by 1 RSG cycle, interleaving module of type B would instead delay the W qubit of a resource state by 1 RSG cycle. Similarly, an interleaving module of type C would delay the N qubit rather than the S qubit. The appropriate modifications to interleaving module 1700 to delay the appropriate qubits are straightforward. Inset 1830 shows that the ABCD pattern of patches can be repeated to support a larger network with more interleaving modules, without using delay lines on the network paths.

4. FBQC Using Interleaving Modules

In some embodiments, a network array 1702 of interleaving modules 1700 can be used to implement FBQC. For example, a network array of interleaving modules can be used to implement the computation represented by the fusion graph of FIGS. 13A-13C.

By way of example, FIG. 19A shows a view of representative layer 1304 of FIG. 13C, with interleaving coordinates overlaid thereon, according to some embodiments. In this example, network array 1700 is assumed to have dimensions 6×3 and an interleaving length L=6. Interleaving coordinates are assigned similarly to FIG. 18A, proceeding within each patch from W to E, and from N to S.

Figure 19B:
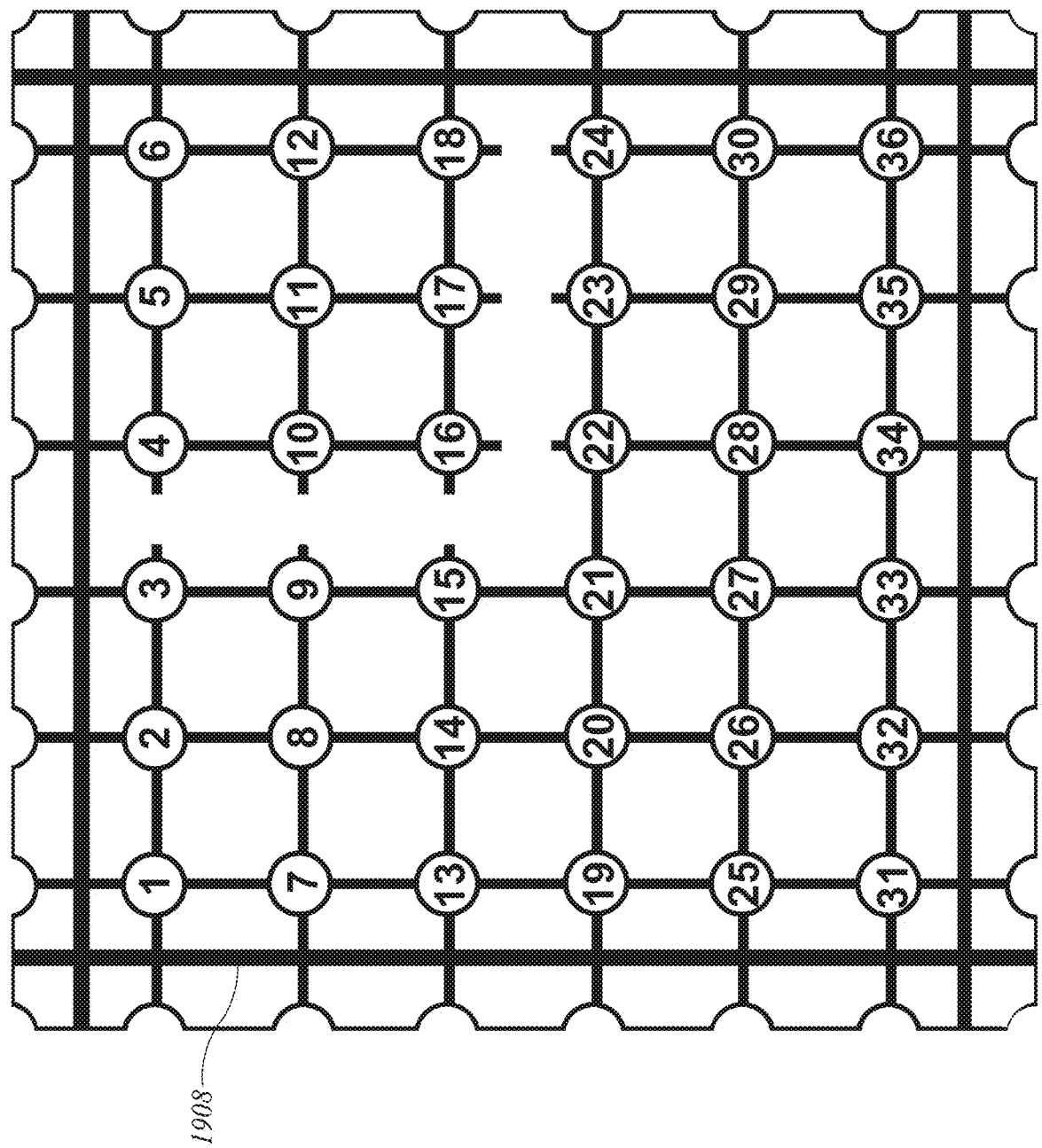
FIG. 19B shows a detailed view of one patch of the layer shown in FIG. 19A.

FIG. 19B shows a detailed view of patch 1908 of FIG. 19A. As can be seen, the patch boundaries need not align with logical qubits or any other boundary in the fusion graph. (Stated differently, code distance and interleaving length need not have any particular relationship.) In some embodiments, patch 1908 can be interpreted as a sequence of instructions for setting the states of switches 1716a-1716d and reconfigurable fusion circuits 1712a-1712e of interleaving module 1700 during each RSG cycle. For instance, in each RSG cycle, the state of switches 1716a-1716d, which control whether qubits are routed to local fusion circuits 1712a-1712b, to network fusion circuits 1712d-1712e, or to network delay lines 1730, 1740, can be determined from the interleaving coordinate associated with the current RSG cycle. The state of each reconfigurable fusion circuit 1712a-1712e (each of which can be an instance of reconfigurable fusion circuit 1400 of FIG. 14) can be determined based on the connectivity between vertices.

FIG. 20 shows a table 2000 illustrating settings of switches 1716a-1716d and reconfigurable fusion circuits 1712a, 1712b, 1712d, 1712e of interleaving module 1700 that can be determined from patch 1908 according to some embodiments. Qubits propagating through the switches and the reconfigurable fusion circuits during a given RSG cycle are identified by an alphanumeric code such as N1 or W34; the letter is a directional label as used throughout this description, and the number indicates the RSG cycle during which the resource state including that qubit was produced by RSG 1710. Qubits marked with prime (e.g., W' or N") are networked qubits received via network paths from neighboring interleaving modules 1700. Table cells shaded in gray indicate operations associated with resource states generated during processing of a previous layer. It should be noted that there does not need to be any "dead" time between layers; after generating all 36 (or, more generally, all $L^2$) resource states associated with one layer of a fusion graph, interleaving module 1700 can immediately begin generating resource states associated with the next layer of the fusion graph.

For each RSG cycle, the state of each switch is indicated by a qubit identifier of the qubit propagating through the switch and either "net" or "local" to indicate whether the switch is set to select the "network" or "local" output path (as labeled in FIG. 17) for that qubit. The state of each reconfigurable fusion circuit is indicated by an operation-either "F( )" for fusion or "m( )" for single-qubit measurement; the operands are qubit identifiers. In this example, the type of single-qubit measurement (Pauli X, Y, or Z) is not specified. In some embodiments, the type of single-qubit measurement can be specified or inferred from the fusion graph. As shown in FIG. 14, the selection of operations for a reconfigurable fusion circuit can be controlled by selecting the corresponding state for switches 1412, 1414.

As shown, for resource states generated during cycles 1 and 2, all qubits are routed to fusion operations with appropriate qubits of other resource states. (In the case of qubit W1, a network fusion operation is selected.) For the resource states generated during cycles 3 and 4, qubit E3 and qubit W4 are routed to single-qubit measurements, in accordance with the half-lines in patch 1908. Switch settings for other RSG cycles can likewise be determined based on the fusion graph.

The state of U/D reconfigurable fusion circuit 1712c is not shown in FIG. 20. In this example, U/D fusion circuit 1712c can perform fusion operations for each layer except for D qubits in the first layer and U qubits in the last layer, for which single-qubit measurements can be selected. Delay line 1714c provides an $L^2$ delay (in this case, 36 RSG cycles), so that U/D fusion circuit 1712 fuses the U1 qubit of one layer with the DI qubit of the next layer. In some embodiments, other behaviors can be implemented, and operations for each U qubit and D qubit can be determined from the fusion graph.

As this example shows, it is possible to determine switch settings for an interleaving module with reconfigurable fusion circuits from a fusion graph. Accordingly, a data structure representing a fusion graph can be provided as input to classical control logic, and the classical control logic can determine a corresponding sequence of switch settings and control operation of a networked array of interleaving modules to execute the computation specified by the fusion graph.

It should be appreciated that a network of interleaving modules as shown in FIG. 17 can be used to generate layers of any size. (In some embodiments, the size may be fixed in the hardware design.) The number of interleaving modules (N) and the interleaving length L can be varied as desired; in an extreme case, N can be reduced to 1. For a given layer size, different choices of N and L will result in different computation times, and choices can be made to achieve a desired balance between hardware size and computational speed.

5. Interleaving Modules with Additional Capabilities

Figure 21A:
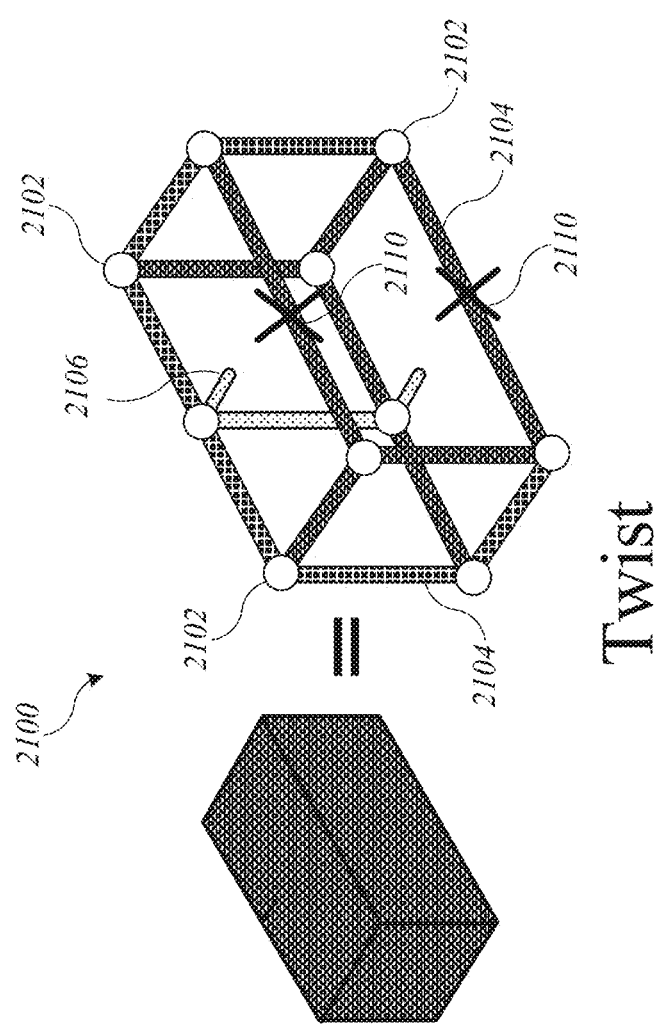
FIGS. 21A and 21B show examples of fusion graphs for operations that change the lattice structure.
Figure 21B:
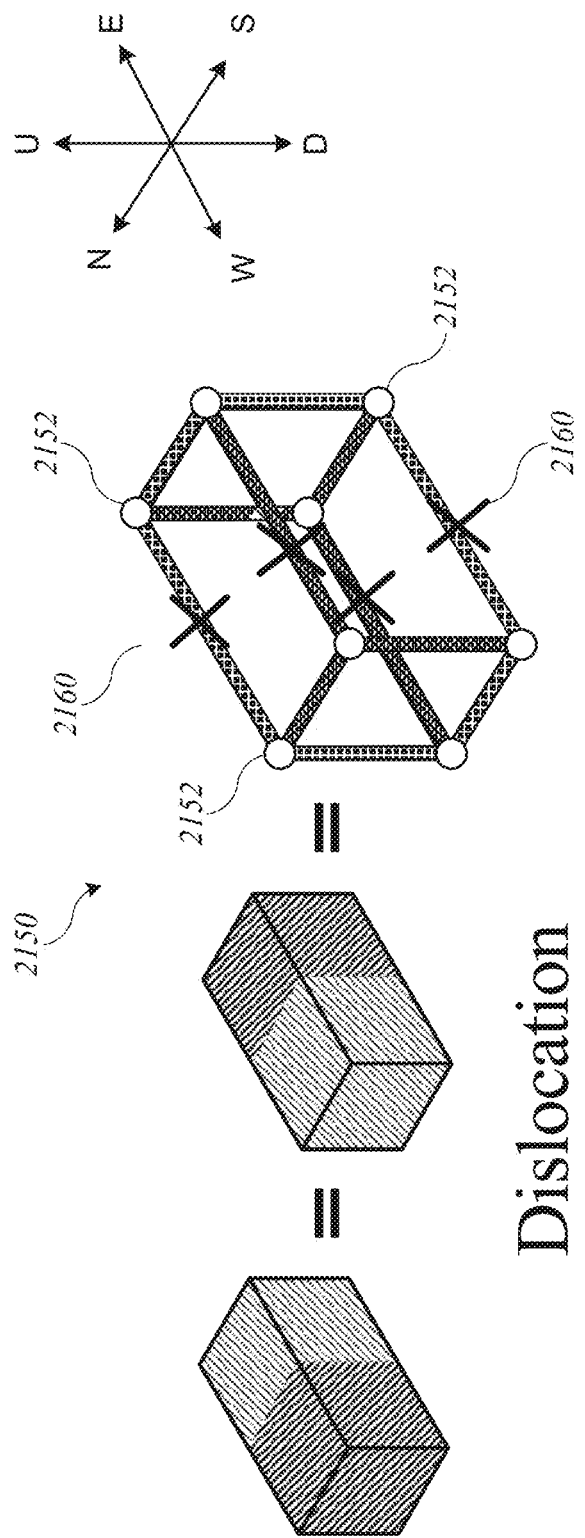

In examples described above, it is assumed that a fusion graph can be based on a regular bulk lattice in entanglement space. For instance, fusion graphs shown above have a structure that can be represented as layers, with each layer having an associated regular array (or 2D lattice) of resource states. For some logical operations, it may be desirable to introduce irregularities at selected locations in the lattice. ("Irregularity," or "defect," is used in this context to refer to a variation from the bulk lattice that changes the number of resource states (or vertices) in a layer.) By way of example, FIGS. 21A and 21B show examples of fusion graphs for operations that change the lattice structure. In these examples, only the portion of the fusion graph corresponding to a particular operation is shown. It should be understood that these operations can be incorporated into a larger fusion graph in which the operations shown are irregularities in a bulk lattice.

FIG. 21A shows a fusion graph 2100 for a "twist" operation. Ten resource states (vertices 2102) are involved in the twist operation, with five vertices 2102 in each of two different layers along the U-D axis. As in previous fusion graphs, lines 2104 connecting two vertices indicate type II fusion operations; half-lines 2106 connected to a single vertex indicate single qubit Pauli measurement. In this case, the single qubit measurement is a Pauli Y measurement. The two "X" marks 2110 correspond to lattice locations that are "skipped" by the twist operation. That is, qubits from any resource state that may be associated with the skipped location 2110 are not subject to any fusion or other measurement operations.

FIG. 21B shows a fusion graph 2150 for a "dislocation" operation, using the same notation as FIG. 21A. Eight resource states (vertices 2152) are involved in EW fusion operations associated with dislocation operation. However, the dislocation operation couples resource states that are not at adjacent lattice locations in the E-W direction. As indicated by "X" marks 2160, four lattice locations are skipped by the dislocation operation.

Whether a resource state is generated for a skipped lattice location 2110 or 2160 is a matter of design choice, as long as any qubits associated with the skipped lattice location do not interact with other qubits. In some embodiments, generation of a resource state for a skipped location 2110 can be prevented or avoided (e.g., by not sending a triggering signal to the RSG during the corresponding RSG cycle). In other embodiments a resource state for a skipped location 2110 may be generated and its qubits thereafter absorbed (e.g., by providing "terminal" routing paths that terminate in an opaque material and routing switches to selectably route qubits into the terminal routing paths).

Figure 22:
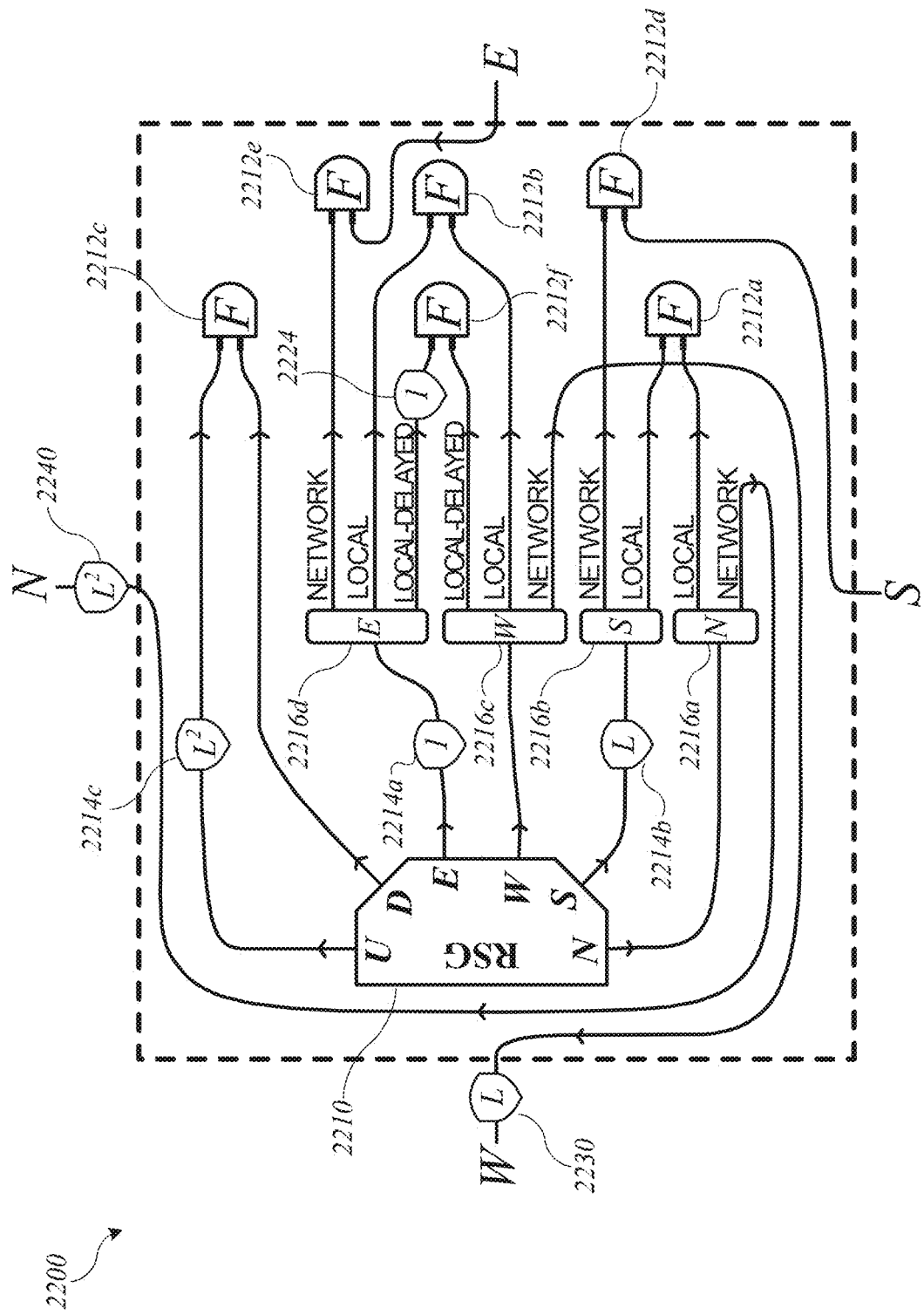
FIG. 22 shows a simplified schematic diagram of an interleaving module according to some embodiments.

According to some embodiments, an interleaving module can include additional circuitry to support operations such as twists and dislocations. FIG. 22 shows a simplified schematic diagram of an interleaving module 2200 according to some embodiments. Interleaving module 2200 can be similar in structure and operation to interleaving module 1700, with an additional routing option for the E and W qubits. Reconfigurable fusion circuits 2212a, 2212b, 2212c, also referred to as "local" fusion circuits, can be instances of reconfigurable fusion circuit 1400 of FIG. 14 and can be used to create entanglement between neighboring resource states generated within interleaving module 2200 on different RSG cycles. In addition, to create entanglement between resource states generated by neighboring interleaving modules 2200, additional "network" fusion circuits 2212d, 2212e can be provided. Network fusion circuits 2212d and 2212e can be additional instances of reconfigurable fusion circuit 1400 of FIG. 14 that perform fusion operations on a qubit of a locally generated resource state and a qubit of a networked resource state received from a different interleaving module 2200. Reconfigurable fusion circuit 2212f, also referred to as a "local-delayed" fusion circuit, can be another instance of reconfigurable fusion circuit 1400 of FIG. 14 and can be used to create lattice dislocations and twist defects of the kind shown in FIGS. 21A and 21B. Routing switches 2216a and 2216b can be reconfigurable optical switching circuits that are operated to selectably route the N and S qubits of a particular resource state to one of local fusion circuit 2212a or network fusion circuit 2212d, similarly to routing switches 1716a and 1716b of interleaving module 1700 of FIG. 17. Routing switches 2216c and 2216d can be reconfigurable optical switching circuits that are operated to select one of three output paths for the W and E qubits. Where a regular lattice is being generated, routing switches 2216c and 2216d can route the W and E qubits to one of local fusion circuits 2212b or network fusion circuit 2212e, similarly to routing switches 1716a and 1716b of interleaving module 1700 of FIG. 17. When a lattice defect (e.g., dislocation or twist) is to be executed, routing switches 2216c and 2216d can instead select the "local-delayed" paths. On the local-delayed paths, the E qubit (which was already delayed for one RSG cycle by delay line 2214a) can be delayed for an extra RSG cycle by delay line 2224, then delivered to reconfigurable fusion circuit 2212f. The W qubit is delivered to reconfigurable fusion circuit 2212f without additional delay, so that reconfigurable fusion circuit 2212f operates on a W qubit from the current resource state and an E qubit from the resource state generated two cycles previously, thereby effecting the "skip" as shown in FIGS. 21A and 21B.

Operation of interleaving module 2200 can be similar or identical to that of interleaving module 1700 described above, except that interleaving module 2200 can support additional lattice operations not supported by interleaving module 1700.

Interleaving module 2200 can introduce irregularities in the E-W direction. If the ability to introduce lattice irregularities in other directions is desired, similar routing paths, delay lines, and reconfigurable fusion circuits can be provided.

6. Computational Efficiency Enhancements

In some embodiments, a network array of interleaving modules (e.g., array 1702 of FIG. 17) can provide a general-purpose quantum computer capable of executing any quantum computation that can be expressed using a fusion graph. (Interleaving module 1700 can be used to execute any quantum computation for which the fusion graph does not include lattice defect operations as described above. Interleaving module 2200 or other variations can be substituted as desired.) Any number of interleaving modules can be included in a network array, with each interleaving module generating a patch of a desired size $L^2$. For present purposes, it is assumed that the delay lines are fixed-length structures whose length is determined based on the interleaving length L.

For a network having a fixed number of interleaving modules, the use of larger L can increase the number of logical qubits that can be encoded (for a given code distance). However, larger L also can be expected to result in slower logical operations. In this sense, a design tradeoff exists between space (or hardware) and time. For a given quantum computation and a fixed number of interleaving modules, some minimum interleaving length $L_{min}$ is required to execute the computation, based on the number and code distance of logical qubits that need to be encoded. At the same time, larger L means longer delay lines, which can in turn imply increased propagation loss in the delay lines (since existing optical fibers and other waveguides are not perfectly transmissive), and at some point the interleaving length may reach a threshold ($L_{max}$) where the propagation loss exceeds the loss threshold of the error correcting code. If $L_{min}$ exceeds $L_{max}$, then additional interleaving modules would need to be added to execute the quantum computation. Thus, the chosen interleaving length L should be between $L_{min}$ and $L_{max}$. In some embodiments, $L=L_{min}$ may be the optimal choice. However, in some embodiments, additional physical qubits can be used to reduce the overall volume of the quantum computation (which can be measured by the size of the fusion graph) by taking advantage of better-than-linear space-time tradeoffs. Where this is the case, interleaving may increase the speed of executing a quantum computation relative to a non-interleaved approach (e.g., the fully networked unit cells of FIG. 15). In addition, because interleaving slows the rate of logical operations, increasing L can reduce the speed of classical processing needed to keep pace with the logical operations. For instance, conditional logic may require the classical processor to receive and decode a first set of measurements corresponding to a first logical operation in order to determine a subsequent logical operation to be executed. If the decoder is slower than the rate at which logical operations can be executed, then the computation may be stalled or slowed. In various embodiments, the interleaving length L can be optimized for a particular hardware implementation based on the foregoing design considerations and/or other considerations.

7. Connectivity Enhancements

In examples described above, logical qubits can be represented using square surface codes, which map well to planar topology. For instance, the fusion graph in FIG. 13A can be viewed as a sequence of planar layers coupled by fusion operations between successive layers. However, in some instances, fusion graphs using different topologies may allow more compact logical operations, where compactness can be defined in terms of the volume of a fusion graph corresponding to the logical operation. In some embodiments, a network of interleaving modules can have additional couplings to support execution of more compact fusion graphs. Examples will now be described.

7.1. Moving Logical Qubits

Figure 23:
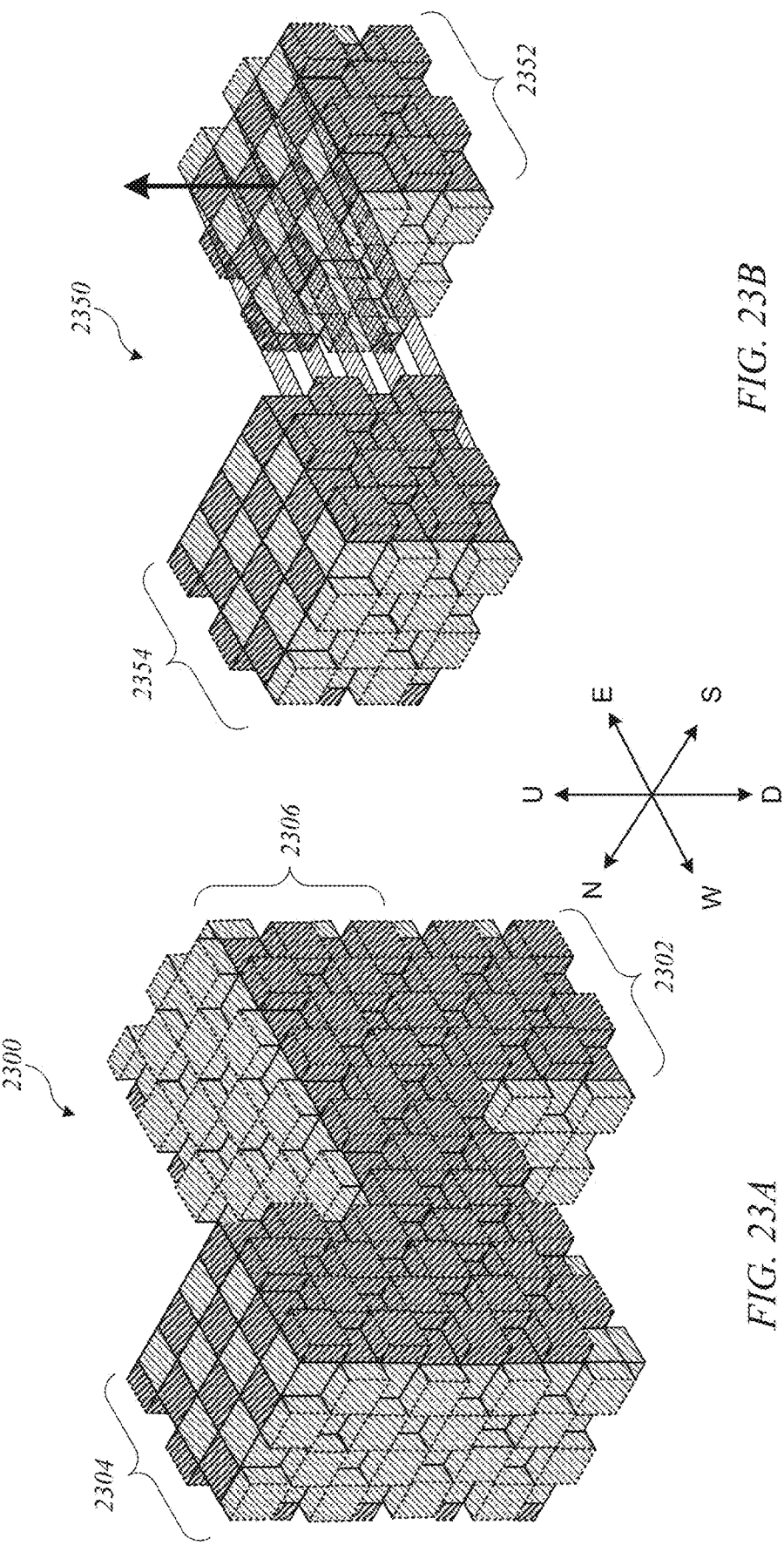
FIG. 23A shows an example of a fusion graph for moving a logical qubit.
FIG. 23B shows a fusion graph for a more efficient implementation of moving a logical qubit.

One example where a planar representation may be volume-intensive is the case of "moving" a logical qubit, a logical operation in which a bulk lattice region representing the logical qubit is shifted from one region to another within the fusion graph. For instance, logical qubits may need to be shifted to adjacent regions so that a two-qubit logical operation can be performed between them. FIG. 23A shows an example of a fusion graph 2300 for moving a logical qubit from a source region 2302 to a destination region 2304. The logical qubit is at rest (not interacting), and fusion graph 2300 represents a regular bulk lattice with single-qubit measurements at the boundaries. In this example, there are intermediate layers 2306 associated with the move operation that simply teleport quantum information to the next layer, which can require extra computation time. FIG. 23B shows a fusion graph 2350 for a more efficient implementation of a move operation on a logical quit. In fusion graph 2350, the quantum information is shifted from W to E by the desired number of lattice locations in a single step along the U-D axis, using fusion operations between U qubits in the U-most layer of source region 2352 and D qubits in the D-most layer of destination region 2354.

Figure 24:
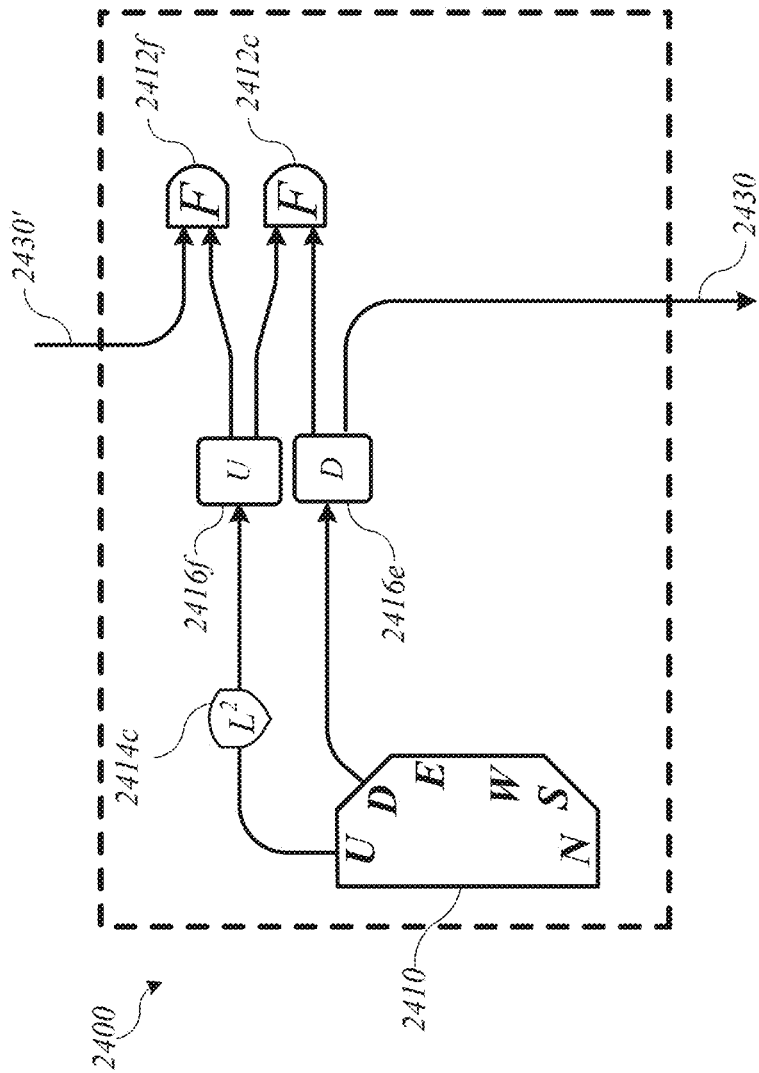
FIG. 24 shows a simplified schematic diagram of an interleaving module according to some embodiments.

According to some embodiments, this type of "fast" move operation can be implemented using interleaving modules by adding additional routing switches for the U and D qubits. FIG. 24 shows a simplified schematic diagram of an interleaving module 2400 according to some embodiments. Interleaving module 2400 can be similar to interleaving module 2200, with the addition of switches and additional routing paths for the U and D qubits, as shown. Routing and fusion circuits for the N, S, E, and W qubits are not shown in FIG. 24; these components and their operation can be similar or identical to components shown in any of FIG. 17, 19, or 22. As shown in FIG. 24, interleaving module 2400 can include a resource state generator 2410, which can be identical to other resource state generators described herein. As with interleaving module 1700, the U qubit of each resource state is routed to delay line 2414c. Unlike interleaving module 1700, interleaving module 2400 includes additional routing switches 2416e and 2416f. Routing switch 2416e operates to deliver the D qubit either to a local fusion circuit 2412c (which can be identical to local fusion circuit 1712c of FIG. 17) or to a network path 2430 that connects to an instance of interleaving module 2400 elsewhere in the network array. Routing switch 2416f operates to deliver the (delayed) U qubit either to local fusion circuit 2412c or to a network fusion circuit 2412f. Network fusion circuit 2412f can be an instance of reconfigurable fusion circuit 1400 of FIG. 14 that operates on the U qubit delivered by routing switch 2416f and a D qubit received via network path 2430' from another instance of interleaving module 2400 elsewhere in the network.

Figure 25:
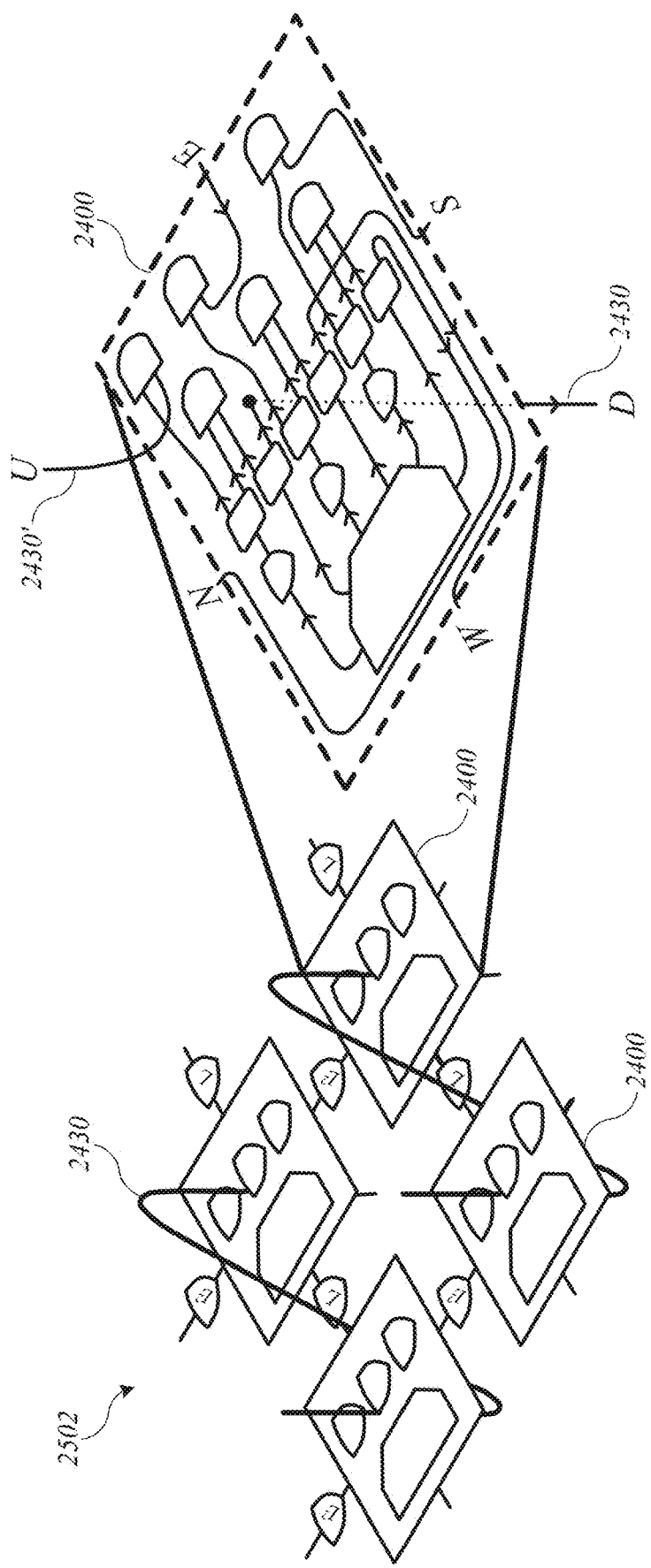
FIG. 25 shows a simplified schematic drawing of the connectivity of network paths between interleaving modules in a network array according to some embodiments.

FIG. 25 shows a simplified schematic drawing of the connectivity of network paths 2430 and 2430' between interleaving modules 2400 in a network array according to some embodiments. Shown is a network array 2502 of interleaving modules 2400. In this example, network paths 2430 transfer qubits between adjacent instances of interleaving module 2400. Accordingly, in consecutive layers, a logical qubit can be shifted by one interleaving length L in the E direction. To support larger shifts between consecutive layers and/or shifts in different directions, the connectivity can be varied as desired.

7.2. Periodic Boundary Conditions

Figure 26B:
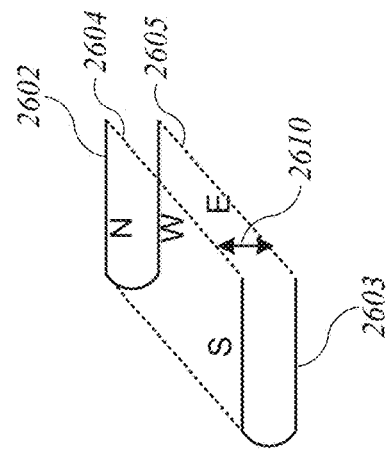
FIGS. 26A-26D are conceptual illustrations of a toric surface code with periodic boundary conditions.
Figure 26D:
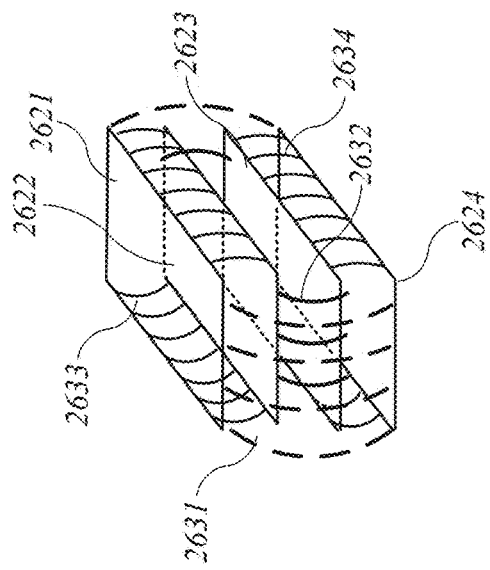
Figure 26A:
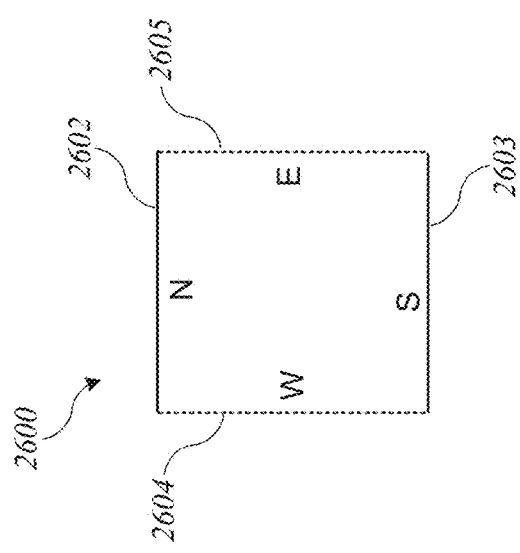
Figure 26C:
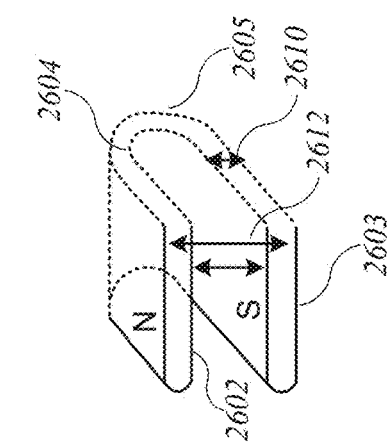

Examples described above use square surface-code patches, in which each logical qubit is mapped to a d×d lattice in a planar layer. However, embodiments are not limited to square surface codes or to planar surface codes. For example, a toric code can be defined by creating periodic boundary conditions in each layer. FIGS. 26A-26D are conceptual illustrations of a toric code with periodic boundary conditions. FIG. 26A shows a planar layer 2600 having boundaries 2602, 2603, 2604, 2605, which can be associated with N, E, W, and S directions in an entanglement space. To create a periodic boundary condition in the E-W direction, fusion operations 2610 can be performed between E qubits of resource states along boundary 2605 and W qubits of resource states along boundary 2604, as shown in FIG. 26B. To create a periodic boundary in the N-S direction, fusion operations 2612 can be performed between N qubits of resource states along boundary 2602 and S qubits of resource states along boundary 2603, as shown in FIG. 26C. FIG. 26D shows how the toric code of FIG. 26C can be mapped to a set of four planar patches 2621, 2622, 2623, 2624, with fusion operations (indicated by curved lines 2631, 2632, 2633, 2634) between resource states at the boundaries of different patches.

Figure 27:
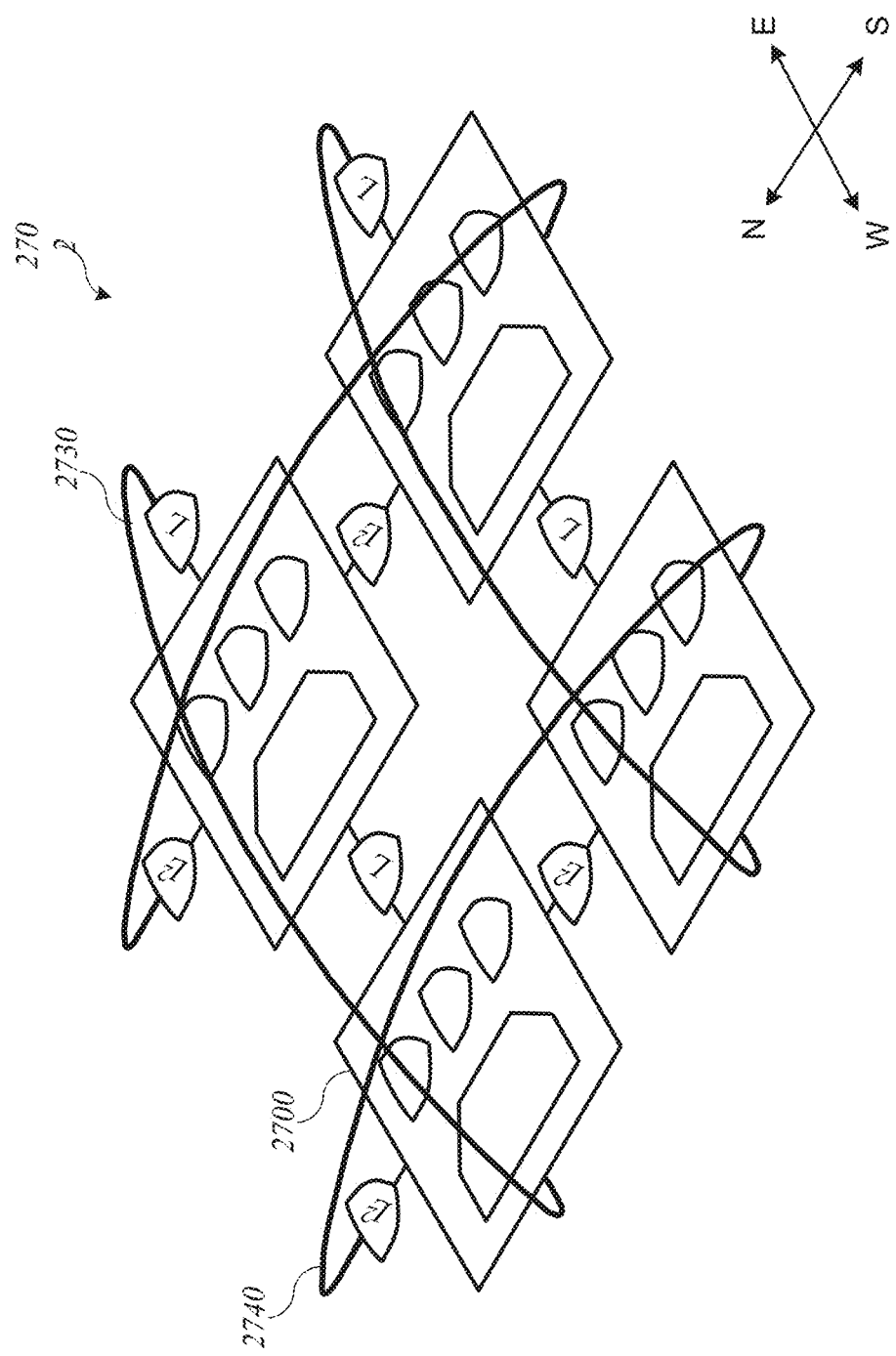
FIG. 27 shows a simplified schematic diagram of a networked array of interleaving modules according to some embodiments.

According to some embodiments, toric codes can be implemented using a network array of interleaving modules such as interleaving module 1700 (or interleaving module 2400). FIG. 27 shows a simplified schematic diagram of a network array 2702 of interleaving modules according to some embodiments. Network array 2702 can be generally similar to network array 1702, and interleaving modules 2700 can be generally similar to any of the interleaving modules described above. In network array 2702, however, each interleaving module 2700 at the E edge of array 2702 is connected to a corresponding interleaving module at the W edge of array 2702 by a path 2730, and each interleaving module at the N end of array 2702 is connected to a corresponding interleaving module at the S end of array 2702 by a path 2740. With appropriate time delays, generation of a toric code can be implemented, with each interleaving module 2700 generating one of patches 2621-2624 shown in FIG. 26D.

These examples of additional connectivity between interleaving modules are illustrative, and variations and modifications are possible. In various embodiments, connections between spatially separated interleaving modules can facilitate routing of logical qubits within a quantum computer. For instance, some architectures may include different logic units responsible for different types of operations, and logical qubits may need to be moved from one logic unit to another. With non-local spacelike connections between interleaving modules, movement of logical qubits can be performed with enhanced efficiency. The particular type and number of connections between interleaving modules can be adapted to suit a particular architecture and fusion graph topology.

7.3. Non-Euclidean Geometry

Figure 28:
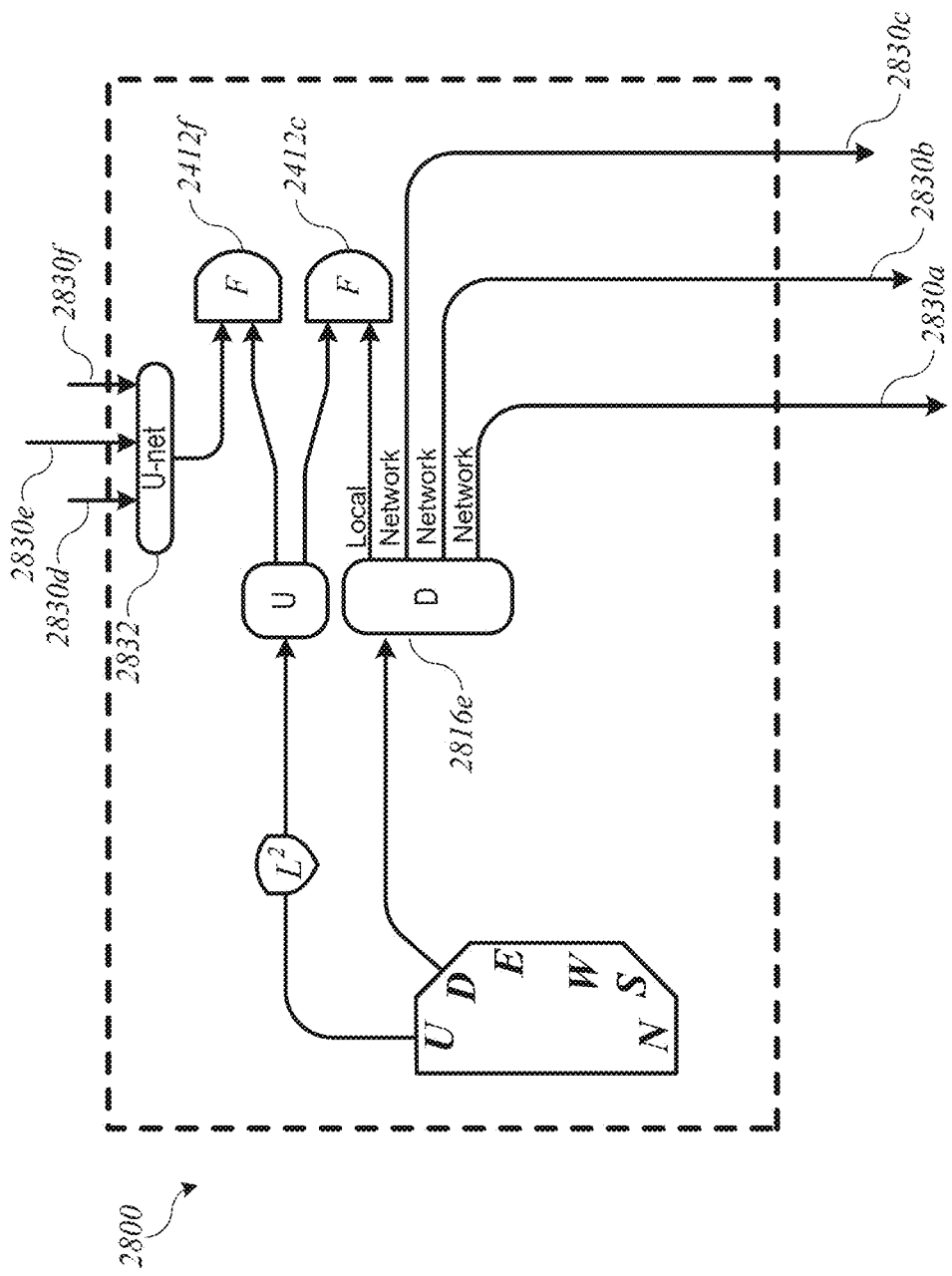
FIG. 28 shows a simplified schematic diagram of an interleaving module according to some embodiments.

In examples described above, network arrays are formed by connecting interleaving modules such that every interleaving module has a unique neighbor (or in some instances no neighbor) in each of the N, E, W, and S directions. In some embodiments, by adding more selectable routing paths and reconfigurable fusion devices, one can perform network fusion between qubits produced in different (but fixed) combinations of interleaving modules. By way of example, FIG. 28 shows a simplified schematic diagram of an interleaving module 2800 according to some embodiments. Interleaving module 2800 can be identical to interleaving module 2400 of FIG. 24, except that routing switch 2816e provides more than two output paths. A local path delivers the D qubit to local fusion circuit 2412c. The other paths are alternative network paths 2830a-2830c, each of which can be coupled to a different instance of interleaving module 2800, or to the same instance of interleaving module 2800 but with different delays. In some embodiments, two (or more) alternative network paths 2830 can be coupled to two different reconfigurable fusion circuits in the same interleaving module 2800. Similarly, an additional "U-net" switch 2832 is provided to select among alternative networked D qubits from resource states generated in other interleaving modules 2800 that may be received via network paths 2830d-2830f. Operation can be similar to interleaving module 2400, with the additional routing paths allowing logical qubits to be selectably moved in different directions and/or by different distances between adjacent layers and/or delayed by different numbers of RSG cycles. It should be understood that alternative network paths are not limited to U and D qubits and that any routing switch in an interleaving module can be selectably coupled to any number of network paths.

In some embodiments, one or more routing switches in an interleaving module can allow selection not among different network paths but also among different local paths that couple to delay lines of different lengths and/or to different reconfigurable fusion circuits within the interleaving module. An appropriate combination of local and network routing paths can enable more complex surface codes and/or other potential efficiencies.

Figure 29B:
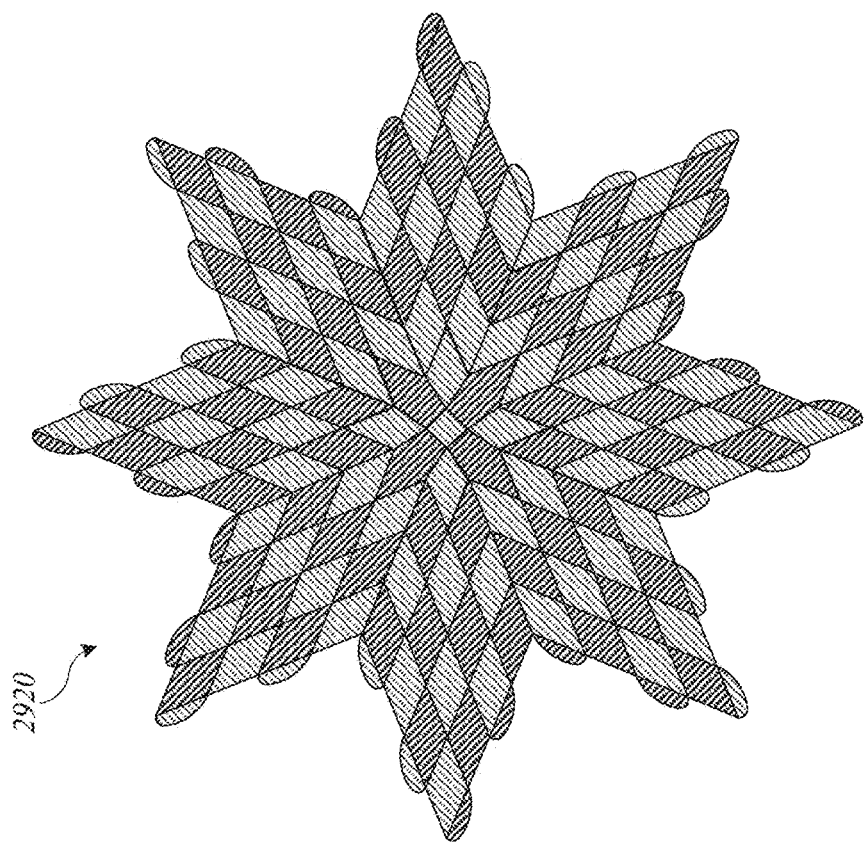
FIGS. 29A and 29B show fusion graphs for stellated surface codes.
Figure 29A:
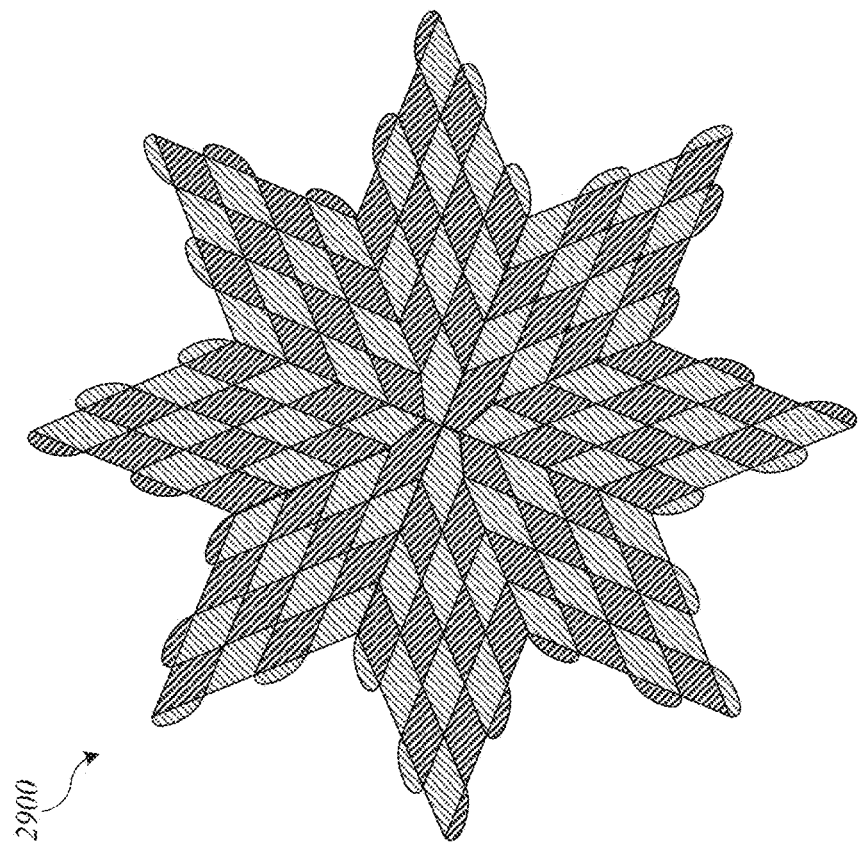

By way of example, FIGS. 29A and B show two examples of fusion graphs for stellated surface code patch 2900 and 2920. A stellated surface code patch can be understood as an n-gon generalization of triangular (n=3) and square (n=4) surface code patches. In stellated surface code patch 2900, n=8. For large n, stellated surface code patches use approximately half the number of physical qubits per logical qubit as square surface code patches. However, the shape of stellated surface code patches makes them difficult to implement in a regular two-dimensional array of physical qubits.

According to some embodiments, interleaving modules with switchable network connections can be used to implement stellated surface code patches. FIGS. 30A and 30B show examples of connectivity structures supporting stellated surface code patches that can be implemented using a network of interleaving modules according to some embodiments. FIG. 30A shows a decomposition of stellated surface code patch 2900 into a triangular truncated lattice pattern 3002 that repeats eight times. Connectivity (fusion operations) between instances of pattern 3002 are shown. It should be understood that the arrows 3003 at the left and right edges indicate a periodic boundary condition. In addition, a "backbone" 3004 (which corresponds to the center portion of stellated surface code 2900) is connected to each instance of pattern 3002.

FIG. 30B shows a decomposition of stellated surface code patch 2920 into a triangular truncated lattice pattern 3022 that repeats eight times. A double backbone 3024 connects to each instance of lattice pattern 3022. It should be understood that the arrows 3023 at the left and right edges indicate a periodic boundary condition. In FIG. 30B, interleaving coordinates (numbers 1-8) are assigned to each vertex to suggest an interleaving pattern that can be used to generate stellated surface code patch 2900.

Figure 31:
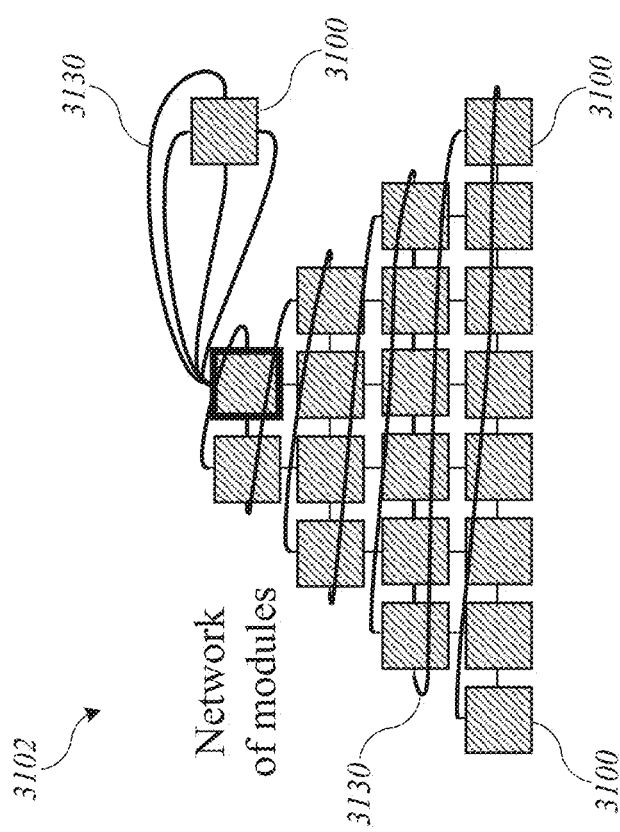
FIG. 31 shows a simplified schematic of a networked array of interleaving modules that can be used to produce a stellated surface code according to some embodiments.

FIG. 31 shows a simplified schematic of a network array 3102 of interleaving modules 3100 that can be used to produce the lattice pattern shown in FIG. 30B according to some embodiments. Each interleaving module 3100 can be similar to interleaving modules described above and can include switchable network connections to enable the desired connectivity. Lines 3130 connecting interleaving modules 3100 represent selectable network paths between different instances of interleaving module 3100.

It will be appreciated that the various surface topologies described herein are illustrative and that suitably connected interleaving modules can implement a wide variety of surface codes.

8. Computing System Implementing FBQC

Figure 32:
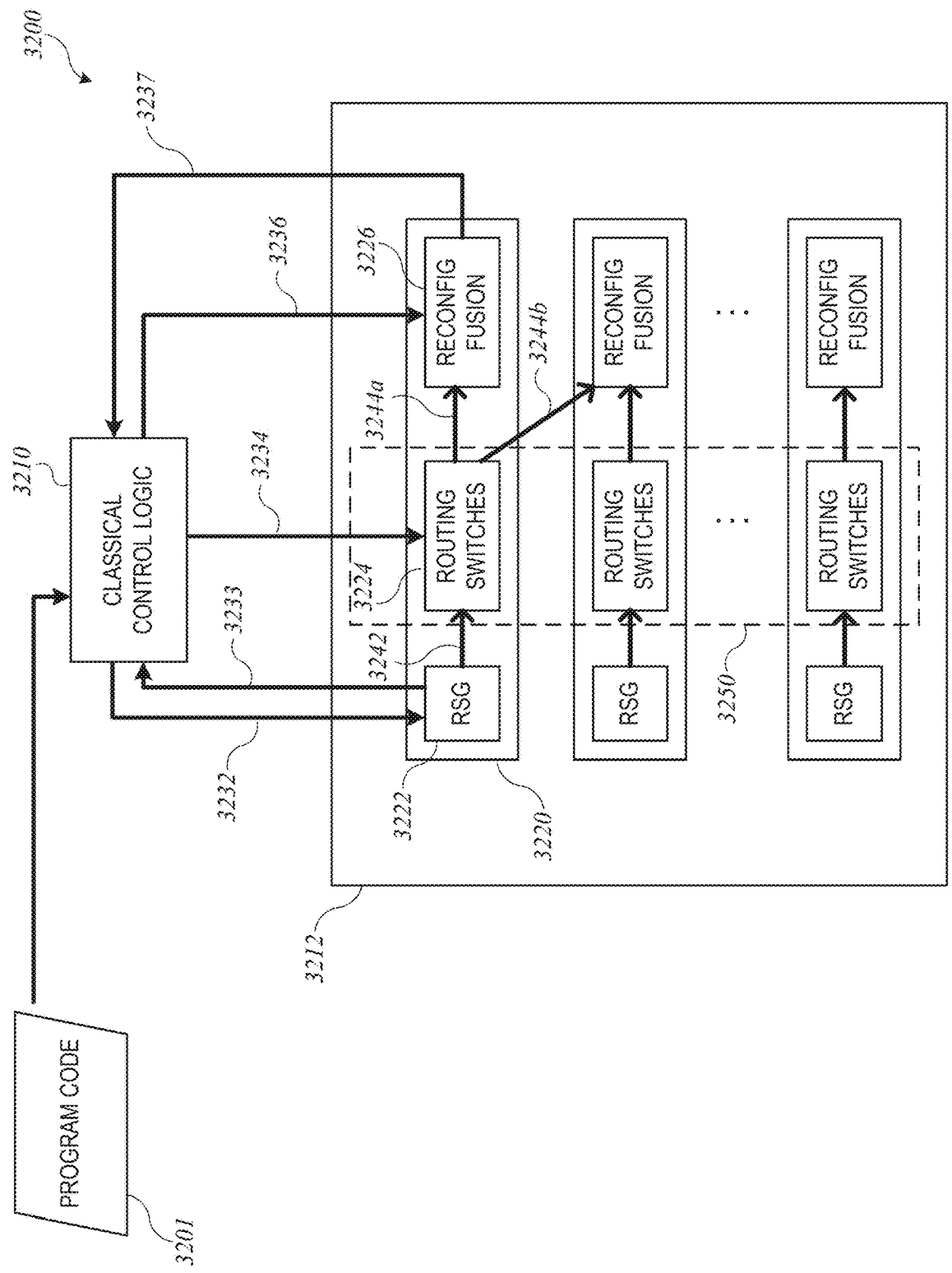
FIG. 32 shows an example system architecture for a quantum computer system that can implement FBQC according to some embodiments.

FIG. 32 shows an example system architecture for a quantum computer system 3200 that can implement FBQC according to some embodiments. Using photonic physical qubits, some embodiments of quantum computer system 3200 can generate measurement data reflecting entanglement structures (e.g. fusion graphs) for fault-tolerant FBQC. System 3200 includes classical control logic 3210 and a network 3212 of interleaving modules 3220. For clarity of illustration, classical signal paths 3232-3237 are shown connected to only one instance of interleaving module 3220. It should be understood that classical control logic 3210 can communicate with components in each instance of interleaving module 3220 in the manner described herein.

Classical control logic 3210 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, classical control logic 3210 (or portions thereof) can be implemented in an off-chip classical computer having a processor and a memory, and the off-chip classical computer can be programmed to perform some or all of the operations of classical control logic 3210.

In operation, classical control logic 3210 (which can include a classical computer) can receive "program code" 3201 specifying a quantum computation to be executed. For example, the program code can include a machine-readable data file defining a fusion graph as illustrated in figures above. Classical control logic 3210 can read the program code and generate control signals for interleaving modules 3220 to perform the computation.

Each interleaving module 3220 can be an instance of interleaving module 1700 of FIG. 17, interleaving module 2400 of FIG. 24, or any other interleaving module, including any of the examples described above. As shown in FIG. 32, each interleaving module 3220 can include a resource state generator (RSG) 3222, a set of routing switches 3224, and a set of reconfigurable fusion circuits 3226. Details of couplings between components within each interleaving module 3220 and between interleaving modules 3220 are not shown in FIG. 32. It should be understood that any of the coupling schemes described above or other schemes that support execution of fusion graphs having a particular topological form can be used.

Each RSG 3222 can include a resource state generator circuit as described above. In some embodiments, the RSGs 3222 can operate autonomously, with no data input required, and each RSG 3222 circuit can generate one resource state per RSG cycle (also referred to as a clock cycle). RSGs 3222 can generate 6-ring resource states as described above or other resource states having an appropriate number of qubits and entanglement pattern. In some embodiments, RSGs 3222 can be reconfigurable to generate resource states having different entanglement patterns during different RSG cycles, and classical control unit 3210 can send classical control signals via signal path 3232 to RSGs 3222, e.g., to select the type of resource state to generate during each RSG cycle. In some embodiments, RSG 3222 succeeds in generating a resource state with probability less than 1, and RSG 3222 can provide classical heralding signals to classical control logic 3210 via signal path 3233. The classical heralding signals can include, e.g., signals from detectors associated with heralded photon sources and/or entanglement-generating circuits such as the Bell state generator and/or fusion circuits described above. Classical control logic 3210 can use heralding signals received via signal path 3233 to determine whether each instance of resource state generation by a particular RSG 3222 succeeded or failed. For instance, particular patterns of presence or absence of photons in detectors can be indicative of success or failure. In some embodiments, RSGs 3222 can be maintained at cryogenic temperature (e.g., 4 K) while other components of interleaving module 3220 can operate at higher temperatures (e.g., 300 K).

Optical fibers (or other waveguides) 3242 can be used to couple each RSG 3222 to its associated routing switches 3224. In some embodiments, the optical fibers (or other waveguides) 3242 can introduce appropriate relative delay into the propagation paths of different qubits of the same resource state. For example, optical fibers 3242 can implement delay lines 1714a-1714c shown in FIG. 17.

Classical control logic 3210 can generate control signals for routing switches 3224 in each instance of interleaving module 3220 and send the control signals to routing switches 3224 via classical signal path 3234. As described above, in some embodiments routing switches 3224 can route qubits from RSG 3222 to either a local path 3244a or a network path 3244b. Local path 3244a and network path 3244b transfer the qubits to reconfigurable fusion circuits 3226. As described above, local path 3244a connects to reconfigurable fusion circuit 3226 in the same interleaving module 3220 while network path 3244a connects to reconfigurable fusion circuit 3226 in a different interleaving module 3220. For clarity of illustration, FIG. 32 shows one local path and one network path; however, it should be understood that multiple paths of either type can be provided and the routing paths for different qubits from a given resource state can be selected independently of each other. In some embodiments, classical control logic 3210 can select routing paths and corresponding control signals for routing switches 3224 based on a fusion graph representation of a quantum computation. An example of cycle-by-cycle setting of routing switches to execute a fusion graph is described above with reference to FIGS. 19A, 19B and 20. Other selection logic can also be implemented.

In some embodiments, the set of all routing switches 3224 across all instances of interleaving module 3212 can provide a fusion network router 3250. In some embodiments, fusion network router 3250 can be a reconfigurable fusion network router that supports different layer topologies, including examples described above without requiring changes to the underlying hardware. For instance, as shown in FIG. 28, alternative network routing paths 3244b can be provided between a routing switch 3224 in one interleaving module 3220 and reconfigurable fusion circuits 3226 in each of two or more other interleaving modules 3220. In various embodiments, network routing paths can be provided between any routing switch and any reconfigurable fusion circuit. In an extreme case, every routing switch can be connected to every reconfigurable fusion circuit; however, for fusion graphs having regular lattice structures (as in examples described above), not all possible connections are useful connections, and the set of network paths 3244b in a given implementation can be based on the fusion graph topologies that system 3200 is intended to support.

Classical control logic 3210 can also generate control signals for reconfigurable fusion circuits 3226 in each instance of interleaving module 3220 and send the control signals to reconfigurable fusion circuits 3226 via classical signal path 3236. As described above, in some embodiments each reconfigurable fusion circuit 3226 can be an implementation of circuit 1400 of FIG. 14 that operates on two input qubits. Circuit 1400 can be controlled by providing classical control signals to select the state of switches 1410 and 1412, which has the effect of routing the two input qubits to the desired measurement operation(s), which can include either a type II fusion operation (or other two-qubit measurement operation) or individual qubit measurements on each of the two input qubits. In some embodiments, classical control logic can select the desired measurement operations based on a fusion graph representation of a quantum computation. An example of cycle-by-cycle selection of measurement operations to execute a fusion graph is described above with reference to FIGS. 19A, 19B and 20. Other selection logic can also be implemented.

Measurement results generated by reconfigurable fusion circuit 3226 can be provided to classical control logic 3210 via classical signal path 3237. As described above, in some embodiments, the measurement results can include photon counts (or a binary-valued signal indicating presence or absence of a photon) for each detector in the reconfigurable fusion circuit or for the detector(s) on the active path(s) in a given cycle.

Classical control logic 3210 can decode the measurement results received via classical control path 3237 to determine a result of the quantum computation. In some embodiments, classical control logic 3210 can also incorporate the heralding signals received via signal paths 3233 into the decoding. Further description of decoding operations that can be implemented in classical control logic 3210 can be found in Appendix I.

Figure 33:
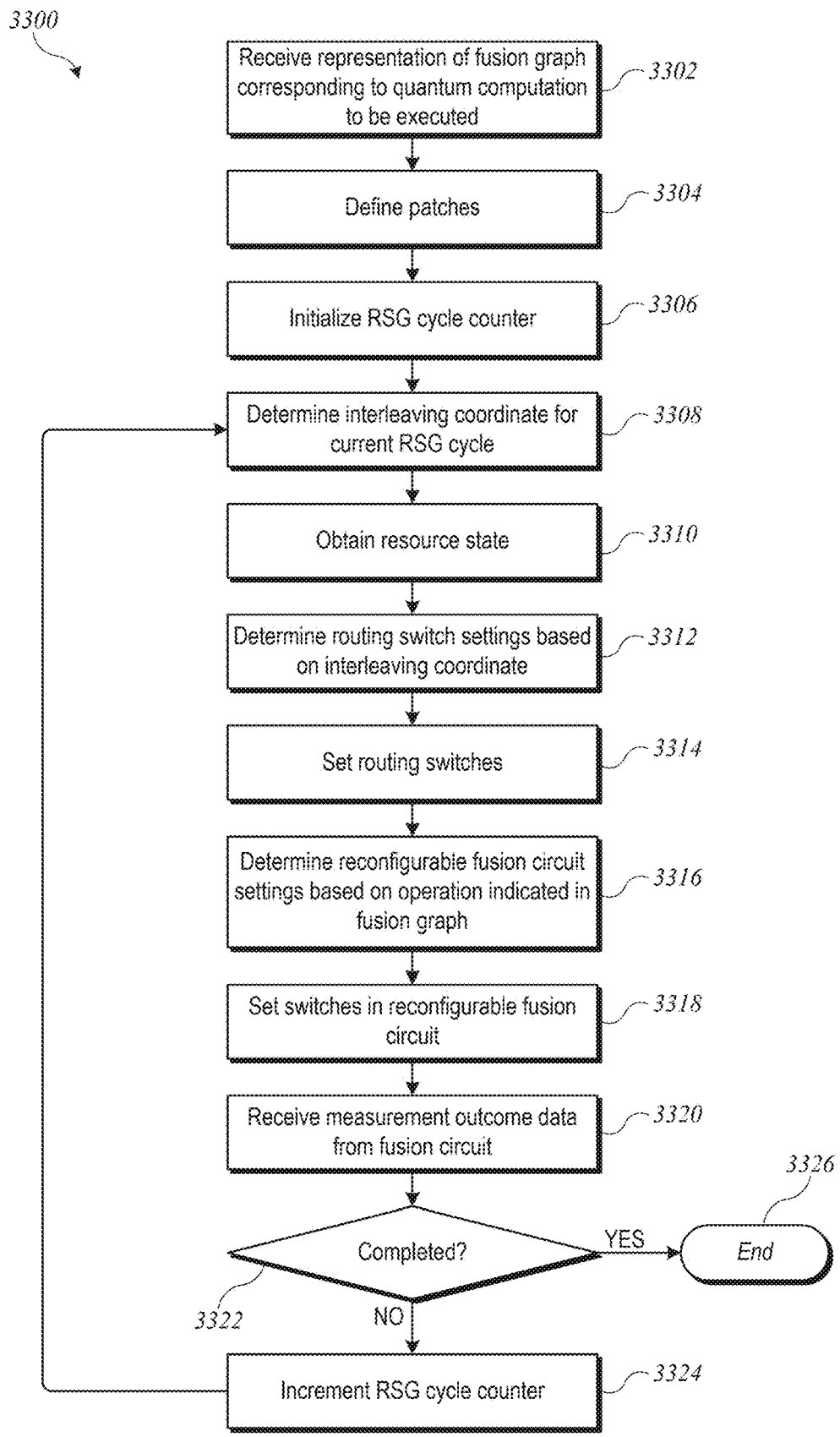
FIG. 33 shows a flow diagram of a process for operating an array of interleaving modules using classical control logic according to some embodiments.

FIG. 33 is a flow diagram of a process 3300 for operating an array of interleaving modules (e.g., interleaving modules 3220) according to some embodiments. Process 3300 can be implemented, e.g., in classical control logic 3210. At block 3302, classical control logic 3210 can obtain a machine-readable representation of a fusion graph corresponding to a quantum computation (or other operation on logical qubits) to be executed. At block 3304, classical control logic 3210 can define patches of the fusion graph to be generated by each interleaving module 3210. For instance, as described above, if the interleaving length is L, each layer of the fusion graph can be divided into patches of size L', and each patch can be assigned to a different instance of interleaving module 3210. At block 3306, classical control logic 3210 can initialize an RSG cycle counter. The RSG cycle counter can be, for example, a conventional clock circuit that operates at a rate corresponding to the rate at which resource states are to be generated in each RSG 3222. At block 3308, classical control logic 3210 can determine an interleaving coordinate for the current RSG cycle. One example of determining interleaving coordinates is described above with reference to FIG. 19A.

At block 3310, each RSG 3222 can generate a resource state. For example, a signal generated by classical control logic 3210 in response to the RSG cycle counter can trigger generation of a resource state. At block 3312, classical control logic 3210 can determine setting for routing switches 3224 based on the interleaving coordinate. For example, as described above, classical control logic 3210 can determine whether each qubit is subject to local or network fusion operations based on the interleaving coordinate (or position of the resource state within a patch). At block 3314, classical control logic 3210 can generate control signals to routing switches 3224 to rout the qubits into local or network paths based on the determinations at block 3312. At block 3316, classical control can determine switch settings for reconfigurable fusion circuits 3226 based on the measurement operation indicated in the fusion graph. For example, as described above, classical control logic 3210 can determine from the fusion graph whether to perform a fusion operation or single-qubit measurements (and which single-qubit measurements to perform). At block 3318, classical control logic 3210 can generate control signals to reconfigurable fusion circuits 3226 to implement the settings determined at block 3316. At block 3320, classical control logic 3210 can receive measurement data from reconfigurable fusion circuits 3226. Measurement data can be used as described above.

At block 3322, classical control logic 3210 can determine whether the quantum computation has been completed, e.g., whether the entire fusion graph has been executed. If not, then at block 3324, the RSG cycle counter can be incremented, and process 3300 can return to block 330 to determine the next interleaving coordinate and process the next set of resource states. Process 300 can continue to iterate until the computation is completed, ending at block 3326. It should be understood that all instances of interleaving module 3220 can be operated in parallel, with photons propagating between different interleaving modules 3220 based on the settings of routing switches 3224. Delay lines within or between interleaving modules can be provided so that qubits from different resource states arrive at reconfigurable fusion circuits 3226 with the correct relative timing to execute the fusion graph.

System 3200 of FIG. 32 and process 3300 of FIG. 33 are illustrative, and variations and modifications are possible. Blocks shown separately can be combined, or a single block can be implemented using multiple distinct components or operators. Order of operations can be varied to the extent that logic permits, and operations described as sequential can be performed concurrently. Interleaving modules 3200 can be implemented according any of the interleaving module arrays described above or variations or modifications thereof.

System 3200 is just one example of a quantum computer systems that can incorporate interleaving modules as described herein to perform operations on logical qubits or other operations that can be defined using fusion graphs, including operations related to quantum computation, quantum communication, and other applications. Those skilled in the art with access to this disclosure will appreciate that many different systems can be implemented.

8.1. Logical Blocks for Fault Tolerant Gates

Figures 34A, 34B:
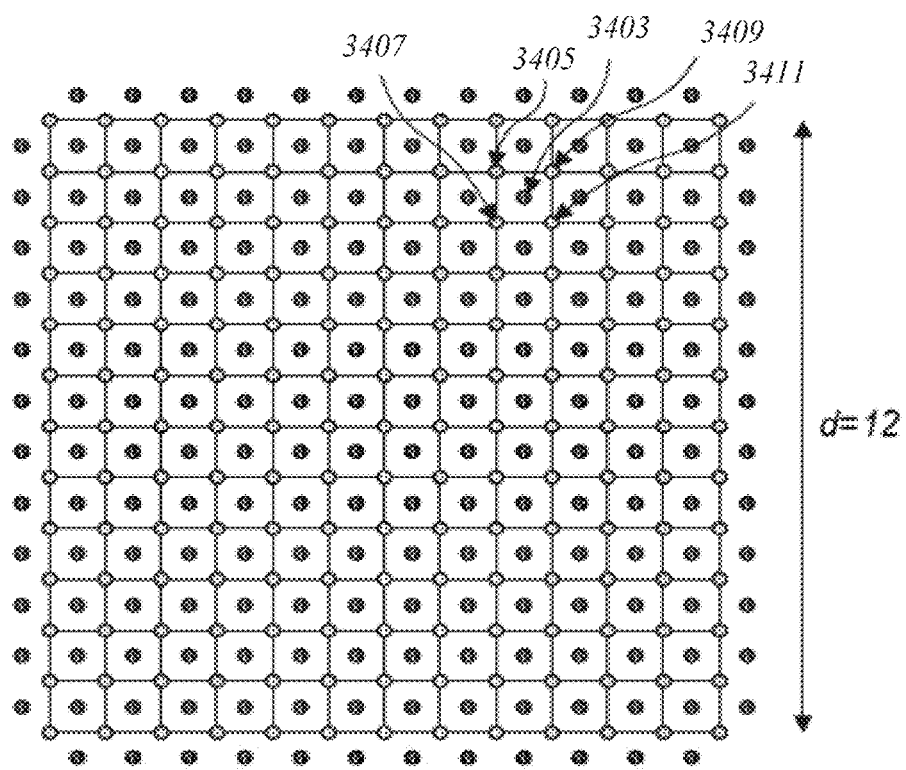

A single physical qubit (e.g., such as the 2-level physical qubit illustrated in FIG. 34A with a quantum state $|\psi\rangle = a_1|0\rangle + a_2|1\rangle$) may be used for quantum computation. However, individual physical qubits are generally highly susceptible to noise and decoherence. Fault-tolerant quantum computing utilizes a plurality of entangled physical qubits to encode a single logical qubit to mitigate the frailty and/or short coherence times of individual physical qubits. In fault-tolerant quantum computing schemes, a plurality of physical qubits such as those illustrated in FIG. 34B are entangled together according to a specific error correcting code to produce a single logical qubit that is less susceptible to noise and decoherence. Encoding qubits in this manner causes the resultant logical qubit to be less sensitive to error and noise, and resultant errors may be fixed via quantum error correction.

In some quantum computing methodologies, such as the fusion-based quantum computing described above and circuit-based quantum computing, a logical qubit is encoded from a plurality of physical qubits using a sequence of specific measurements (e.g., stabilizer measurements). The measurement sequence may be constructed where a subset of the physical qubits is measured (e.g., producing classical information in the form of the measurement result) in such a way that the remaining unmeasured/un-collapsed degrees of freedom (e.g., a 2-dimensional subspace which has support over all the physical qubits) form the desired encoded logical qubit. Accordingly, the processes of performing stabilizer measurements and/or encoding a fault-tolerant logical qubit may receive a plurality of physical qubits as input and as output may produce both the encoded logical qubit and classical information (e.g., syndrome graph data) resulting from the measurement sequence.

In some quantum computing implementations, the classical information takes the form of syndrome graph data, where the syndrome graph is a geometric representation of the outcomes of the measurement sequence. Because the input physical qubits are prepared in an initial state and measured according to a predetermined measurement sequence, it may be determined how the syndrome should appear in the absence of any errors involving the physical qubits during the measurement sequence (e.g., Pauli or erasure errors). Accordingly, any deviation of the syndrome graph data from the expected result may be indicative of one or more errors within the logical qubit. In general, these deviations may not indicate precisely which measurement(s) had an error, or which type of error has occurred, as there may be more than one type of error or combination of errors that is consistent with a given observed deviation from the anticipated error-free syndrome graph. For example, a syndrome graph may be determined as a grid of parity checks for adjacent nodes of the grid, whereby a parity error may indicate that one or more of the adjacent nodes had an error, but the parity error may not indicate precisely which adjacent node had an error, or which error occurred.

As used herein, the term "syndrome graph data" refers to a set of classical information (e.g., data represented by digital values such as ones and zeros) that specifies the location of one or more syndromes and/or one or more erasure errors within the syndrome graph of a logical block. A series of measurements (e.g., stabilizer measurements) are applied to the physical qubits of the error correcting code containing the encoded logical information, producing measurement outcomes as classical information. As described in further detail below, based on the knowledge of the particular geometry of the error correcting code, these measurement outcomes may be used to determine classical data referred to herein as the "syndrome graph data."

Errors that occur during operations on an encoded logical qubit may have varying degrees of severity. For example, errors in a fault-tolerant logical qubit may cause logical failure if they link up in a way that spans the syndrome graph of the logical qubit.

FIG. 34B shows an arrangement of physical qubits that can be used to encode a fault-tolerant logical qubit using a surface code according to one or more embodiments. In FIG. 34B, the solid grid lines are guides to the eye and form an array of squares, also referred to herein as a "surface code", with physical "data qubits" disposed on the four vertices of each square and physical "measure qubits" disposed on the face of each square. As used herein, measure qubits are the physical qubits which are measured to perform the stabilizer measurements (also referred to herein as "parity checks") on adjacent data qubits without directly measuring the data qubits and collapsing the quantum information. In this example the surface code has a length (or more precisely, a code distance) d of 12, but any length can be employed. The surface code arrangement of qubits also includes four lines of boundary measure qubits disposed adjacent to the outermost lines of data qubits. Each square is referred to herein as a plaquette. Within the bulk of the surface code (i.e., the plaquettes which don't form the outer boundary of the code) each data qubit may be coupled, via 4 two-qubit gates, to its 4 nearest neighbor measure qubits (each on four different plaquettes) and likewise, each measure qubit may be coupled, via 4 two-qubit gates to its 4 nearest neighbor data qubits. On the boundaries of the code, each boundary measure qubit may be coupled, via two two-qubit gates to its nearest adjacent data qubits. According to one or more embodiments, the two-qubit gates can be CNOT gates, CZ gates, and the like.

In order to operate the collection of data and measure qubits as a logical qubit that is protected against errors, the following set of measurements may be repetitively performed on the system. For each plaquette within the bulk of the surface code, 4-qubit stabilizers are measured. For example, as shown in FIG. 34D, if the data qubits of a given plaquette are labeled 1, 2, 3, 4 (e.g., data qubits 3405-3411) and the measure qubit is labeled a (e.g., measure qubit 103), the stabilizer to be measured on that plaquette can be $X_1Z_2Z_3X_4$. The "quantum circuit" (which is a term that refers to the sequence of gates and measurement operations to be performed on physical qubits) used to implement this stabilizer measurement is also shown in FIG. 34D and includes first initializing the measure qubit a in the |+⟩ state, then performing the following gates: a CNOT gate between the measure qubit a and data qubit 1, respective CZ gates between the measure qubit a and qubit 2 and qubit 3, and a CNOT gate between the measure qubit a and qubit 4; followed by an x-basis measurement Mx of measure qubit a. The resulting measurement outcome (which takes the form of a classical bit, e.g., 0 or 1 or −1 or 1, depending on the choice of conventions) is equal to the outcome of the measurement of the parity check stabilizer $X_1Z_2Z_3X_4$ and becomes part of the syndrome graph. For the plaquettes found at the boundary of the surface code, and shown in FIG. 34E, a two-qubit stabilizer of the form $Z_1X_2$ is measured. The quantum circuit used to implement this two-qubit stabilizer measurement is also shown in FIG. 34E and includes first initializing the boundary measure qubit a in the |+⟩ state then performing the following gates: a CZ gate between the measure qubit a and qubit 1 and CNOT gate between the measure qubit and qubit 2; followed by an x-basis measurement Mx of measure qubit a. In the example shown in FIG. 34C, there are two different types of boundaries depending on whether the boundary includes shaded plaquettes or unshaded plaquettes. A boundary surface that includes shaded plaquettes is referred to as a "dual boundary surface" and measurements including measure qubits within the dual boundary surface contribute to the "dual syndrome graph." Similarly, a boundary surface that includes unshaded plaquettes is referred to herein as a "primal boundary surface," and measurements including measure qubits within a primal boundary surface contribute to the "primal syndrome graph."

In order to implement the surface code scheme shown in FIG. 34C-E, the plaquette measurements may be broken into two groups of measurements: a first group of measurements that measures the stabilizers associated with the shaded plaquettes during a first duration of time and a second group of measurements that measures the stabilizers with the unshaded plaquettes during a second duration of time. These two sets of measurements are performed in different times to ensure that each qubit only participates in one quantum gate at a time. One of ordinary skill in the art will appreciate that any gates that can commute with one another may be performed in the same time step, or even simultaneously, if desired. The classical data generated by each one of these measurements, referred to herein as "syndrome graph data", is then passed to a decoder for quantum error correction according to known methods, e.g., using union find decoding, minimum weight perfect matching or any other decoding process.

One of ordinary skill will appreciate that the example shown in FIG. 1C is using a particular choice of local basis for the surface code and that other choices for the basis may be employed. For example, in some contexts, taking certain assumptions on the likely form of the errors that may occur on the underlying data and measure qubits, one may apply a single qubit gate to each data qubit to obtain a modified surface code. One may modify the basis for each check to obtain a scheme for the modified code. One example includes the CSS (Calderbank, Shor, Steane) version, where stabilizer measurements are either x-type or z-type. To obtain this version of the surface code, the stabilizers are conjugated by a Hadamard H: X→Z, Z→X on half the data qubits in a bipartition, thereby resulting in the CSS surface code. Note that the measurement schedule described above remains the same, but the new stabilizers are given by that summarized in FIG. 34F.

If the above-described surface code measurement schedule is applied for numerous time steps, the system effectively acts as a fault-tolerant quantum memory for the logical qubit encoded by the underlying surface code or, viewed another way, as a fault-tolerant logical identity gate on the logical qubit that is encoded by the underlying surface code. Viewed yet another way, this process operates as a fault-tolerant logical channel.

Figure 34G:
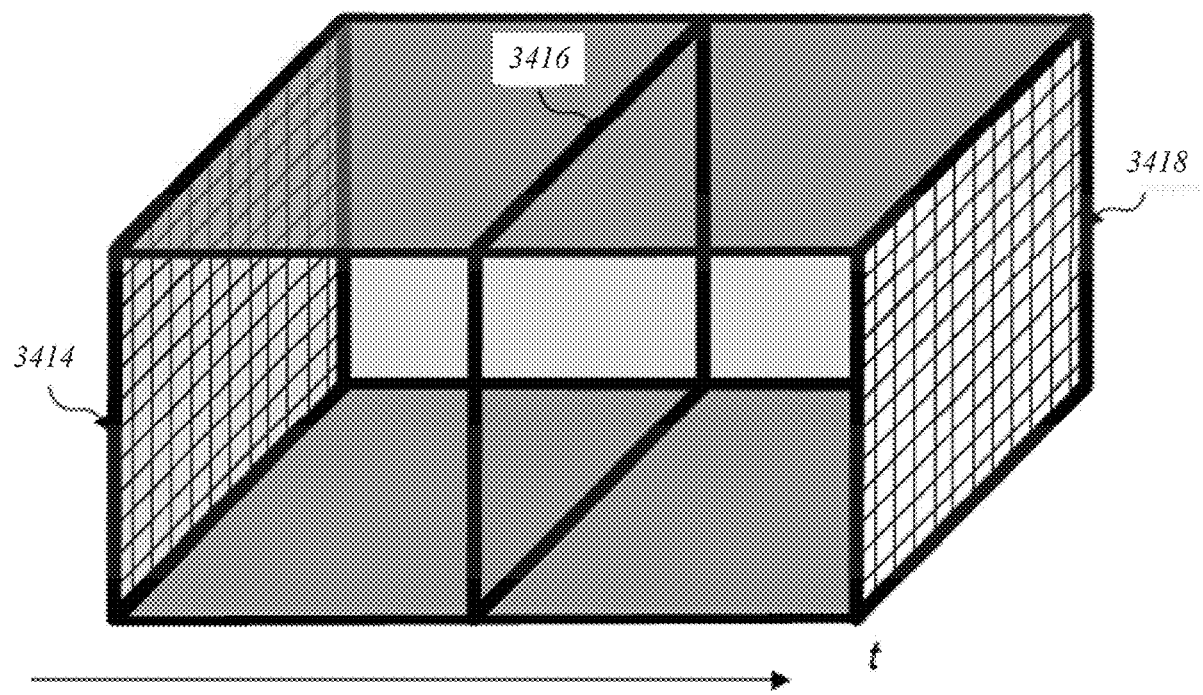
Figure 34H:
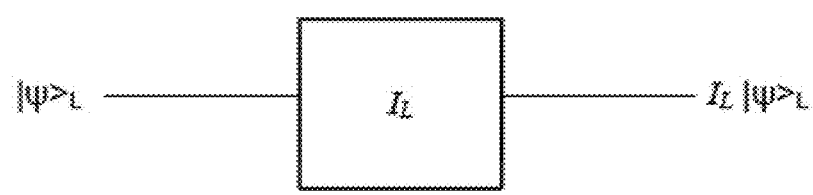

FIG. 34G illustrates a 3-dimensional graphical depiction of such a fault-tolerant logical identity gate. The surface labeled 3414 is the input port to the gate and includes an arbitrary logical state encoded in a surface code, represented as the input checkerboard surface. Likewise, the surface labeled 3418 identifies the output qubits after the identity gate I has been applied to it. The input and output surfaces, which may be associated with the physical 2D arrangement of data and measure qubits described above, are connected to each other via an intervening volume that represents the unique set of measurements to be applied over time as described above in reference to FIG. 34C-E. Accordingly, in FIG. 34G, time flows from left to right and the lighter shaded (front and back) and darker shaded (top and bottom) sides of the boundaries of the volume depict whether the primal or dual plaquettes are disposed on that boundary as described above in reference to FIG. 34C-E. FIG. 34H represents the same concept but written in a more familiar quantum circuit notation illustrating the analogy between the more familiar quantum circuit. While FIG. 34G shows the logical identity gate, any gate can be depicted in this manner and such a depiction is one example of a "logical block" that specifies a set of instructions to be performed on the underlying surface code qubits to perform a logical operation (the Identity gate in this example) on the logical qubit that is encoded by surface code. Other examples of such gates are the S gate, the Hadamard gate, and the CX gate, among other possibilities.

The sequence of measurements performed over the flow of time illustrated in FIG. 34G (e.g., a sequence of measurements including the circuit measurements shown in FIGS. 34C-E) may include a subset of measurements that incur a logical error (e.g., a Pauli error) or an erasure error. To identify errors in the measurement outcomes, syndrome graph data may be generated from the collection of measurement outcomes resulting from the measurements of the physical qubits. For example, the bit values associated with a plurality of edge qubits may be combined to create a syndrome value associated with an adjacent vertex that results from the intersection of the respective edges, e.g., the result of the measurements shown in FIGS. 34D and 34E. A set of syndrome values (or "syndromes"), also referred to herein as parity checks, may be associated with each vertex of the syndrome graph. The parity check values may be found by computing the parity of the bit values associated with each edge of the syndrome graph incident to the vertex. In some embodiments, a parity computation entails determining whether the sum of the edge values is an even or odd integer, with the parity result being the result of the sum modulo 2. If no errors have occurred in the quantum state or in the qubit measurements, then all syndrome values should be even (or 0). On the contrary, if an error occurs, it may result in some odd (or 1) syndrome values.

In some embodiments, half of the bit values from the qubit measurements are associated with the primal boundary surfaces, and this syndrome graph is referred to herein as the "primal graph". The syndrome graph resulting from measurements on the dual boundary surfaces is referred to as the "dual graph". There is generally an equivalent decoding problem on the syndrome values of the primal and dual graphs.

Figure 35A:
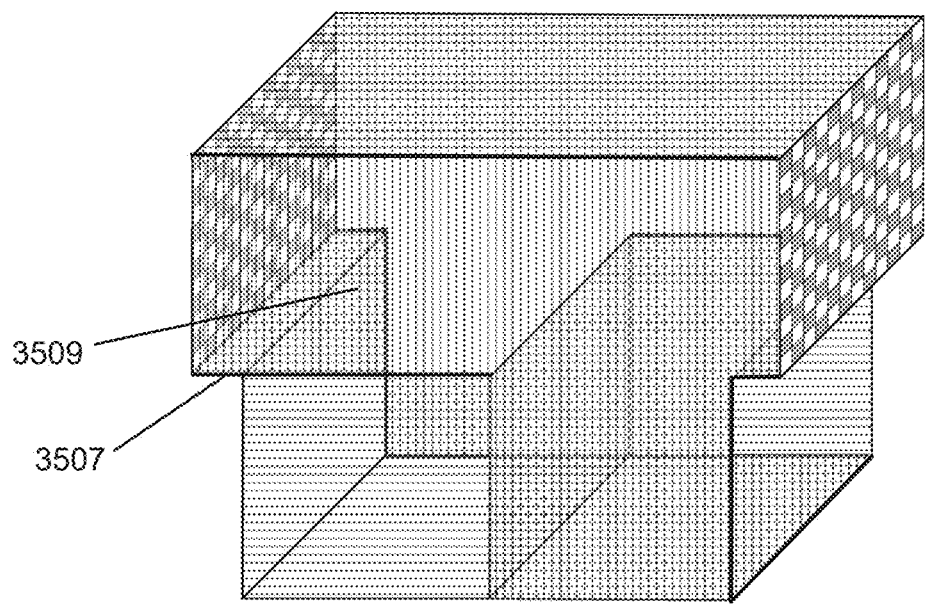
FIGS. 35A-35B show a logical S gate according to some embodiments.
Figure 35B:
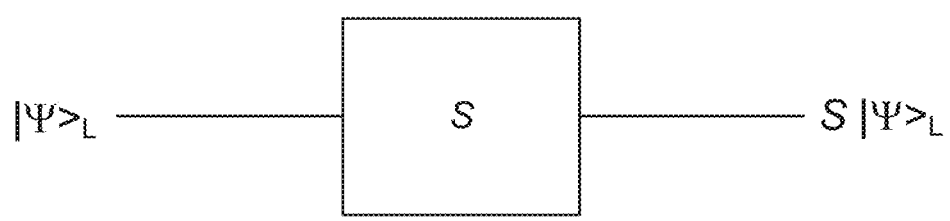

FIGS. 35A-35B and show a logical block that implements a quantum S gate in accordance with one or more embodiments. The phase gate S is an encoded gate in that it can operate to change the state of an encoded logical qubit. For the typical two-state logical qubit, the action of the phase gate is defined to be the unitary operation:

$$S = \begin{pmatrix} 1 & 0 \\ 0 & i \end{pmatrix}$$

In some embodiments, the quantum gate can be implemented within a stabilizer code architecture as described above in reference to the above figures. Like the example of the identity gate I above, the gate may be implemented as a sequence of measurement operations that are performed in the underlying physical qubits that make up the stabilizer code, e.g. by making measurements on the data and measure qubits of patches of surface code, also referred to herein as portions of the stabilizer code.

In this example, the logical block that forms the S gate can be implemented through a set of operations that results in the braiding of two cornerlines (e.g., corner lines 3507 and 3509) as shown in FIG. 35A where one of the cornerlines is propagated as a twist defect through the bulk, while the other moves around the exterior of the block. More specifically, in the context of surface code patches and operations, the gate can be implemented by implementing a set of qubit measurements on two adjacent patches, e.g., portions of surface code: the port portion 3603 and the ancillary portion 3605, shown as portions of a logical block in FIG. 36A and shown top-down as portions of stationary physical qubits arranged in a surface code. At the initial step, any logical qubit can be input on the input port of the logical block as described above in the context of the identity gate.

During the time period defined by $t_2$-$t_1$, the initial portion of the gate can be implemented as shown in FIG. 36B by performing a first round of surface code stabilizer measurements on the port portion 3603. In some embodiments, the stabilizer measurements can be accomplished according to the quantum circuit shown in FIG. 36C or as described above. The number of rounds of surface code stabilizers employed in this stage can be small and may be omitted in lieu of the stabilizers that are applied at the inputting step that receives the logical qubit from a prior block's output port.

Figure 37A:
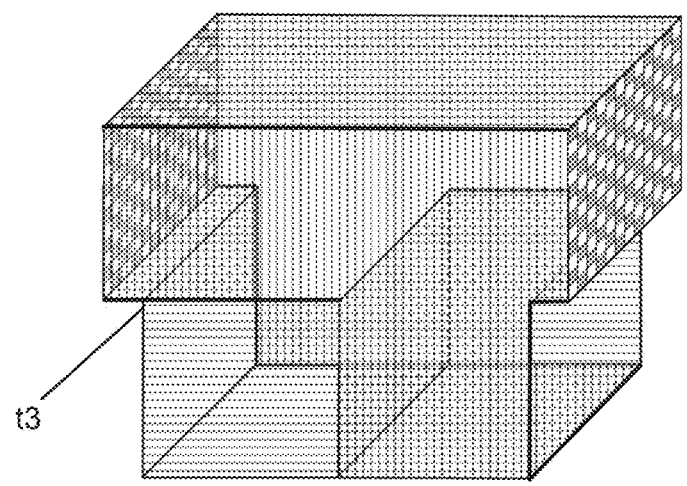
FIGS. 37A-37B show a logical S gate according to some embodiments.
Figure 37B:
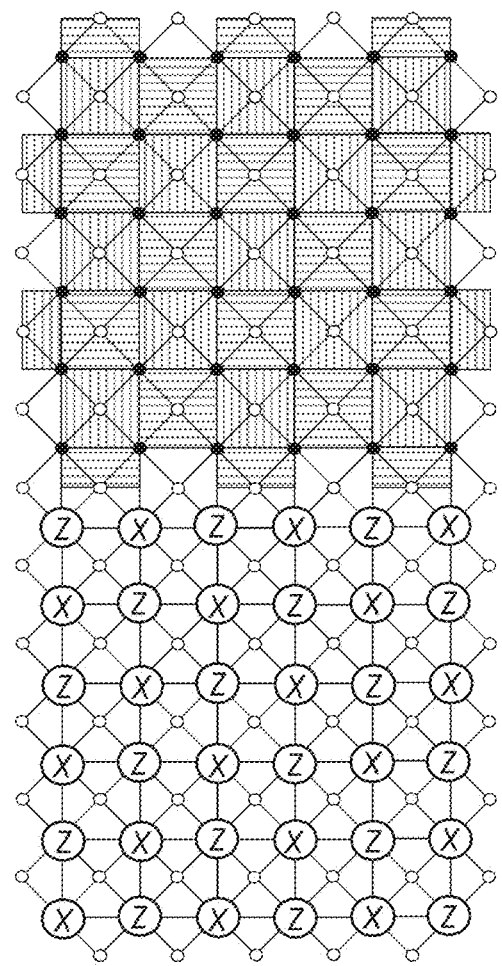

At time $t_3$ (e.g., a time that is immediately following $t_2$, a round of single qubit measurements are performed on the ancillary portion, as shown in FIG. 37A. For example, each data qubit in the ancillary portion may be measured with a single qubit Pauli measurement to prepare these qubits in the appropriate single Pauli eigenstates, e.g., by measuring each qubit in an alternating manner, e.g., X, Z, X, Z moving across each row of data qubits in the ancillary portion. Such an operation prepares either a primal or dual logical surface (depending on the convention chosen) on the input end of the ancillary portion as shown in FIG. 37A. Also, in this portion of the gate, the usual stabilizer measurements are also applied on the port portion as before.

Figure 38A:
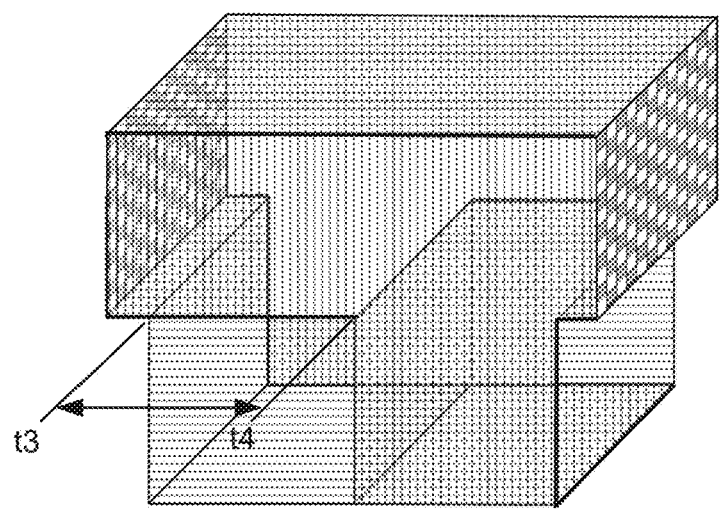
FIGS. 38A-38B show a logical S gate according to some embodiments.
Figure 38B:
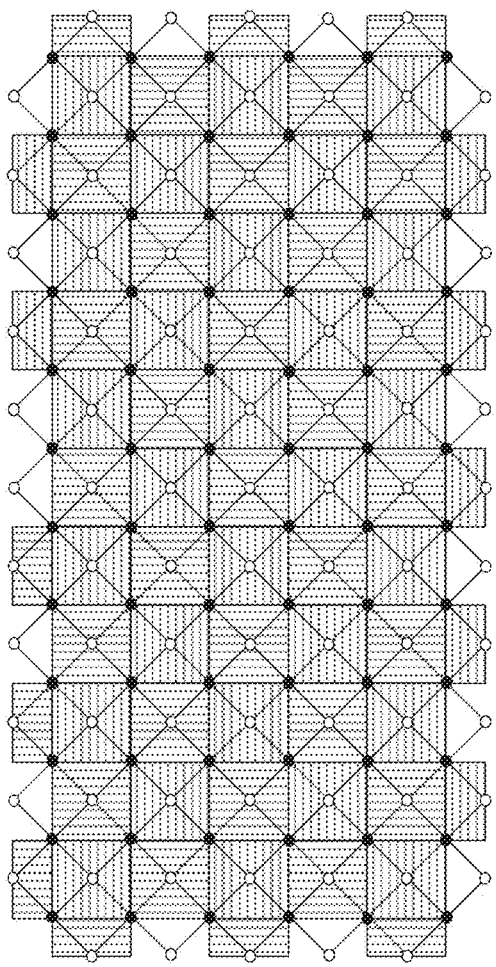

Over the duration defined by $t_4$-$t_3$ d (where d is the code distance) rounds of stabilizer measurements can be applied, but this time across the both the port portion and the ancillary portion, as shown 38B with boundary stabilizers being applied in the manner shown such that the boundaries on the port and ancillary portions generate primal and dual (or dual and primal, depending on the convention chosen) as shown in the FIG. 38A;

At time $t_5$ a sequence of both single qubit and dual qubit measurements are applied across several different regions of the ancillary portion to generate domain wall 3903 within the ancillary portion, wherein the domain wall terminates at a twist defect line 3905 within the bulk region of the encoded S gate as shown in FIG. 39A and has the effect of transitioning the cornerline into the bulk of the gate. As shown in FIG. 39B, forming the domain wall can include performing a group of single qubit measurements, e.g., single qubit pauli Y measurements, along the line of qubits that defines the boundary between the ancillary portion and the port portion (that will eventually form the twist line) after which all data qubits below are translated up. This translation can be achieved with a two-step process using SWAP gates as shown. In some embodiments, the SWAP gates can be implemented on the data and measure qubits using the circuit shown in FIG. 39C.

Figure 40A:
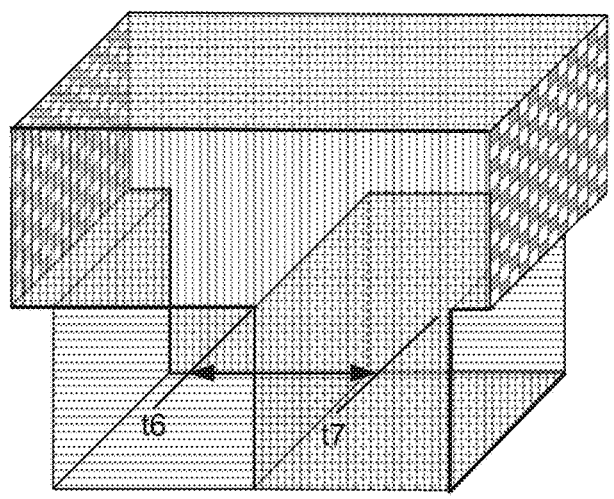
FIGS. 40A-40B show a logical S gate according to some embodiments.
Figure 40B:
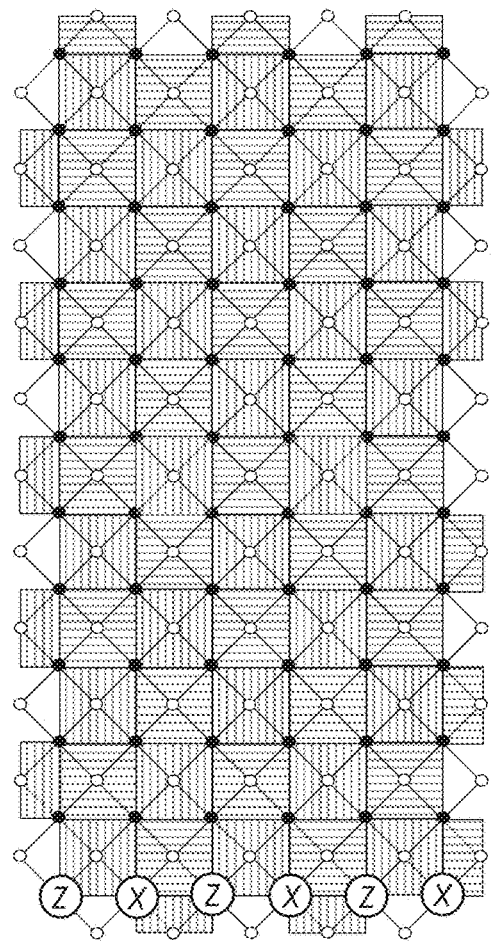

At time to the a set of single qubit measurements are performed on the line of lowest data qubits, as shown, e.g., by performing alternating Z and X measurements across the line shown as the outer boundary of the ancillary portion. Following the single qubit measurements, between $t_6$ and $t_7$, another d rounds of stabilizer measurements are performed on both the port portion and the ancillary portion, as shown in FIG. 40B.

Figure 41A:
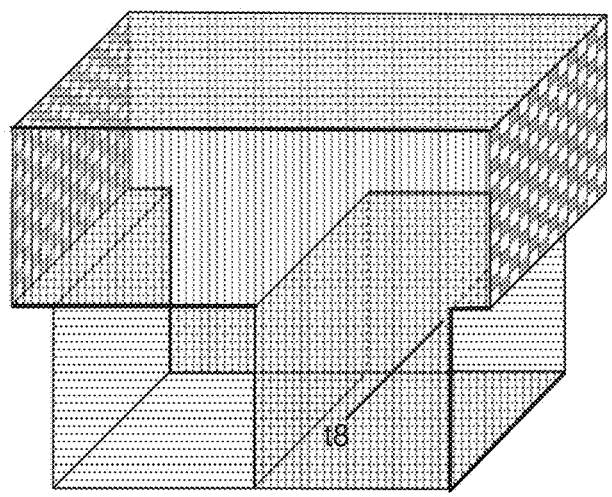
FIGS. 41A-41B show a logical S gate according to some embodiments
Figure 41B:
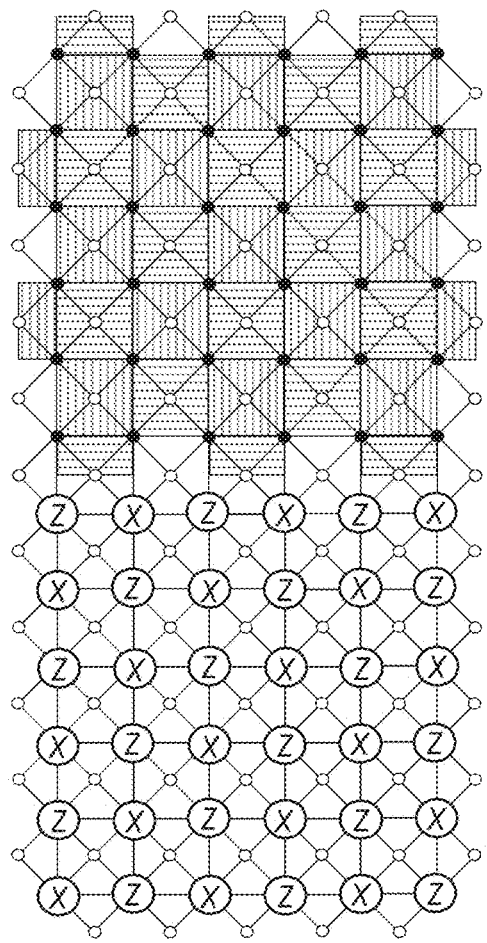

At time $t_8$ the ancillary portion is terminated by performing a series of measurements like that done at time $t_3$, as shown in FIGS. 41A and 41B.

The foregoing examples of interleaving modules and processes are illustrative and can be modified as desired. The use of directional labels (e.g., N, E, W, S, U, D) is for convenience of description and should be understood as referring to entanglement space, not as requiring or implying a particular physical arrangement of components or physical qubits. All numerical examples are for purposes of illustration and can be modified. In addition, while layers and patches are described with reference to square numbers, it should be understood that non-square layers and/or non-square patches can also be used. For example, patches or layers can be rectangular. Triangular patches or layers (or patches or layers having other shapes) can also be generated, e.g., by varying the number of resource states per row. Further, while examples described above assume that all instances of a resource state have the same entanglement pattern, such uniformity is not required. For instance, in some embodiments, RSG circuits can be reconfigurable to generate resource states having different entanglement patterns in different clock cycles. In addition, RSG circuit(s) may operate in a non-deterministic manner, and this may introduce stochastic variation among resource states.

In embodiments described above, each interleaving module has its own dedicated RSG circuit. In some embodiments, operation of an RSG circuit is non-deterministic, meaning that a given instance of an RSG circuit is not expected to produce the desired resource state in every clock cycle. Accordingly, rather than a dedicated RSG circuit for each interleaving module, some embodiments can provide a number (M) of RSG circuits. If N is the total number of instances of an interleaving module, then M can be greater than N, and M can be chosen to provide a sufficiently high probability that at least N resource states will be generated during a given RSG cycle. ("Sufficiently high probability" in a given implementation can be determined based on the particular implementation of fault tolerance.) Active multiplexing techniques, examples of which are known in the art, can be used to select N of the M RSG circuits on each clock cycle to deliver resource states to N different instances of the interleaving module. Thus, each interleaving module can but need not have its own dedicated instance(s) of an RSG circuit.

Embodiments described above provide examples of systems and methods for generating entanglement structures that can be used to perform FBQC. However, embodiments are not limited to FBQC and may be used in a variety of contexts, including measurement-base quantum computing (MBQC), other quantum computing systems, quantum communication systems, and any other context where it is desirable to perform measurements on a system involving a large number of physical qubits having an entanglement structure that can be represented using a fusion graph. The particular size (number of qubits) and entanglement pattern of the resource states can be varied as appropriate for a particular use case. In addition or instead, the size and entanglement geometry of a fusion graph can also be varied according to the particular use-case. For instance, while the foregoing description uses examples of fusion graphs having three-dimensional geometry, fusion graphs having more or fewer dimensions can be executed by providing an appropriate resource state generator and a suitably connected network of interleaving modules.

Further, embodiments described above include references to specific materials and structures (e.g., optical fibers), but other materials and structures capable of producing, propagating, and operating on photons can be substituted. As noted above, resource states can be generated using photonic circuits, or a resource state can be created using matter-based qubits, after which an appropriate transducer technology can be applied to swap the state of the matter-based qubits onto a photonic state. Interleaving as described herein exploits the propagation of photonic qubits, and similar techniques may be applicable to systems of physical qubits that are realized using entities that propagate along well-defined hardware paths.

It should be understood that the resource states, interleaving modules, and networks of interleaving modules shown herein are illustrative and that variations and modifications are possible. In some embodiments, resource states having different sizes and/or entanglement patterns can be used at different vertex positions within a fusion graph, and position-dependent selection of resource state configurations can be used to implement logical operations. Further, while FBQC is an example use-case for the interleaving techniques described herein, it should be understood that these techniques can be applied in other contexts and are not limited to quantum computing.

Classical control logic can be implemented on-chip with the waveguides, beam splitters, detectors and/or and other photonic circuit components or off-chip as desired.

It should be understood that all numerical values used herein are for purposes of illustration and may be varied. In some instances ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

What is claimed is:

1. A method of performing an encoded S gate on a logical qubit, the method comprising:
inputting the logical qubit to a port portion of the encoded S gate, wherein the encoded S gate includes the port portion and an ancillary portion, and wherein a lower surface of the port portion is coupled to an upper surface of the ancillary portion;
performing a first plurality of stabilizer measurement on the port portion;
performing a first plurality of single qubit measurements on the ancillary portion;
performing a second plurality of stabilizer measurements across both the port portion and the ancillary portion;
performing both single qubit and dual qubit measurements on a plurality of regions of the ancillary portion to generate a domain wall on the ancillary portion, wherein the domain wall terminates within a bulk region of the encoded S gate;
performing a third plurality of stabilizer measurements on both the port portion and the ancillary portion;
performing a second plurality of single qubit measurements on the ancillary portion;
performing a fourth plurality of stabilizer measurement on the port portion; and
outputting the logical qubit from the port portion.

2. The method of claim 1, wherein performing both single qubit and dual qubit measurements on the plurality regions of the ancillary portion to generate the domain wall comprises:
performing a third plurality of single qubit measurements along a boundary between the ancillary portion and the port portion; and
performing a plurality of two-step qubit swap gates across the ancillary portion; and
performing a third plurality of single qubit measurements along an outer boundary of the ancillary portion.

3. The method of claim 1, wherein the port portion and ancillary portions of the encoded S gate are portions of a surface code arrangement of physical qubits.

4. The method of claim 3, wherein the first, second, third and fourth plurality of stabilizer measurements are each performed by making a plurality of single particle measurements of surface code ancilla qubits.

* * * * *